(12) United States Patent
Maciey et al.

(10) Patent No.: US 6,552,829 B1
(45) Date of Patent: Apr. 22, 2003

(54) OPTICAL SCANNING DEVICE HAVING A CALIBRATED PIXEL OUTPUT AND METHOD FOR CALIBRATING SUCH A DEVICE

(75) Inventors: James L. Maciey, Loretto, MN (US); Jack J. Raymakers, Minneapolis, MN (US); Jerry D. Wheeler, Moundsview, MN (US)

(73) Assignee: NCS Pearson, Inc., Minneapolis, MN (US)

(*) Notice: Subject to any disclaimer, the term of this patent is extended or adjusted under 35 U.S.C. 154(b) by 34 days.

(21) Appl. No.: 09/596,274

(22) Filed: Jun. 16, 2000

Related U.S. Application Data

(62) Division of application No. 08/747,111, filed on Nov. 8, 1996, now abandoned.

(51) Int. Cl.[7] .................................................. H04N 1/46
(52) U.S. Cl. ....................... 358/509; 358/504; 358/475; 358/486; 358/496
(58) Field of Search ................................ 358/509, 475, 358/496, 488, 468, 406, 504, 486, 474; 382/168

(56) References Cited

U.S. PATENT DOCUMENTS

| | | | |
|---|---|---|---|
| 2,935,619 A | 5/1960 | Rogers | |
| 4,300,123 A | 11/1981 | McMillin et al. | |
| 4,315,245 A | 2/1982 | Nakahara et al. | |
| 4,356,390 A | 10/1982 | Feilchenfeld | |
| 4,920,428 A | 4/1990 | Lin et al. | |
| 5,073,700 A | 12/1991 | D'Onofrio | |
| 5,084,772 A | * 1/1992 | Shimoyama | 358/475 |
| 5,144,117 A | 9/1992 | Hasegawa et al. | |
| 5,382,782 A | 1/1995 | Hasegawa et al. | |
| 5,550,362 A | 8/1996 | Sherman | |
| 6,212,293 B1 | * 4/2001 | Yamamoto | 382/168 |

OTHER PUBLICATIONS

Spencer, Harvey, "Led Lighting Sources for Document Scanners: Surprising Impact," Advanced Imaging, pp. 67–69, Sep. 1996.

"TDI Scan Sensors," Dalsa, Inc. CCD Image Sensors, Chapter 3, Aug. 1993.

"Additional Sensor Information," Dalsa, Inc. CCD Image Sensors, Chapter 5, Aug. 1993.

* cited by examiner

*Primary Examiner*—Cheukfan Lee
(74) *Attorney, Agent, or Firm*—Dorsey & Whitney LLP

(57) ABSTRACT

An optical reading head system has a calibrated pixel output, consisting of a discrete value for each of a plurality of pixels. The system has a scanning station with an exposure region that includes an image region and a detector including an array of photosensitive sites that sense reflected light from the exposure region during a detector exposure period to generate a pixel output profile of the image region. There are a plurality of light sources for lighting the exposure region. Each light source emits an individually controllable amount of light to the exposure region during a detector exposure period such that the system's pixel output is acceptably calibrated. A calibration medium is supplied with a calibration region, and a target pixel output profile is defined for the calibration. The individually controllable light sources are adjusted to make the pixel output profile acceptably within range of the target pixel output profile.

14 Claims, 37 Drawing Sheets

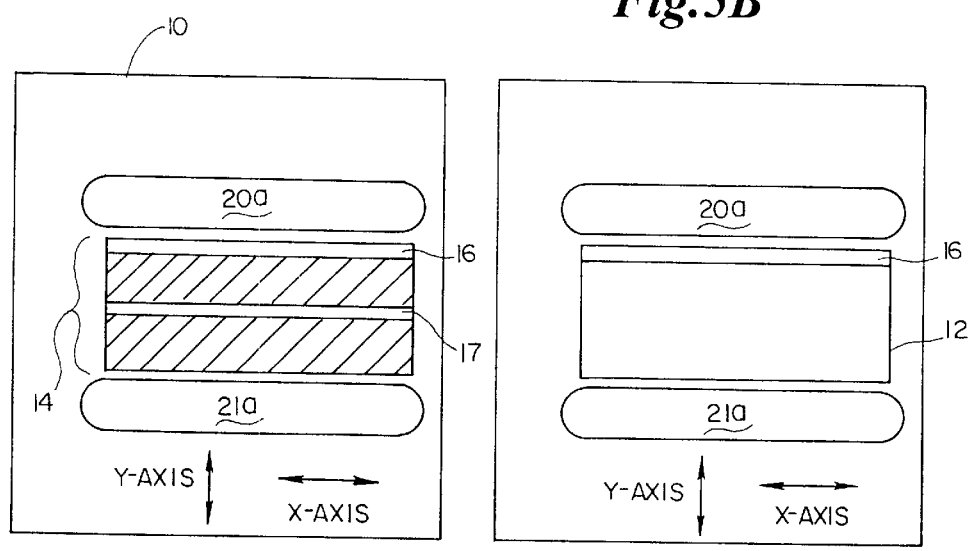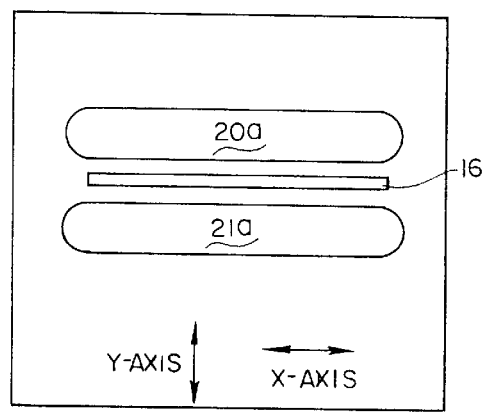

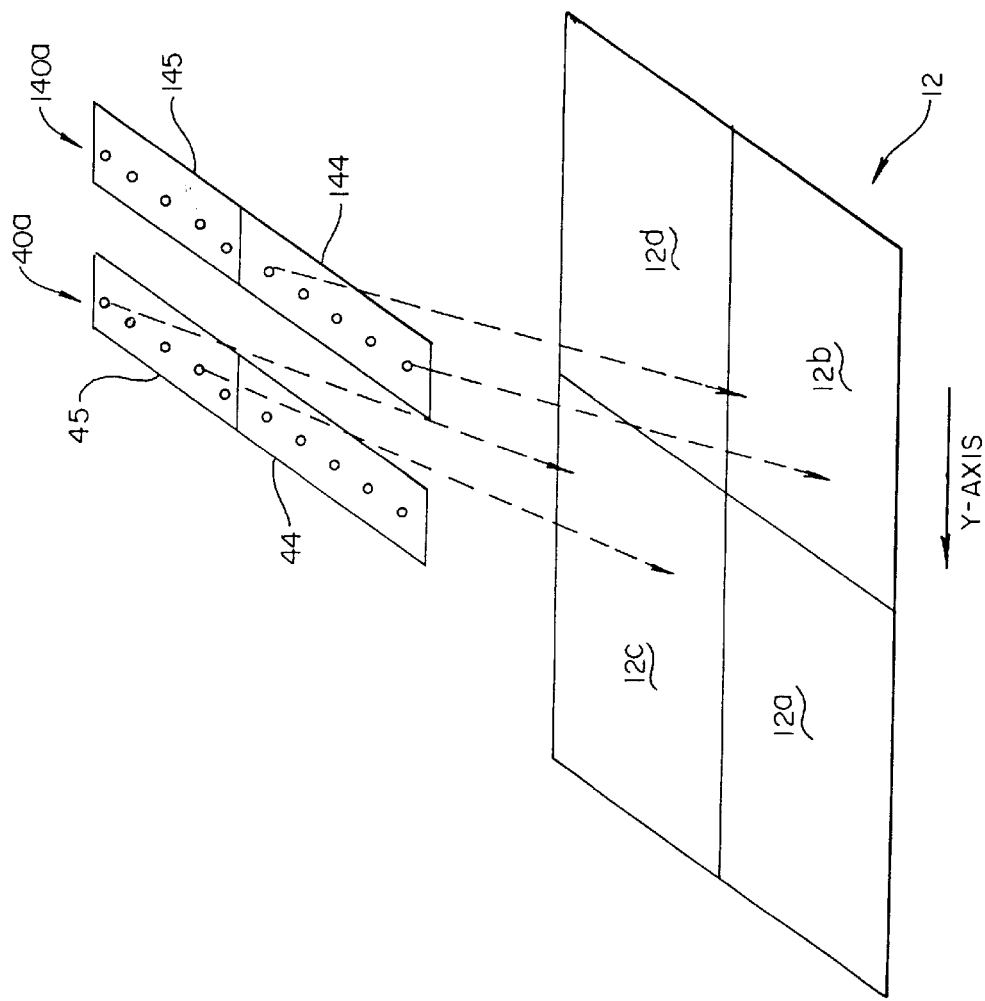

OPTICAL SCANNING DEVICE HAVING A CALIBRATED PIXEL OUTPUT AND METHOD FOR CALIBRATING SUCH A DEVICE

This application is a divisional application of U.S. patent application Ser. No. 08/747,111, filed Nov. 8, 1996 now abandoned, which is incorporated herein by reference.

TECHNICAL FIELD

The present invention relates generally to the field of optical mark reading (OMR) and data image-scanning and capture from one or both sides of documents that are transported across a scanning station by a mechanical feeding means. More particularly, the present invention relates to an improved optical light-source, digital reading or detecting head apparatus, and the supporting data processing logic to accurately and consistently calibrate the illumination source for the scanning station and/or the image detector such that the true darkness level of pre-printed or manually entered data may be extracted from each scanned document.

BACKGROUND OF THE INVENTION

Optical read head systems (hereinafter referred to as ORHS), that capture information printed, stamped, photographed, photocopied, manually entered, or otherwise placed on either one or both sides of a document surface are well known in the prior art. There are numerous applications, in the field of document scanning—both OMR and image-capture—that require a spectral discrimination capability within the ORHS. For example, a given OMR form may be pre-printed in red ink (e.g., the data-entry marking "bubble" positions, etc.) and the user permitted to enter the data with any marking instrument but red: for example, a lead-pencil and/or black/blue/green ball-point pens or felt-tip markers. Spectral discrimination permits the user marks to be detected while the red ink is not detected.

It will be appreciated that users desire the flexibility to utilize OMR and image-capture forms that may be pre-printed with a wide variety of colored inks, and offer marking entry with a wide range of marking instruments. Accordingly, a sophisticated ORHS must offer the means to quickly and selectively set the spectral parameters to achieve the desired range of data detection and the desired range of pre-printed ink rejection or non-detection.

Prior art ORHS and associated feeding means typically have been configured for only one detection mode; that is, only pencil marks can be detected, or only red ink is not detected, or all data on the form is detected, such as for the general-purpose image-capture systems widely available on the market today.

Some prior art systems offer the option of changing modes, either by manually exchanging the illuminating source in the ORHS (swapping miniature fluorescent lamps, for example), or changing an optical-path filter to shift the relative spectral response of the light-source and/or detector in the ORHS.

Yet other approaches modify the detect/non-detect parameters in the application software in an effort to achieve the selective discrimination discussed earlier. While these approaches accomplish the minimum goal of accommodating a wider range of document designs and applications than would otherwise be possible with a fixed-spectrum design, this flexibility is not necessarily convenient to utilize in a "real world" environment where the downtime to make the necessary changes is costly, and/or requires the services of a field-engineer or other highly-skilled operator on the user's staff.

Furthermore, prior systems have suffered from lack of accuracy in the data-detection process when the detection/discrimination mode is changed frequently, unless great care is taken to calibrate the settings of the light-source, detectors, or signal interpretation logic to recognize and process the different signal-contrast levels that inevitably result when such manual-intervention changes are made to the ORHS configuration. While such calibration may be possible, in most systems calibration is complex and/or time consuming.

Also, existing ORHS's are generally configured to run at a fixed document feeding rate, for example, 3,000 sheets/hour. This fixed feeding rate is often referred to as the maximum pick rate at which sheets can be transported past the ORHS scan-axis, with no regard to throughput degradation due to software-bound latencies, feed jams, or other causes of loss of throughput. The maximum sheets/hour rate is primarily set by the velocity of the sheet as it travels though the feeding mechanism—from the input hopper, through the scan-axis, to the output hopper or shunt stackers.

Prior art scanners run at a fixed velocity rate primarily because changing the rate (not that difficult to accomplish from a mechanism design viewpoint) requires significant adjustment settings to the ORHS. For example, the widely used charge-coupled device (CCD) linear array detectors that form the basis of nearly all image-capture systems detector front ends, require a specific light-source illumination level on the sheet surface for a given sheet velocity.

Image-capture applications, by contrast to OMR, require pixel resolutions ranging from 120 DPI (dots/inch) to 300 DPI, or even higher, depending upon the specific application and quality level of the detected and captured image. An OMR application can take advantage of the higher DPI resolution inherently required in image-capture applications by further improving the detection of weak or mis-registered OMR marks, but the OMR mode does not necessarily require access to all pixels available in the image-capture mode.

It is generally desirable in the image-capture mode to have the DPI equal in both the X and Y directions on the document (e.g., the horizontal "sweep" direction, and the vertical document feed-direction, respectively). Therefore, the higher the resolution, the slower the sheet must travel under the x-direction scan-axis for a given CCD clock rate.

A consequence of this inherent difference in DPI detection resolution requirements for OMR applications versus general purpose image-capture applications is that prior art scanning systems that attempt to offer optimized operation for both OMR and general-purpose image-capture modes fall short in both modes. A traditional OMR design for the ORHS would suffer from lack of DPI resolution in an image-capture mode, since it is optimized to meet the high throughput demands of OMR applications; on the other hand, the higher DPI resolution requirements of an image-capture mode severely limit the sheets/hour throughput capability when reprogrammed to extract OMR data only.

Therefore, customers who have both extensive OMR and image-capture applications are often forced to acquire at least two different prior-art scanning systems to meet their throughput demands, since the "compromised" designs of prior-art multiple-mode or mixed-mode systems fail to serve either application mode sufficiently well.

The present invention offers an ORHS solution for incorporation into any scanning document feeding means that can automatically and quickly switch back and forth between OMR and image-capture modes (e.g, user programmable), and scan the respective documents at different sheet velocities under the scan-axis to optimize performance in either mode.

The present invention also offers an ORHS that enables a user to automatically select a desired spectral range for detection of the desired marks or images while rejecting certain pre-printed inks on the forms.

The present invention further provides an ORHS that automatically adjusts, stabilizes, and monitors the output of the ORHS such that accurate data extraction is possible over prolonged periods of time without operator attention or intervention.

Additional advantages and novel features of the invention will be set forth in part in the description that follows, and in part will become apparent to those skilled in the art upon examination of the following.

SUMMARY OF THE INVENTION

The present invention involves a method for calibrating an optical reading head system's pixel output, where the pixel output comprises a discrete value for each of a plurality of pixels and the system comprises (1) a scanning station with an associated plurality of light sources, and (2) a detector having an array of photosensitive sites that sense light reflected from the scanning station during a detector exposure period. The sensed light is utilized to generate a pixel output profile. The method comprises: supplying at the scanning station calibration media having a calibration region; defining for the system with respect to the calibration region a target pixel output profile; illuminating the calibration region with the light sources to generate a pixel output profile of the calibration region; and adjusting the amount of light energy available to the photosensitive sites during a detector exposure period until the pixel output profile of the calibration region is acceptably within range of the target pixel output profile.

BRIEF DESCRIPTION OF THE DRAWINGS

FIG. 5A is a cut-away, simplified top view of a scanning station in an ORHS according to the present invention having a wide exposure region and an embodiment of an error-detect line, with no document present for scanning.

FIG. 5B is a cut-away, simplified top view of a scanning station in an ORHS according to the present invention with a document present for scanning.

FIG. 5C is a cut-away, simplified top view of a scanning station in an ORHS having a reduced exposure region.

FIG. 34 is a schematic diagram showing the mapping relationship between LEDs in a light source bank and associated pixel elements in the CCD detector element. The length of photosensitive array 230a is exaggerated relative to the length of LED bank 40a and the width of document 12 to show the mapping between LEDs and pixels in array 230a.

FIG. 35 is a schematic drawing of a scannable document that is partitioned into different areas preprinted or marked with different colored inks.

DETAILED DESCRIPTION OF THE PREFERRED EMBODIMENT

A. Optical Reading Head System—General Overview

Figure 1:
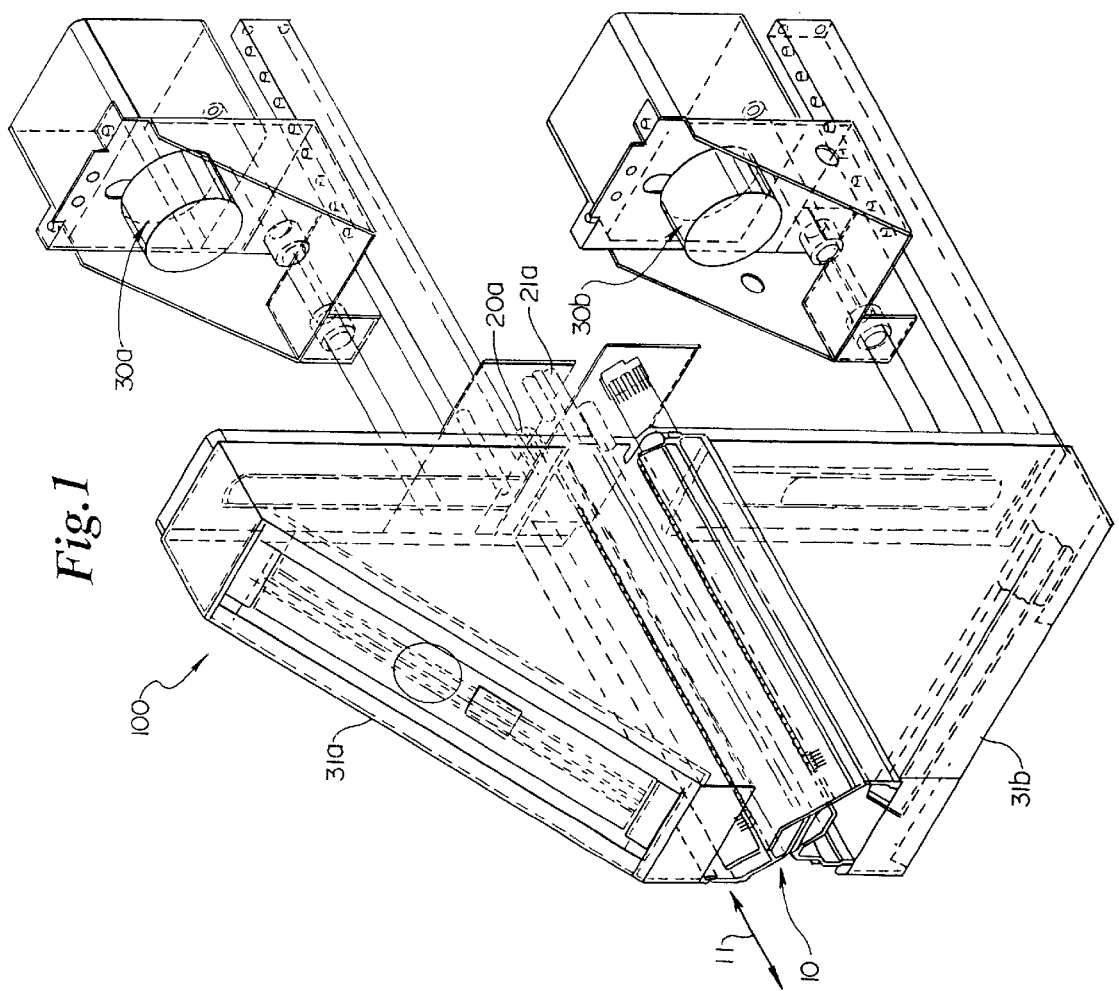
FIG. 1 is a perspective view of an optical reading head system scanning station.
Figure 2:
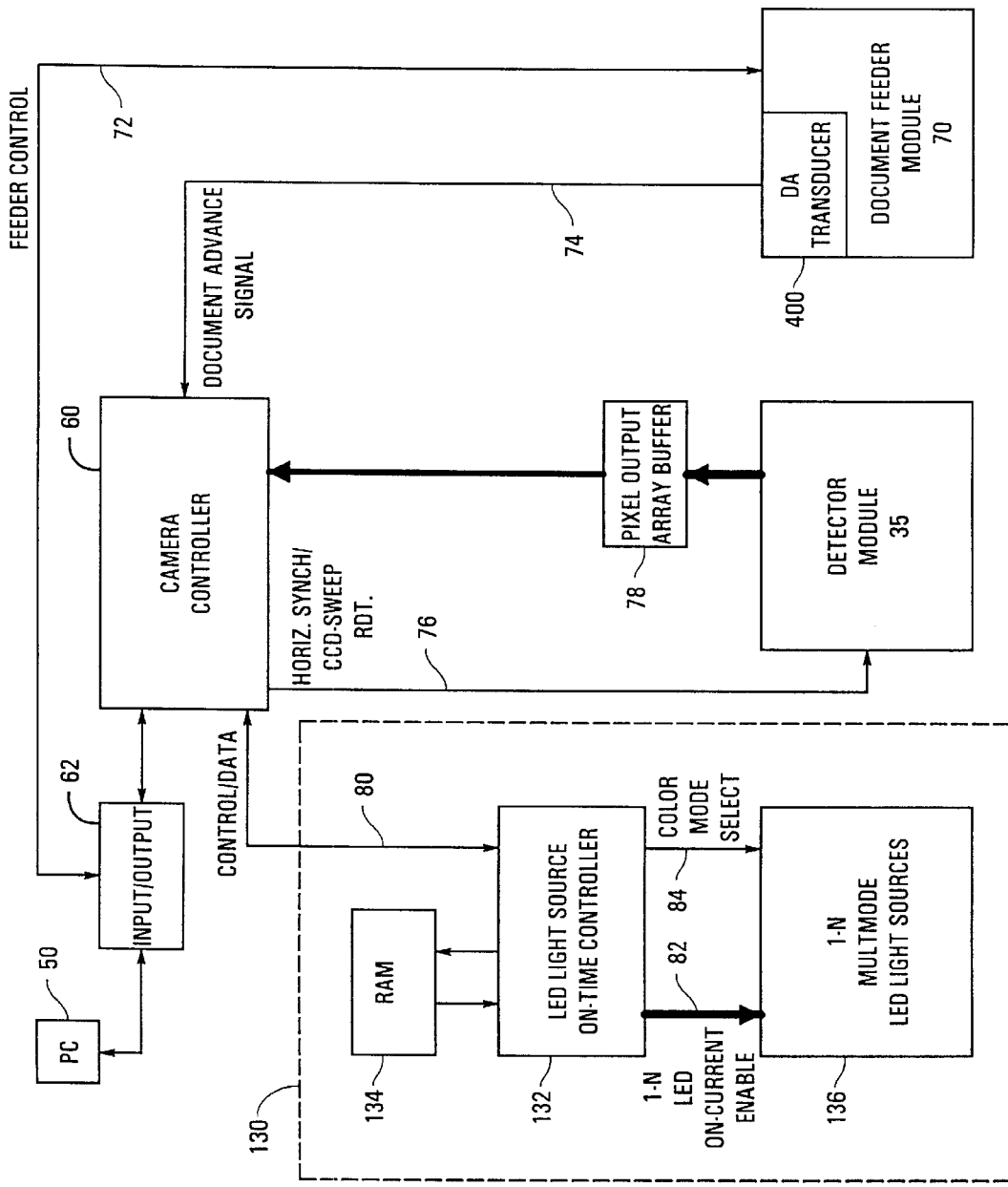
FIG. 2 is a block diagram of a control system for an ORHS according to the present invention.
Figure 3:
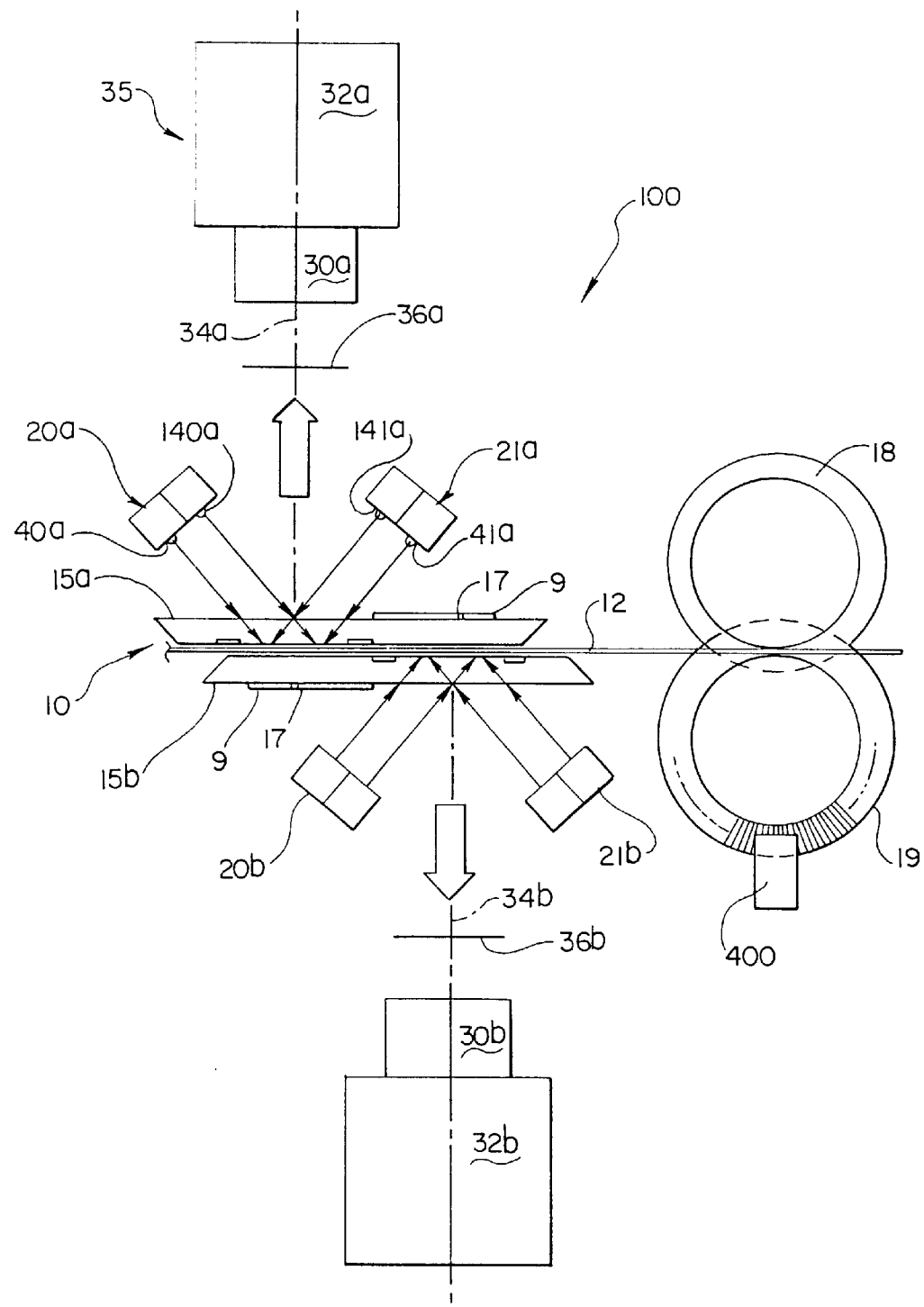
FIG. 3 is a cross-sectional, schematical representation of an embodiment of an ORHS according to the present invention.

With reference to FIGS. 1 to 4 and 5A–5F, in pertinent part, the optical reading head system (ORHS) 100 of the type contemplated for the present invention generally includes a planar scanning station 10 through which a scanned document (or other sheet of media) 12 can be transported, one or more illumination strips 20a, 21a above the plane of the scanning station 10 (as seen in FIG. 3), a detector module 35, which includes a camera 30a, above the plane of the scanning station 10, and associated control/logic circuitry 32a. As seen in FIG. 1, a mirror assembly 31a is used to bring the image formed at the upper side of the scanning station 10 to the detector camera 30a.

Because many scanning applications require scanning of both sides of the document 12, below the plane of the scanning station 10 there is a symmetrically constructed configuration consisting of illumination strips 20b, 21b, detector camera 30b, mirror assembly 31b, and associated control/logic circuitry 32b. Because operations above and below the plane of the scanning station 10 are essentially identical (except for a slight relative displacement of the central viewing axes 34a, 34b of cameras 30a, 30b, the following discussion will be primarily with reference only to structures and operations above the plane of scanning station 10.

Figure 29:
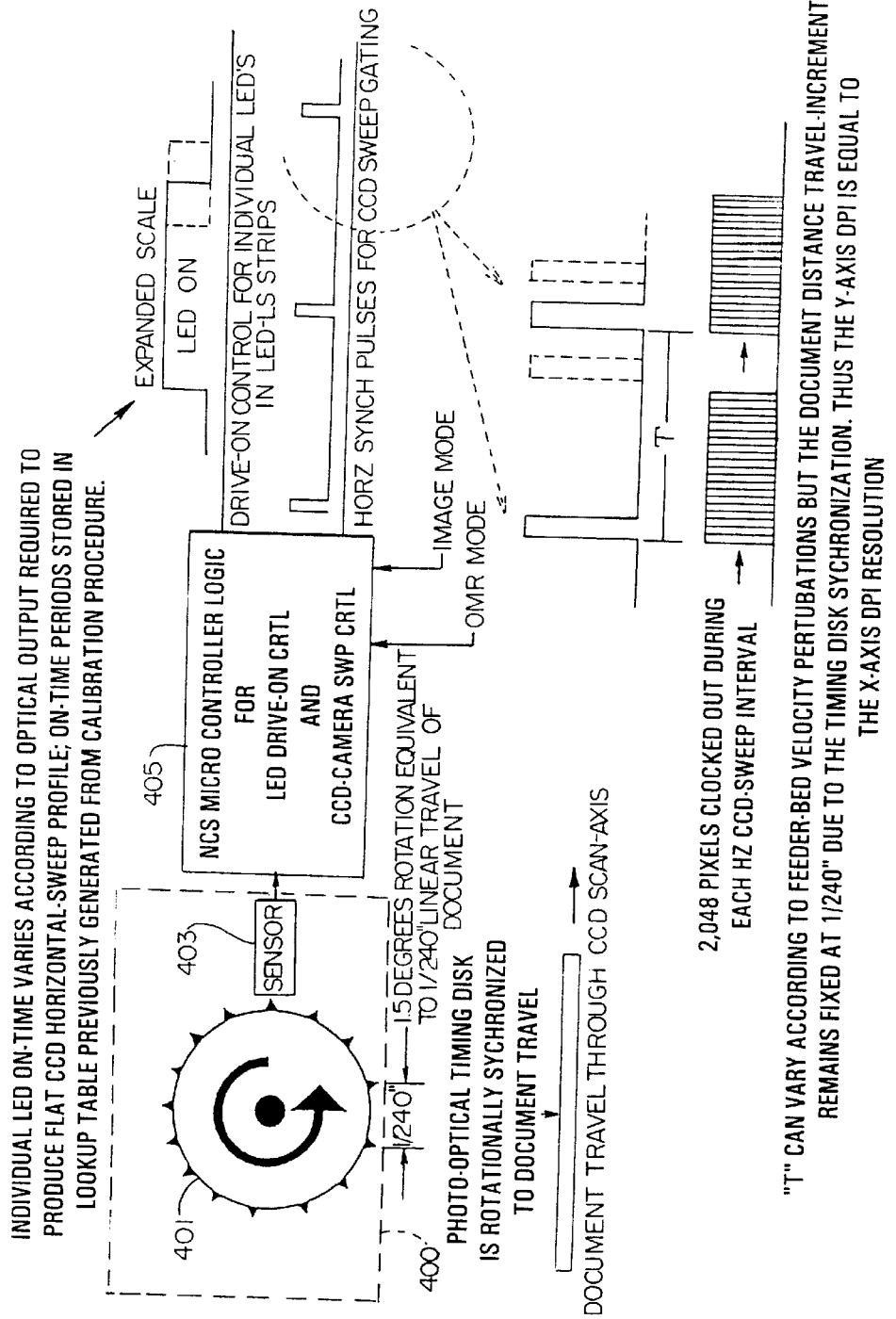
FIG. 29 is a combination schematic/timing diagram of a document feed timing scheme for an ORHS according to the present invention.

The document 12 to be scanned is transported through the scanning station 10 in the direction of the Y-axis (toward the left side of FIG. 3) by a feed roller 18, which is part of a document feeder module 70 (FIG. 2). A passive guide roller 19, which is in contact with the fed document 12, rotates as the document 12 passes through the station 10. A document advancement transducer 400 tracks the document's advancement and communicates this information to a camera controller processor 60 (FIG. 2). The document advancement transducer 400 preferably consists of a sensor 403 and a timing disc 401 that is rotatably connected to the guide roller 19, as shown in FIG. 29. However, any transducer capable of tracking document advancement to the precision of a pixel line will suffice for purposes of the present invention.

In the preferred embodiment, the scanning station 10 is formed by two planar sheets of glass 15a, 15b placed parallel to each other and separated by a small throat gap. The scanning station 10 includes an exposure region 14, which is illuminated by the illumination strips 20a, 21a. The detector camera 30a has an array 230a of photosensitive sites 232a and a reduction lens 36a to direct light from the portions of document 12 present in the exposure region 14. These elements are aligned with respect to the scanning station 10 such that the photosensitive array 230a is focussed on the exposure region 14. Thus, light supplied to the exposure region 14 is reflected onto the photosensitive array 230a. (Note that the depicted array of photosensitive sites is two-dimensional. However, the term "array" as used in this specification, includes arrays having a single, as well as multiple lines, of photosensitive sites.)

The detector camera 30a utilizes the sensed light to generate a pixel output map of the image region 16, which is a portion of the exposure region 14, as shown in FIGS. 5A and 5B. Cameras suitable for use in the present invention capture one or more "lines" of pixels, i.e., thin image strips, one pixel in width, that extend across the scanning station 10 in the X-axis direction. A typical pixel line consists of 512, 1024 or 2048 pixels. The output corresponding to one pixel line therefore consists of 512, 1024 or 2048 discrete values on a darkness scale. That scale may be 1, 2, 4, 8 or more bits, i.e., 2, 4, 16, or 256 darkness levels. Note that in some embodiments, the image region may be the same as the exposure region, as is shown in FIG. 5C. This would be the case for a line scan detector camera having a single line of photosensitive sites.

In the preferred embodiment, the detector camera 30a is an area scan, time domain integration (TDI) type charge-coupled device (CCD) camera such as the Model CL-E2 available from Dalsa, Inc. of Waterloo, Ontario, Canada. As seen best in FIG. 5D, in this camera, there are 2048 detection elements in each pixel line ($1_1$, $1_2$, $1_3$, etc.) and 96 adjacent lines ($1_1$ through $1_{96}$). As described more fully in "CCD Image Sensor and Cameras" (Dalsa, Inc. 1993) each pixel line receives photons reflected from a corresponding pixel line on document 12 and accumulates charge. The charge is passed from the first line $1_1$ to the second line $1_2$, etc., to the 96th line $1_{96}$, from which the accumulated charge of each of the detection elements is captured as a pixel output profile consisting of 2048 separate 8-bit values stored in a pixel output array buffer 78. With appropriate timing for illumination transport and detection as described by the camera manufacturer, the camera pixel output profile at $1_{96}$ represents an image line that is the integrated result of 96 exposures of the single line on the transported scanned document 12 that is located in the image region 16 after the 96 exposures. Each of the 96 exposures is taken as the pixel line to be imaged enters and then is transported across the exposure region 14. The integration of the 96 exposures permits the scanning to occur with much less illumination than if only a single exposure were taken.

Each of the consecutive image lines produced by the camera 32a and output to buffer 78 is stored downstream by processor (PC) 50 to form a "frame," constituting a pixel output image or map of the scanned document 12 or a selected portion that has passed through the exposure region 14. A primary focus of this invention is that the captured pixel image is a highly accurate or "true" representation of the lightness or darkness of the individual locations on the scanned document 12 corresponding to each of the pixels in a pixel output profile. As is well known, the quality of any image used without further processing or any OMR data, bar code data or other data derived from a pixel image, is highly dependent on the accuracy of the original pixel capture.

Figure 4:
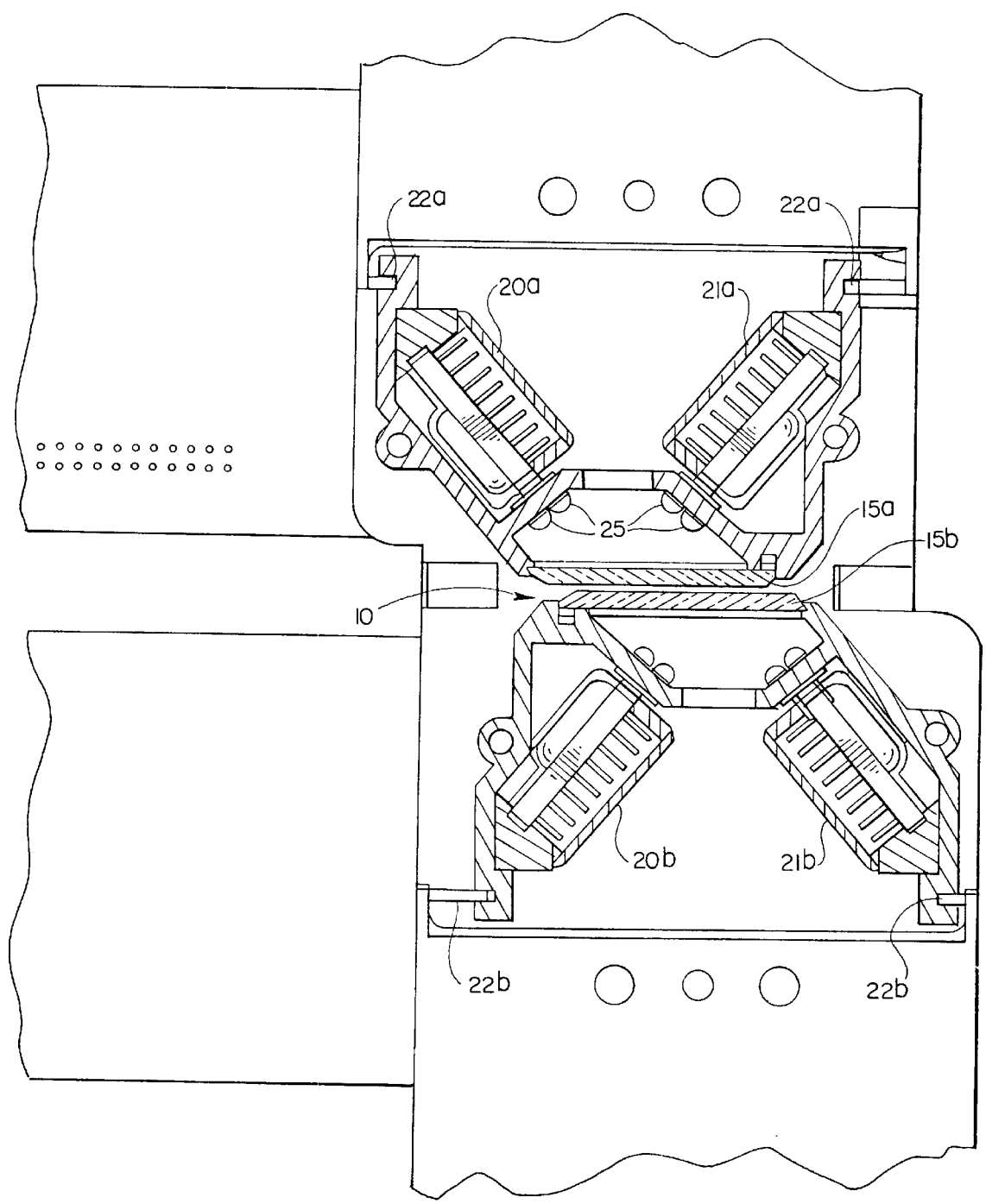
FIG. 4 is a cross-sectional detail view of the scanning station and illumination LED's in an embodiment of the present invention.

As depicted in FIGS. 1, 3, and 4, each illumination strip 20a, 21a preferably comprises a plurality of individually controllable light sources 25. In particular, the depicted illumination strips 20a, 21a are comprised of multiple lines (LED-LS strips) 40a, 140a, 41a, 141a of light emitting diodes (LEDs) 25. A spectral illumination bank consists of a pair of lines 40a, 41a, one line 41a located on the "upstream" side of the exposure region, and the other strip 40a located on the "downstream" side of the exposure region. The two strips 40a, 41a comprising a spectral illumination bank generate a user-selected spectral output. A separate illumination bank offering a different spectral output is formed by lines 140a, 141a. (In an alternative embodiment, LED types can be mixed within a single line, such as 40*a,* to provide light that is a mix of pre-selected spectral outputs.)

The ORHS, as shown in FIG. 2, also includes processing and control circuitry for processing and controlling overall system operations. As will be described, this processing and control circuitry is used to calibrate the system to reduce error from a number of sources that may interfere with the ORHS' ability to detect the "true" darkness level of data on a scanned document 12.

The processing and control circuitry is built around a camera controller processor 60, which may be any sufficiently fast microprocessor such as a Model PIC17C42-25 operating at a clock speed of 25 MHz. available from Microchip Technology, Inc. of Chandler, Ariz. The processor 60 has a communication and control relationship with an overall system processor 50 (which in the preferred embodiment is implemented by a personal computer) through input-output interface 62. The system processor 50 also communicates with and controls a document feeder module 70 via feeder control signals on line 72. The camera controller processor 60 communicates with the document feeder module 70, specifically, the feeder module's document advancement (DA) transducer 400 to receive document advanced signals on line 74. The processor 60 also has a communication and control relationship with the detector module 35, which receives from the processor 60 horizontal sweep synchronization and CCD sweep readout clock pulses through lines 76 and sends to the camera controller 60 the contents of the pixel output (e.g., 2048 pixel values) for the preceding X-axis sweep, which are clocked through a pixel output array buffer 78.

The processor 60 also sends and receives on line 80 control signals and data to/from the illumination controller 130, which controls the power supplied to opposed pairs of LED's in the several spectral illumination banks 136, as will be explained in greater detail below. The spectral illumination banks 136 receive on-current enable signals over a bus 82 and color mode select signals on line 84. These signals are produced by the LED light source on-time control 132, which communicates with RAM 134 in which tables or other data structures resulting from system configuration and calibration are stored. The line 80 carries control and data signals from the camera controller 60 to the LED light source on-time control 132.

Figure 16:
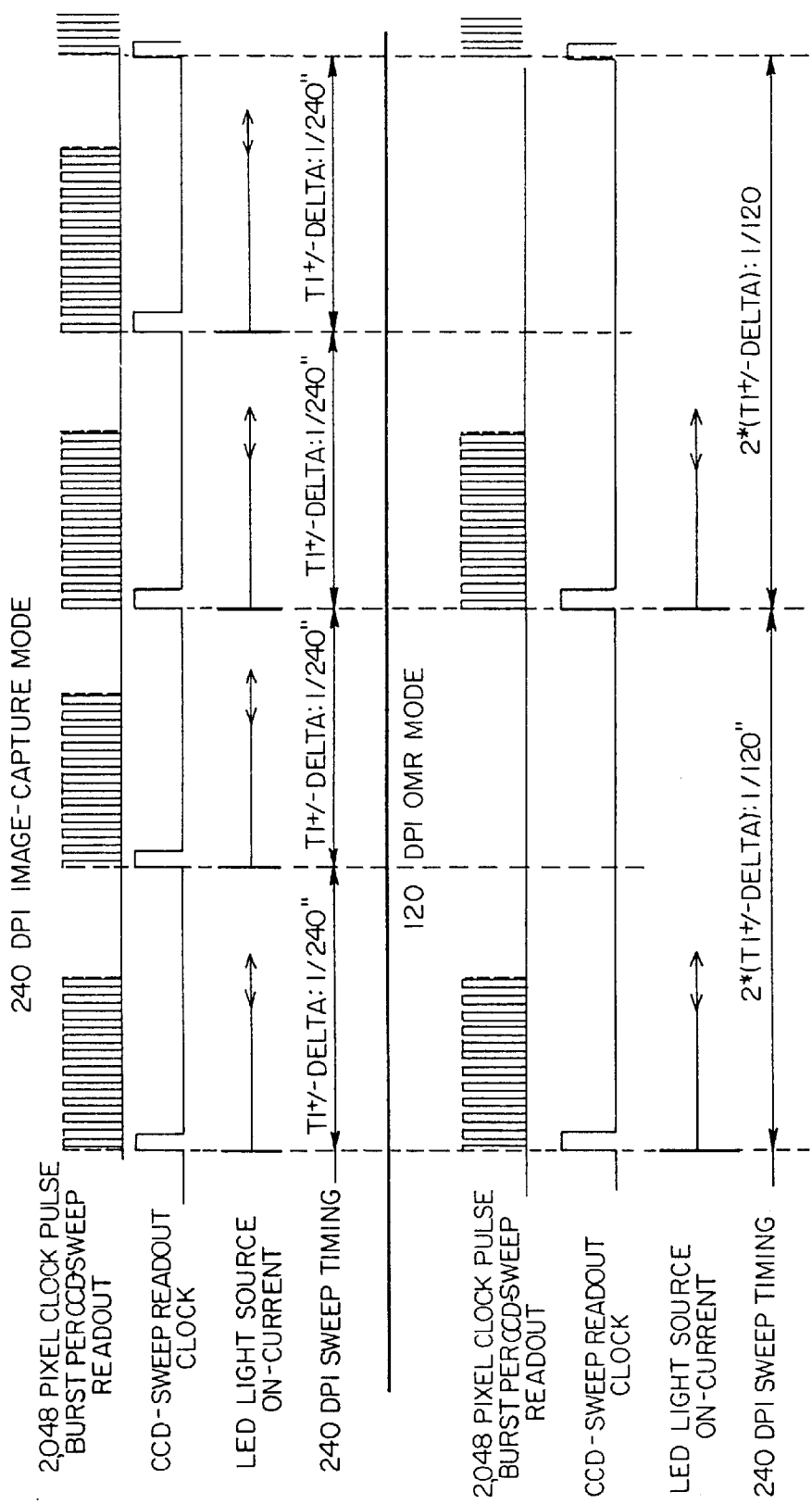
FIG. 16 is a timing diagram of various ORHS control signals for both the OMR and image-capture modes.
Figure 17:
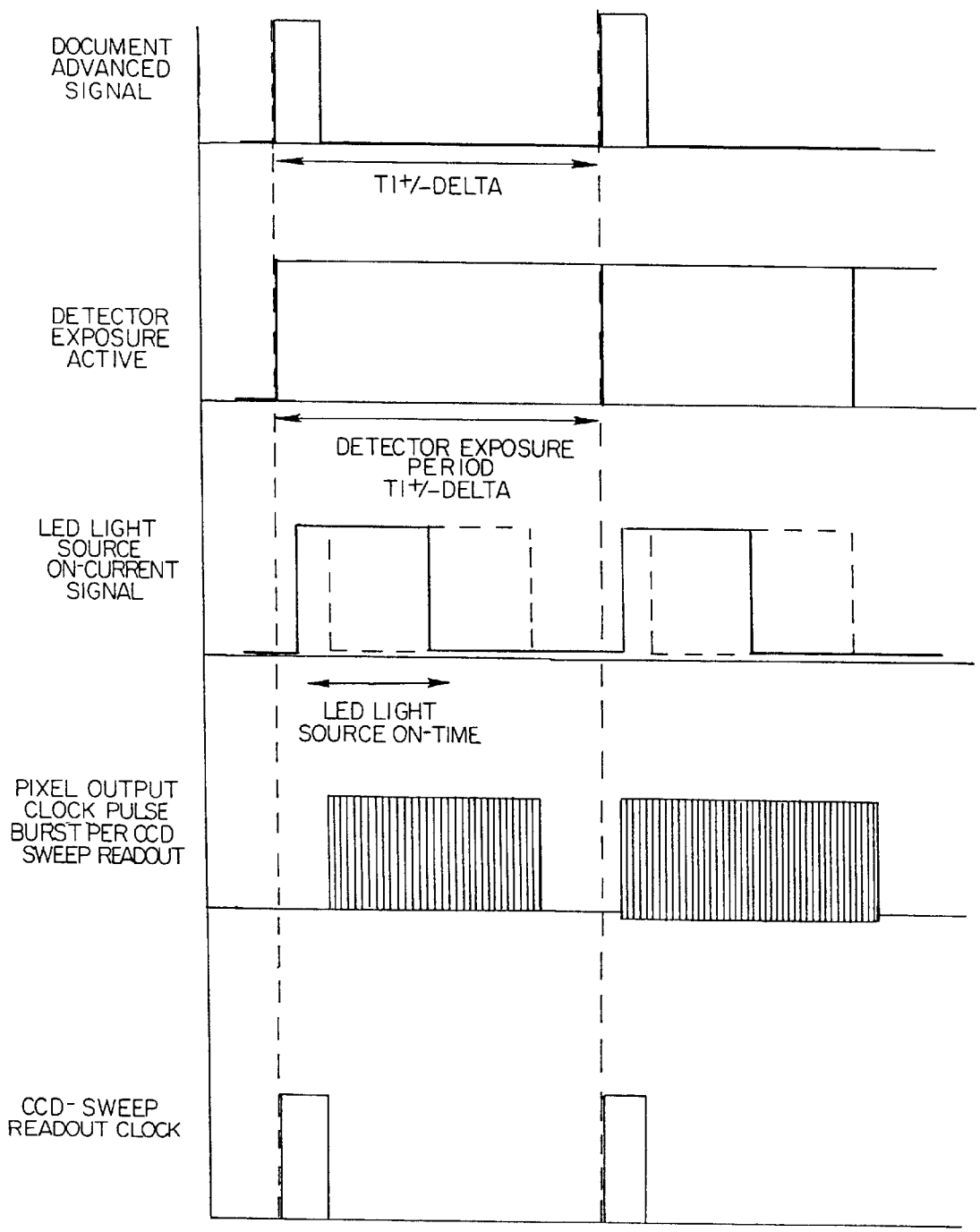
FIG. 17 a timing diagram for various ORHS control signals.

FIGS. 16 and 17 show timing diagrams for several signals that are part of the OMR and image capture operations in an ORHS according to the present invention. These signals include the Document Advanced Signal, which indicates that a document 12 has advanced along the y-axis a distance equal to the width of one pixel line (e.g., 1/240" in an image-capture mode); the CCD Sweep Readout Clock, which initiates a pixel output burst for each horizontal (X-axis) sweep; the LED Light Source On-Current Signal (which is variable in duration, as will be described); and the duration of a sweep or exposure period (Detector Exposure Active), when the scanned document 12 is transported at a rate that yields 240 dpi pixel density in the y-direction. FIG. 17 in particular shows the relationship between a Document Advanced Signal, the Detector Exposure Active signal for initiating a "new" exposure or horizontal sweep in the detector camera 30*a,* the On-Current Signal for a typical LED and the Pixel Output Clock Pulse Burst. The Document Advanced Signal (or pulse) effectively controls the other signals that are depicted in FIG. 17. It causes the detector exposure period to end (thereby terminating an X-axis sweep) and in turn, initiates a new detector exposure period for the next X-axis sweep. It also causes the detector camera to clock out to the pixel output array buffer 78 the pixel output values from the previously terminated sweep. Thus, detector exposure periods are equal to the elapsed time intervals between two consecutive Document Advanced Signal pulses. Because a Document Advanced Signal is generated when the document has advanced along the Y-axis a pixel line width, the value of a Detector Exposure Active Period varies somewhat with document advancement speed fluctuations.

The interpretation of the LED on-current times ("on-times") in FIGS. 16 and 17 is that during a given detector exposure period (i.e., when the charge accumulates in all 2,048 pixel "buckets" in a line prior to readout) the individual LED's 25. in the LED-LS strips 40*a,* 41*a,* 140*a,* 141*a* have varying on-time periods, set according to a pre-loaded lookup table, so as to achieve a calibrated pixel output (e.g., a "flat" uniform CCD profile for all 2,048 pixels in response to a "flat" calibration sheet). The procedure for obtaining the lookup table values for drive current on-times is described below.

B. Optical Path Error Compensation

As stated above, a primary goal of the present invention is capture of a pixel image that accurately represents the "true" lightness or darkness of the individual pixel locations of the scanned document 12. To accomplish this, calibration is required. The discussion that follows explains the optical and electronic error environment in which the desired calibration occurs.

1. The Idealized System

Figure 6:
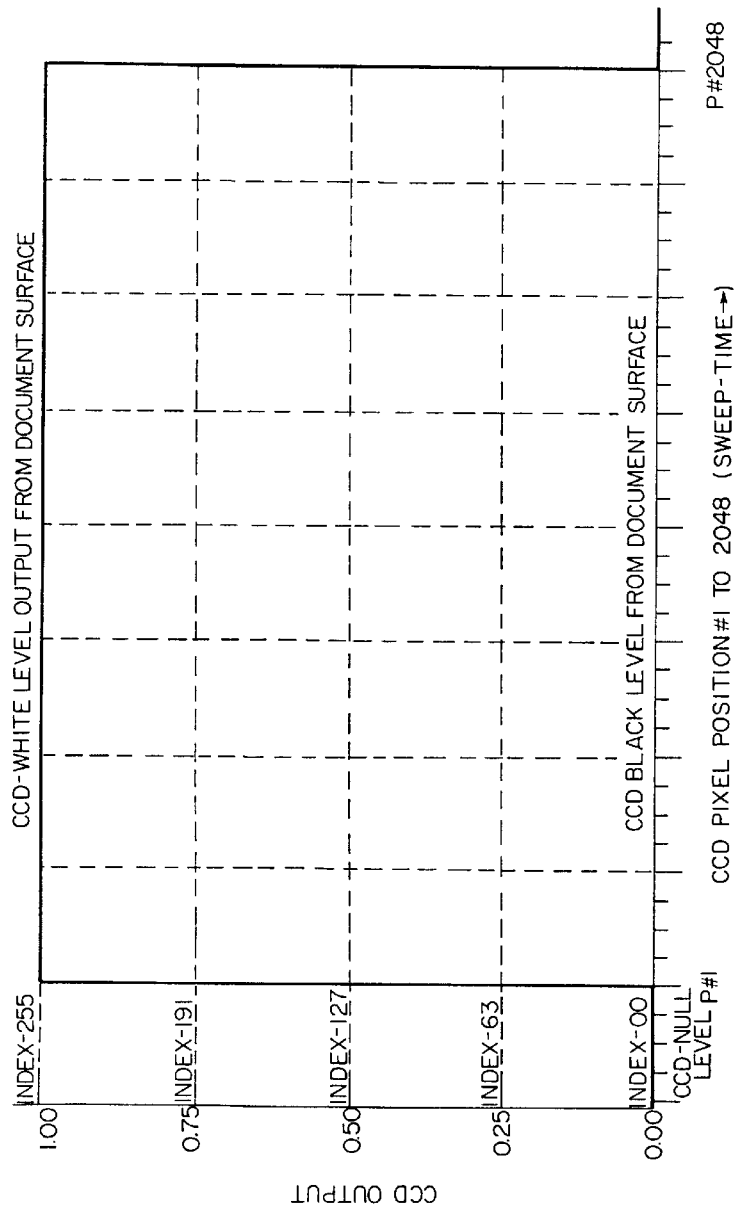
FIG. 6 is a pixel output profile of a "white" calibration sheet for an idealized ORHS.

The idealized CCD-array detector pixel output profile resulting from a single horizontal sweep across a "blank" scanned document 12 (e.g., a calibration sheet having a reasonably homogeneous, unmarked surface, with respect to its reflectivity) is shown in FIG. 6. In the example, the preferred embodiment of a CCD-array detector length of 2,048 pixels is shown.

Since an idealized output is shown, the output for all pixels is the same, resulting in a "flat" or "perfect pixel" output profile, with no deviations along the sweep length.

In actual operation of the ORHS, there is a brief CCD-NULL time interval (dwell time) between successive sweeps when the individual pixel voltages are not being clocked out, and hence there is no output voltage generated at that time for an ideal configuration. This output in this interval is represented on FIG. 6 as CCD-NULL LEVEL.

Also shown in FIG. 6 as a scale on the ordinate-axis are index levels from INDEX-00 at the 0.00 level (NULL-LEVEL) to INDEX-255 at the 1.00 level. These index levels represent the equivalent 8-bit digital grayscale levels between the limits of the "full white" level of 255 and the "total black" level of 00. While a fewer or greater number of grayscale levels can be quantized in the A/D (analog-to-digital) converter of an ORHS from the CCD-array detector analog output voltage, eight bits (one byte) per pixel are shown in FIG. 6 as the preferred embodiment. Also, it is feasible to reduce the number of grayscale levels in post-capture processes; the lower limit being a twotone BLACK/WHITE (0/1 binary) image.

The number of grayscale levels generated by the ORHS is referred to as the dynamic range of the image-capture process. Thus, for an 8-bit system per pixel, the idealized dynamic range for data representation is 256; from 00 representing a pure black level (no reflected light from the paper surface) to 255 representing the maximum white-level. In actual practice, a given ORHS may not deliver a full 256 levels of usable data to the application software.

Figure 7:
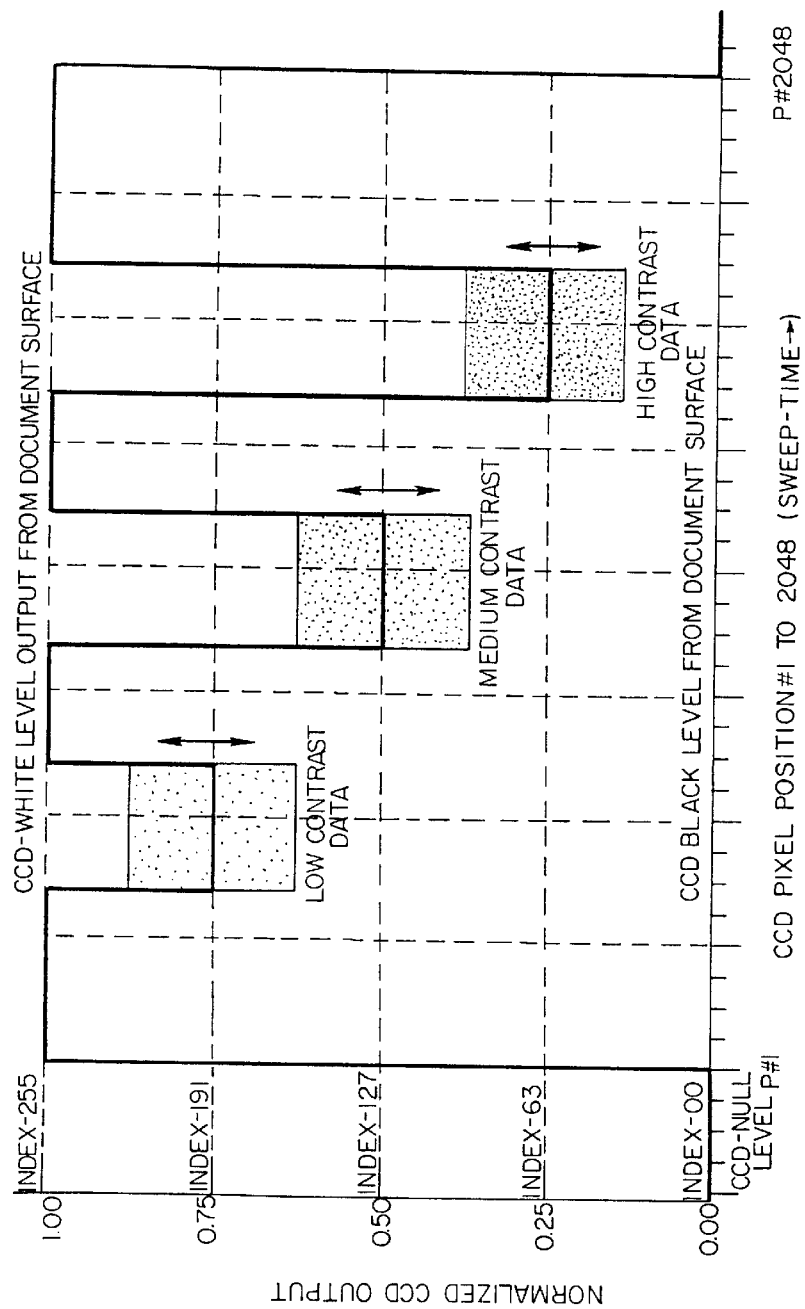
FIG. 7 represents an extension of the previous FIG. 6 showing the appearance of data in the detector pixel output profile.

While an individual pixel or a cluster of contiguous pixels may have any index value from 00 to 255—depending upon the contrast-level (with respect to white) of the data on the document—FIG. 7 shows only three regions of signals, as examples of typical references: Low, Medium, and High.

While this grouping is somewhat arbitrary, Low level signals generally fall within the 0 to 25% contrast range (down from white), Medium level signals generally are defined as those that center about the 50% contrast level, and Black level signals are generally defined as those that are in the 75% and higher range.

Even the darkest pencil marks will not reach the 100% contrast level (00 index level). A hole in the document will reach this level, however, assuming the reflectance level of the throat gap opposite the document surface in the ORHS is nominally zero.

In the example shown, the L-level signal begins at pixel 384 and is 256 pixels wide, ending at pixel 640. The M-level signal begins at 896 and is 256 pixels wide, ending at 1,152. The H-level begins at 1,408 and is 256 pixels wide, ending at 1,664. The equivalent document horizontal physical-length of these signals (generated from pencil lines or darkened areas, for example) is 256/2,048*8.5"=1.0625", assuming the ORHS optics are designed for an 8.5" field-of-view.

2. The Non-Idealized System

The "raw" signal generated from scanning a document 12 with a detector camera 30*a* (e.g., linear CCD-array detector camera) is typically not directly suitable for extraction of the data contained within the document. This is because there are a number of optical and electronic analog/digital artifacts within the ORHS "front end" that must be either removed or compensated for before the document data may be extracted in "true" form. The present invention primarily focuses upon the latter option of compensating for these artifacts. In addition, non-uniformities associated with the scanned surface of the document 12 contribute to an overall non-ideal pixel output profile for the optical scanning device or ORHS. However, the compensation or "calibration" scheme of the present invention assumes the scanned surface of document 12 to be ideal (i.e., the calibration scheme operates to compensate for the errors resulting from the detector camera 30*a*, the illumination strips 20*a*, 21*a* and the ORHS optics, apart from those errors introduced by the non-ideal scanned document surface). The various artifacts requiring compensation are discussed next.

a. ORHS Component Artifacts (i) Detector Error

The CCD photosensitive integrated-circuit chips embedded in a complete CCD-array detector camera module cannot be manufactured perfectly, that is, without the presence of some pixel-to-pixel flaws in gain uniformity. This non-uniformity is known as the PNUR, or Pixel Non-Uniformity Ratio, and refers to the highest departure from a perfectly uniform ratio of 1.0. Depending upon the particular chip, the PNUR can deviate approximately 10 percent from the unity value of 1.0.

Secondly, in a TDI type detector as used in the preferred embodiment, there is always a minute amount of electron-charge loss from pixel storage-well to storage-well as the pixel output profile signal is clock-shifted out across the CCD-array detector length. That is, if the accumulated charge during the detector exposure period is a normalized 1.0 value for pixel #N, this level, ideally, must be transferred without loss to the #(N−1) storage-well "bucket" shift-register, then to bucket #(N−2) without loss, then to #(N−3), and so on, until each successive pixel output level arrives at the output terminals of the CCD-array detector, with pixel #N arriving last.

Assuming the storage transfer efficiency of the CCD-array detector is e, and the internal-charge in the last pixel, #N (with respect to the shift direction), is c, and the CCD-array detector length is N, then the final output charge level for pixel #N is expressed mathematically as $C_{p\#1}=Ce^N$ an example, assume the charge-transfer efficiency, e, is 0.99998; the CCD-array detector length, N, is 2,048 pixels, and the normalized pixel #N charge level is 1.0. Thus, the pixel #N charge output level, when clocked across the array shift register, is $C_{p\#1}$=(1.0)0.999982,048=0.96. Clearly, the charge-transfer efficiency must be extremely high to avoid significant droop in the profile of a non-calibrated pixel output.

Although the inherent signal level generated for each pixel by a CCD-array detector is analog or continuous in nature, this analog level is converted into a digital output code (preferably an 8-bit level value) to be useful in designing the complete ORHS. Accordingly, there is quantization noise generated when this conversion is performed by the A/D (analog-to-digital) converter contained within the ORHS.

With the preferred embodiment of 256 levels, the quantization noise, or output level uncertainty (assuming linear quantization), is only 1/256, or 0.38%, which can normally be ignored in most OMR and image-capture applications.

During the high-speed clocking of the individual pixel outputs to the output terminal of the CCD-array detector, another signal artifact is often introduced, namely, clock noise. This noise manifests itself as what design engineers refer to as "clock hash" or "hash" noise, and occurs for each transition of the clock-pulse train. The transition count is equal to the number of pixels in the CCD-array detector: 2,048 in the preferred embodiment.

Figure 8:
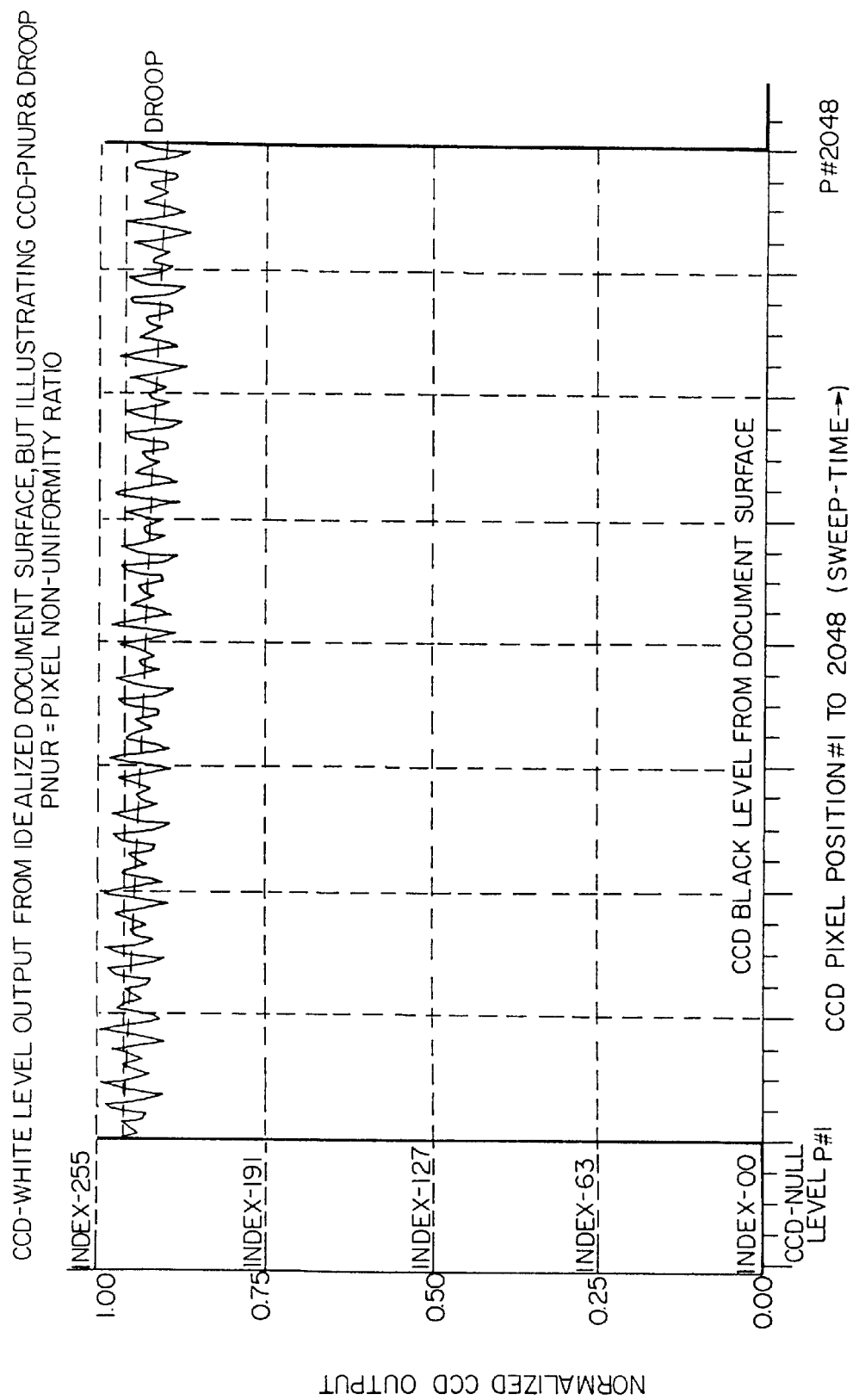
FIG. 8 is a non-idealized pixel output profile of a white calibration sheet.

FIG. 8 illustrates the combined or cumulative error-noise effects of the non-idealized detector output profile signal contributed by the PNUR, charge-efficiency droop, quantization noise, and CCD-clock noise. FIG. 8 probably represents an ordinate-scale exaggeration of these effects in the profile plot line, but the effects cannot be ignored in a practical ORHS design.

A linear CCD-array detector contains a series of contiguous photosensitive sites that convert incoming photons in the NIR (near infra-red), VIS (visible), and UV (ultraviolet) portions of the electromagnetic spectrum into packets of electron charge at each site (hence the name Charge-Coupled Device). Each photosite, or pixel, accumulates and stores the charge during the CCD sweep (detector) exposure period; the amount of charge accumulated is directly proportional to the flux intensity of the incoming photon stream, and the time the photosite is exposed to the incoming radiation. If either the flux level is too high or the exposure period is too long, the CCD photosite capacity to linearly convert the photons to electronic charge is exceeded. This condition is known as "saturation" of the charge-well or photosite.

For the normal linear mode of operation—where saturation is avoided—it can be seen from the above discussion that the accumulated charge (and hence the final output A/D voltage for each pixel) is directly proportional to the product of the incident photon energy level and the exposure time.

Figure 9:
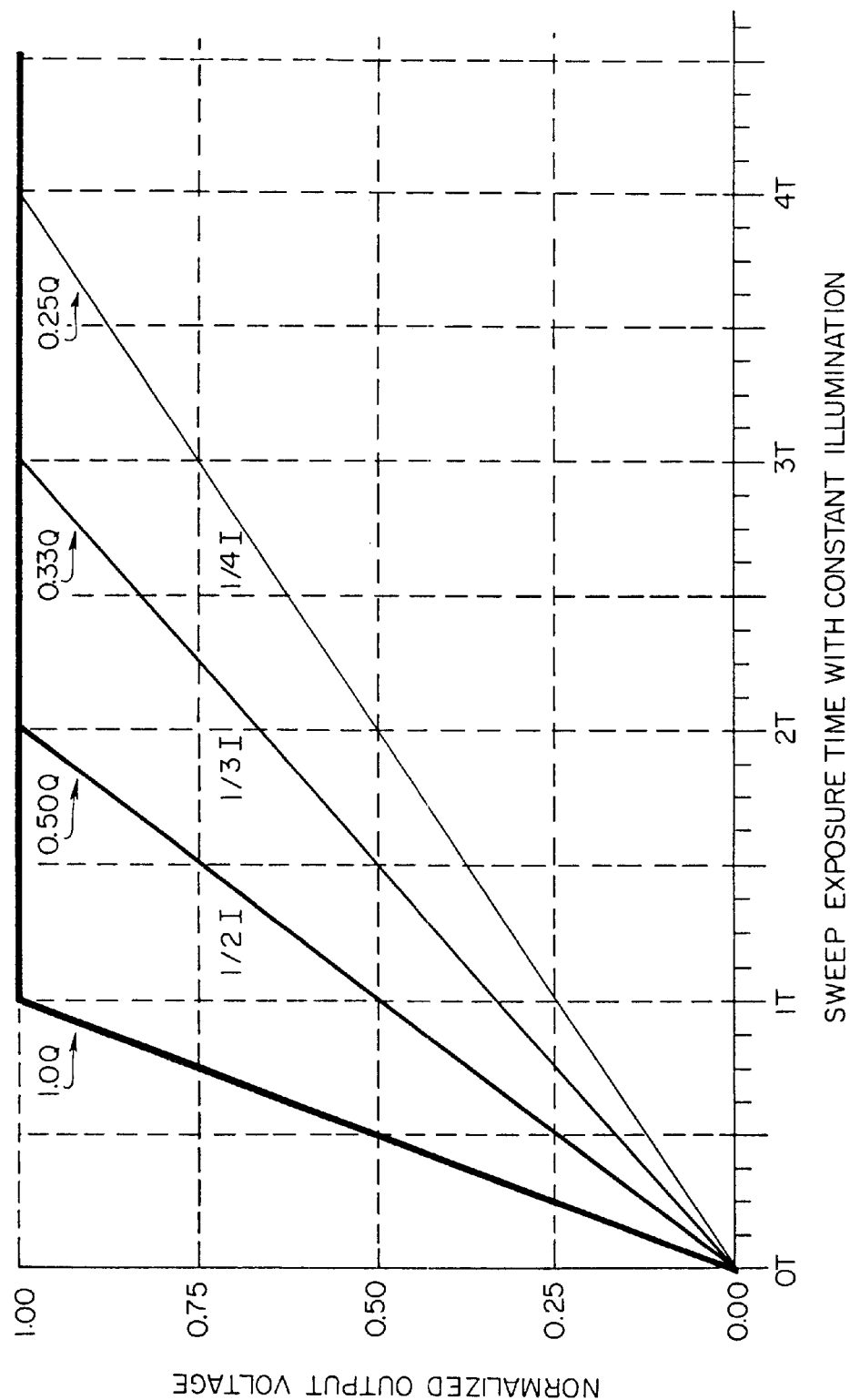
FIG. 9 graphically depicts a detector's pixel charge-response functions for various illumination power levels.

With reference to FIG. 9, if, for example, the incoming photon level (e.g., incident illumination energy level received by the CCD-array detector) is constant during the exposure period, then an illumination level of ½ the full I will take twice as long to reach saturation, an illumination level of ⅓ the full I level will take three times as long to reach saturation, and so on.

In the "real world" document scanning mode, the reflected signal level from the sheet surface is rarely constant during a given CCD sweep exposure interval, but rather will vary as different levels of paper-to-data contrast on the document pass by the scanning axis (or if there is no data, there will be paper-noise variations).

At the end of the sweep exposure period, the charge packets are transferred into a shift register within the CCD-chip which, when clocked with repetitive pulses, shifts out the stream of pixel charges to an output terminal and first converts them into a voltage, then in some cases (for a complete camera module), converts the successive voltage levels into an equivalent digital binary level.

In the preferred embodiment of the present invention, for example, the DALSA Model CL-E2 2,048 linear pixel array camera module generates an 8-bit binary code (256 levels of gray) for each pixel in the array.

The proportional relationship between charge accumulation and exposure time shows why a change in sheet velocity—such as "wow and flutter" short-term variations within a given document scanning cycle—will cause corresponding CCD-array detector amplitude modulations (e.g., grayscale index up-down variations) in the captured image unless special design precautions are taken in the ORHS design to prevent such anomalies.

(ii) Light Supply Error

Figure 10:
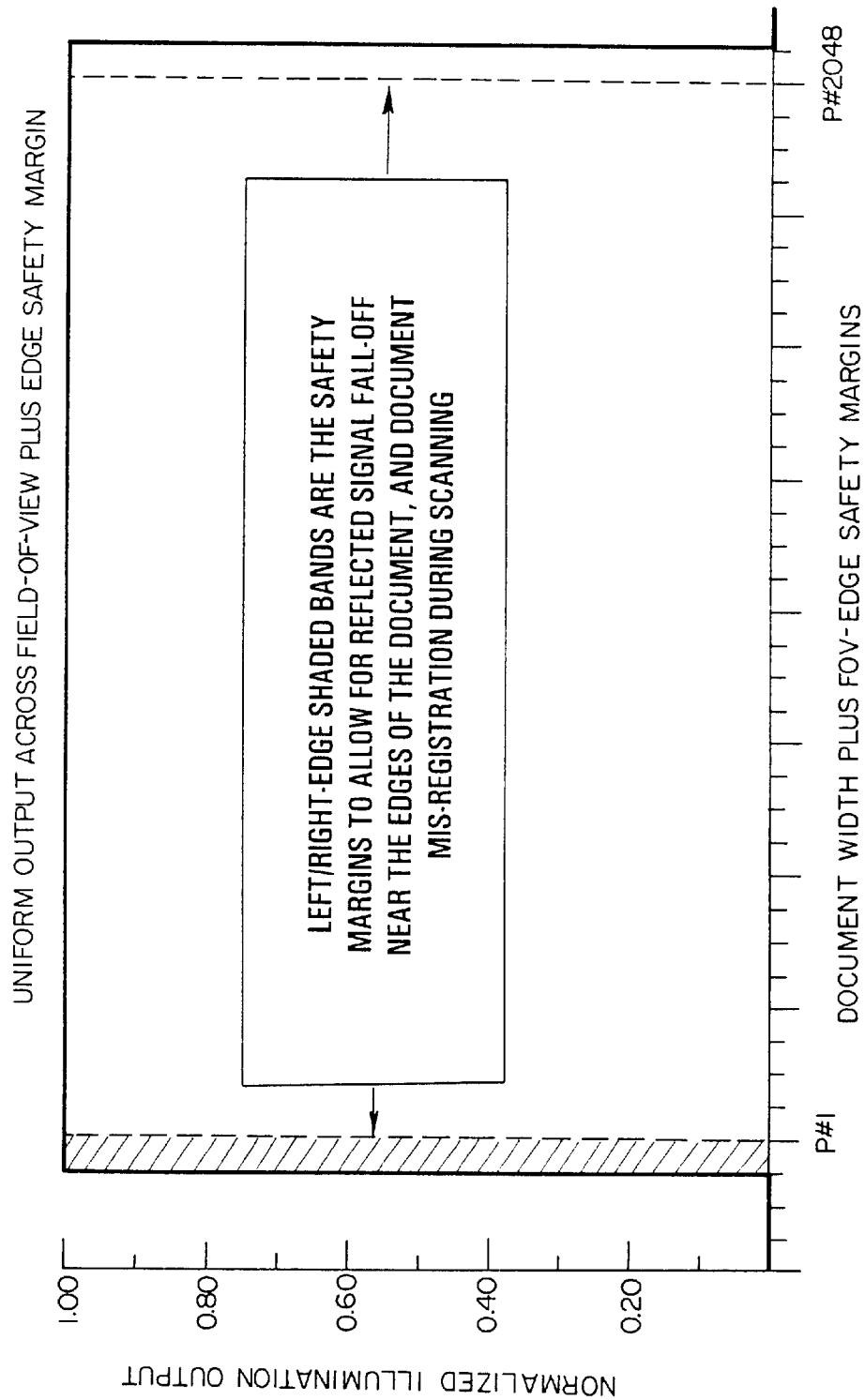
FIG. 10 is an output profile of an idealized ORHS light source.

With reference to FIG. 10, the idealized illumination strip light source for an ORHS is uniform across the entire field-of-view (FOV), which is ordinarily equal to the maximum width of the documents to be scanned: 8.5 inches, for example, for a full-size US Standard page, or slightly less for a metric based A4 document. In some designs, the FOV may be set slightly larger to allow for sideways mis-registration or skew as the document passes by the scanning axis. Furthermore, the illumination strip should have essentially the same output level extending a short distance beyond either the left or right edge of the document, as shown in FIG. 10. These idealized qualities are not fully realized in an illumination strip made up of discrete LED's. This is because the output radiation pattern for each LED in an LED-based light source design is steradial (e.g., conical, with the point of the cone being at the active surface of the LED), and therefore, each point on the document surface along the scanning axis receives illumination from not only the LED directly above it (in the Z-axis), but also to a diminishing extent, from LED's on either side of the point.

The outer-edge extensions of the LED light source (LED-LS) (e.g., illumination banks, 40a, 41a) must be sufficiently long to result in document light energy at the edge of the document essentially equal to the level received in the interior region of the scan-axis. FIG. 10 shows a uniform extension approximately equal to an additional 64 pixels (for the 2,048 CCD-array detector example) on either the left or right side of the document. The actual value in a given ORHS design will vary, depending upon the choice of a number of selectable parameters, such as the specification value of the steradial angle for the particular LED's used, their spacing along the LED strip, the distance the strip is from the document surface, and so on.

Figure 11:
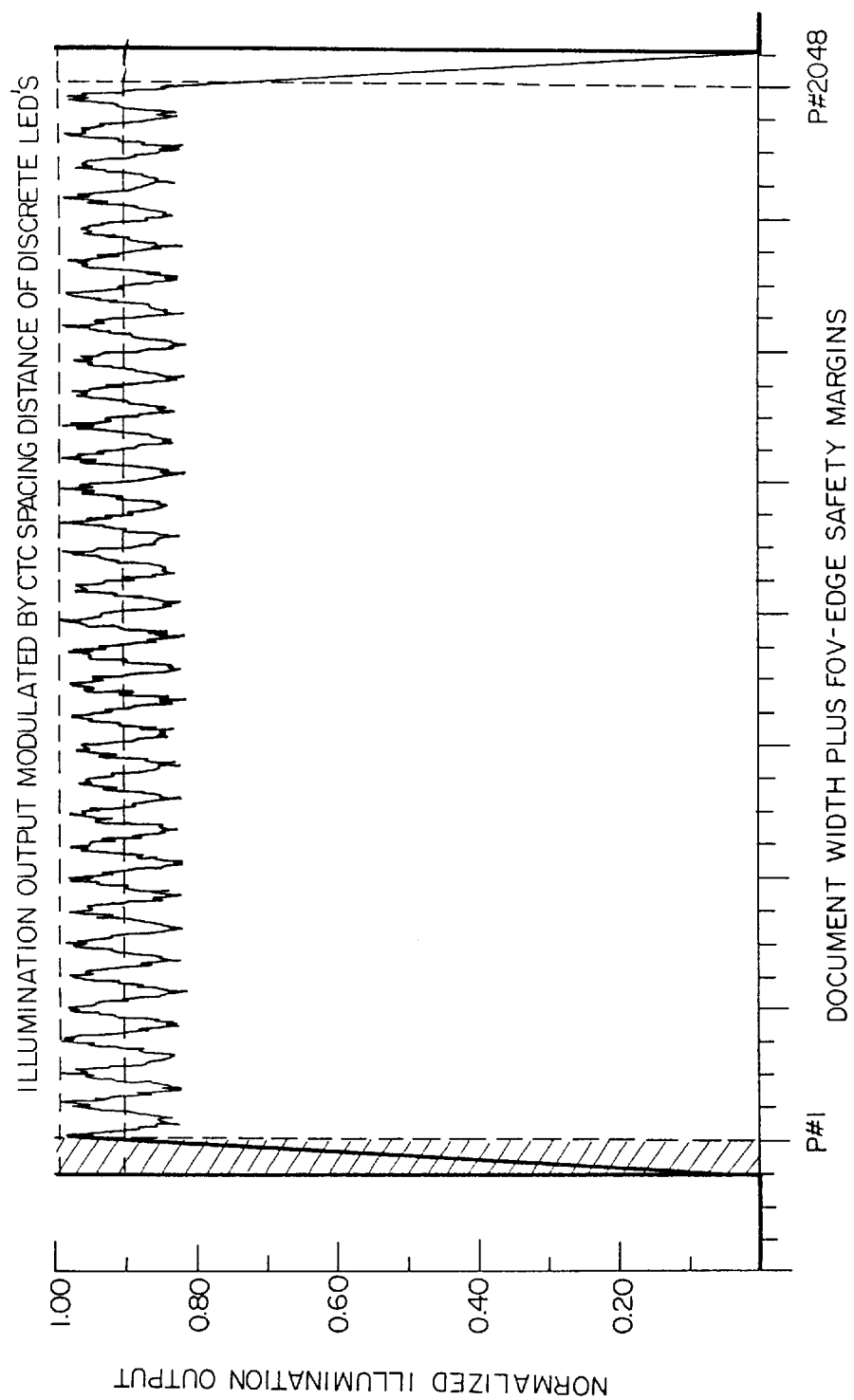
FIG. 11 is an output profile of a non-idealized LED-LS light source.

With reference to FIG. 11, the scan-axis illumination received on the document from an LED-LS is not the idealized profile shown in FIG. 10, but rather has a cyclic, repeating pattern of modulated "ups and downs" as shown by example in FIG. 11. The modulated, or wavy pattern, is caused by the fact that the individual (e.g., discrete) LED encapsulated components, or alternatively, PCB (printed circuit board) surface-mounted LED dies, cannot be physically mounted on the PCB carrier strip sufficiently close together such that their photoactive radiation-emitting surfaces are contiguous along the X-direction scanning axis.

Therefore, the emitted radiation impinging upon the document directly along an LED principal-axis is higher than at points on the document between any two successive LED's. Accordingly, it follows that the reflected signal from the sheet surface of the document to the CCD-array detector will also be higher at the periodic points along the CCD scan-axis that directly align with the principal-axis radiation points of the multiple LED units comprising the LED-LS strip.

The peak-to-peak modulation amplitude, or magnitude of the variations, and the spatial frequency of this pattern, will depend upon the CTC (center-to-center) spacing of the individual LED's along the PCB carrier strip, their steradial cone radiation pattern (specified as the half-angle half-power figure), the distance the PCB carrier is mounted from the sheet surface (along the Z-axis), and the incidence-angle that the LED-LS strip is mounted relative to the principal plane of the Z-axis.

(iii) Optical Error

Even if all of the preceding error artifacts were removed, resulting in a hypothetical "best case" ORHS design, there would yet be remaining constraints to prevent a final idealized signal (FIG. 7) from being generated at the CCD-array detector output buffer 78.

Figure 12:
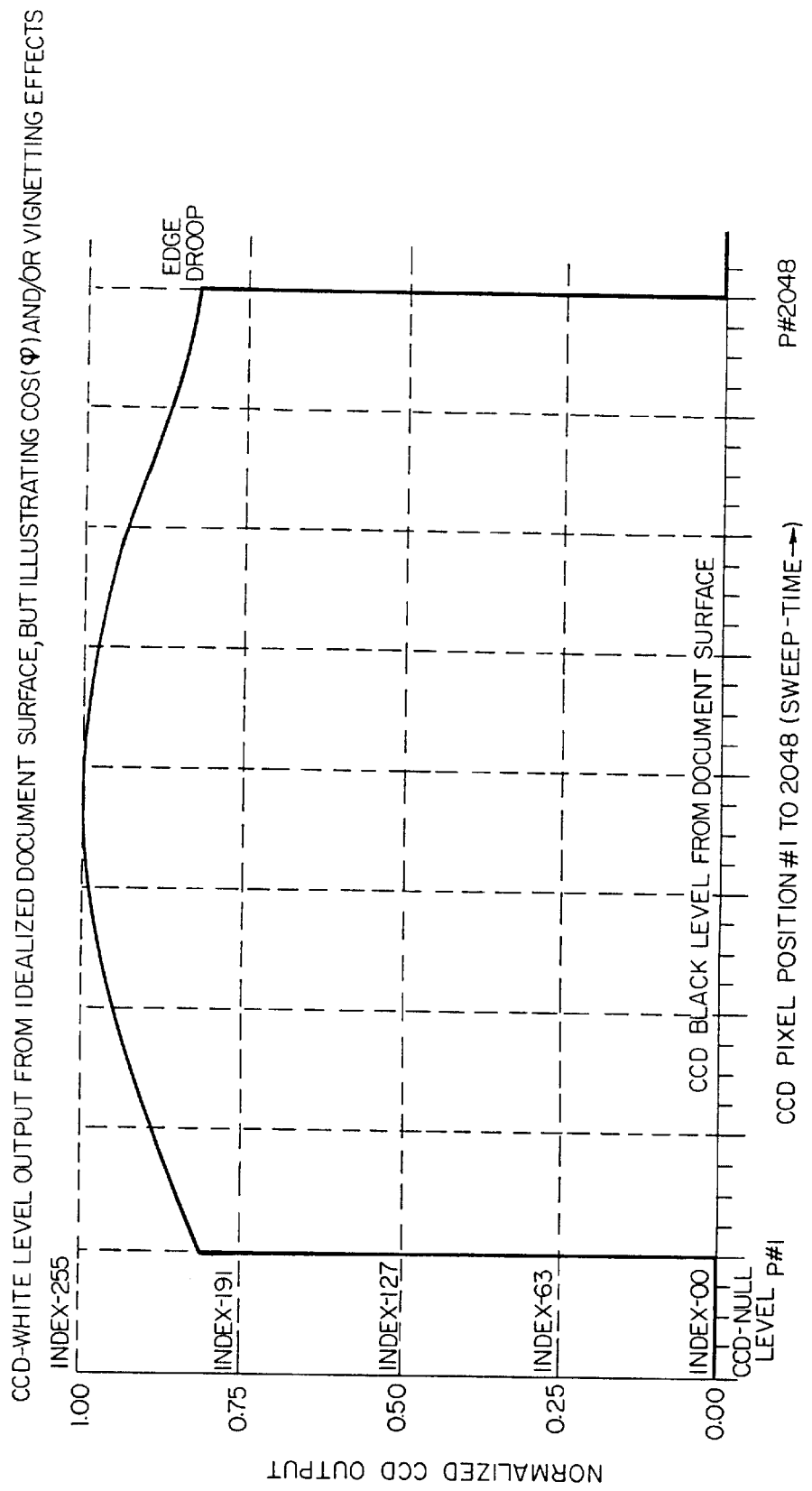
FIG. 12 is a depiction of a non-idealized profile resulting from lens vignetting effects.

With reference to FIG. 12, the optical-level signal reflected from a "flat" scanned document 12 (having uniform reflectivity across the region from which an image will be captured) for a CCD-array detection should ideally be a flat, constant profile, as noted earlier. Since the reflected signal from the document 12 has a spatial width of up to 8.5", or greater, for full-page size documents, a reduction lens 36a must be placed in front of the CCD-array detector—which is typically only an inch or so long—so as to reduce the page-image size and focus it onto the active surface of the CCD-array detector 35.

If the clear-opening entrance or exit aperture of the lens 36a is not sufficient to permit the full FOV image from passing through the lens, an effect known as vignetting occurs. The result is a loss of signal at the edge of the FOV, since the outer edges of the incoming reflected signal from the document are blocked from passing through to the surface of the CCD-array detector.

For a given lens, vignetting generally manifests itself if the lens is F/stopped at a large aperture, such as F/1.4 to F/2.0, in an effort to increase the optical-path sensitivity of the ORHS. Therefore, the system design of an effective ORHS must carefully balance the maximum system sheet-feeding speed requirements with the light-source output capability (for each spectral range of interest), the CCD-array detector sensitivity and responsivity, the FOV angle (e.g., related to the Z-axis distance from the sheet surface to the CCD-array detector), and the lens power selected and the F/stop setting. Failure to balance these parameters and accommodate the trade-offs may result in an ORHS design with excessive vignetting, thereby preventing accurate data extraction from the OMR marks or captured images.

Figure 13:
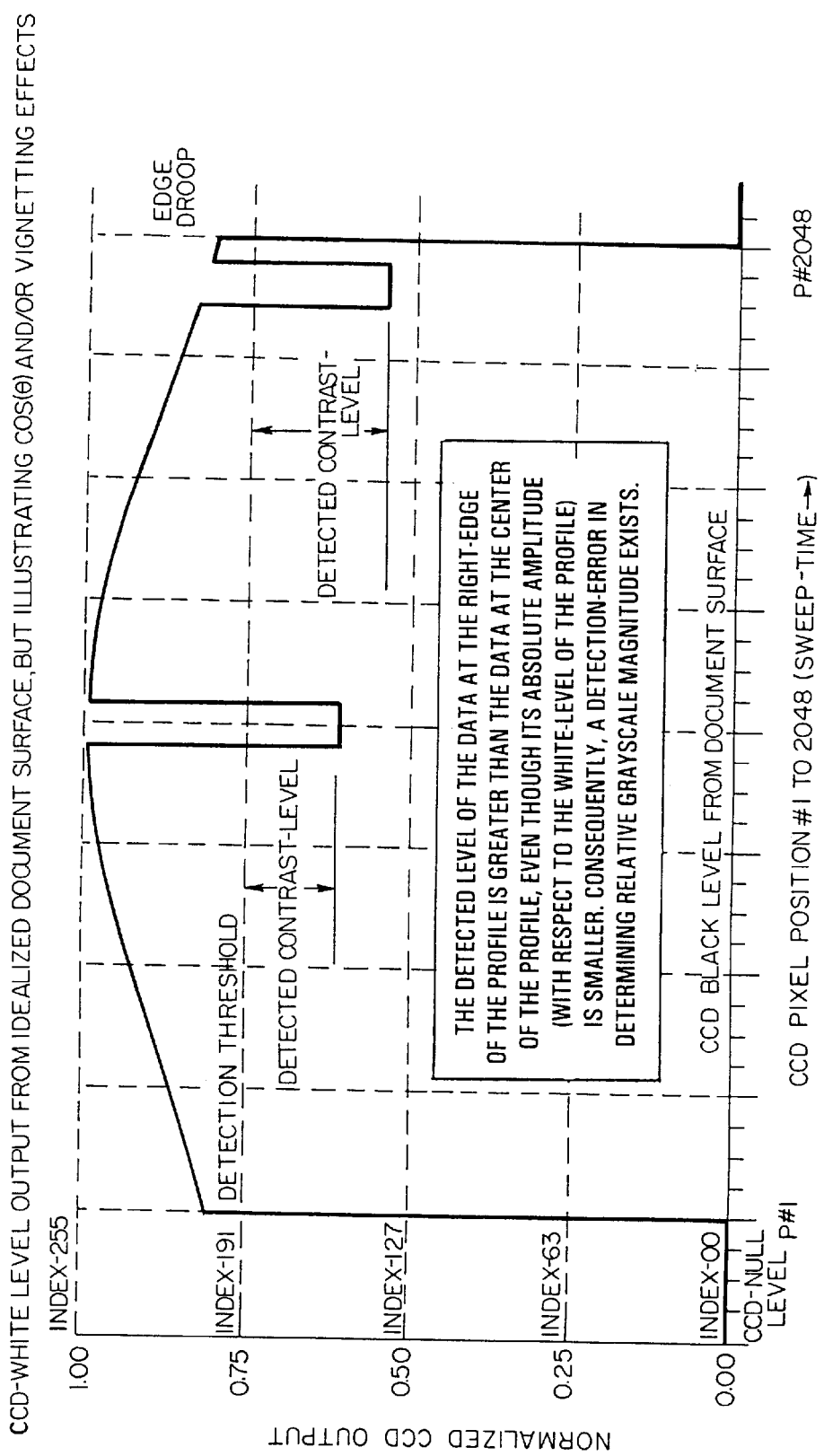
FIG. 13 graphically highlights detection error attributable to uncorrected vignetting.

FIG. 13 illustrates how vignetting, if left uncorrected, can cause serious errors in data contrast-level interpretation. Higher-contrast marks in the center region of the profile length, for example, can be misinterpreted as lighter contrast marks than actual lighter contrast marks at the edge of the profile. This is especially unacceptable in OMR intended-mark resolution, as erasures are generally significantly lighter than intended marks, regardless of the overall marking density and pencil type used by a respondent on a given document application.

OMR processing of an uncorrected heavily vignetted or excessive $COS^4(\Theta)$ falloff captured-image will result in erasures or other unintended stray marks being selected over darker, intended marks. Similarly, captured grayscale images will have objectional contrast distortions. Therefore, it is a goal of a successful ORHS design to configure the system parameters so that the deleterious effects of vignetting and $COS^4(\Theta)$ full size falloff are eliminated. However, the aforementioned non-idealized error artifacts can never be completely eliminated. Therefore, a complete approach to redressing these errors requires the implementation of a calibration scheme, as is taught by the present invention.

b. Document Scanning Surface Error

Unfortunately, the surface of any document 12 to be scanned, apart from any markings, will not generate a perfectly flat, uniform reflectance signal profile even if all the above factors that degrade the "raw" CCD-array detector output profile are 100% corrected (theoretically, that is: perfect correction is not possible).

The surface of a sheet of scanning-quality paper will likely appear uniformly white (or uniformly pastel, if the sheet is another color than white) and homogeneous to the naked eye, but in fact the reflected signal generated from an impinging light source is generated from a "3D" surface, rather than a two-dimensional one, composed of thousands and thousands of tiny fibers that are oriented in all possible directions. These cause variations in the reflectivity of the documents scanned.

Figure 14:
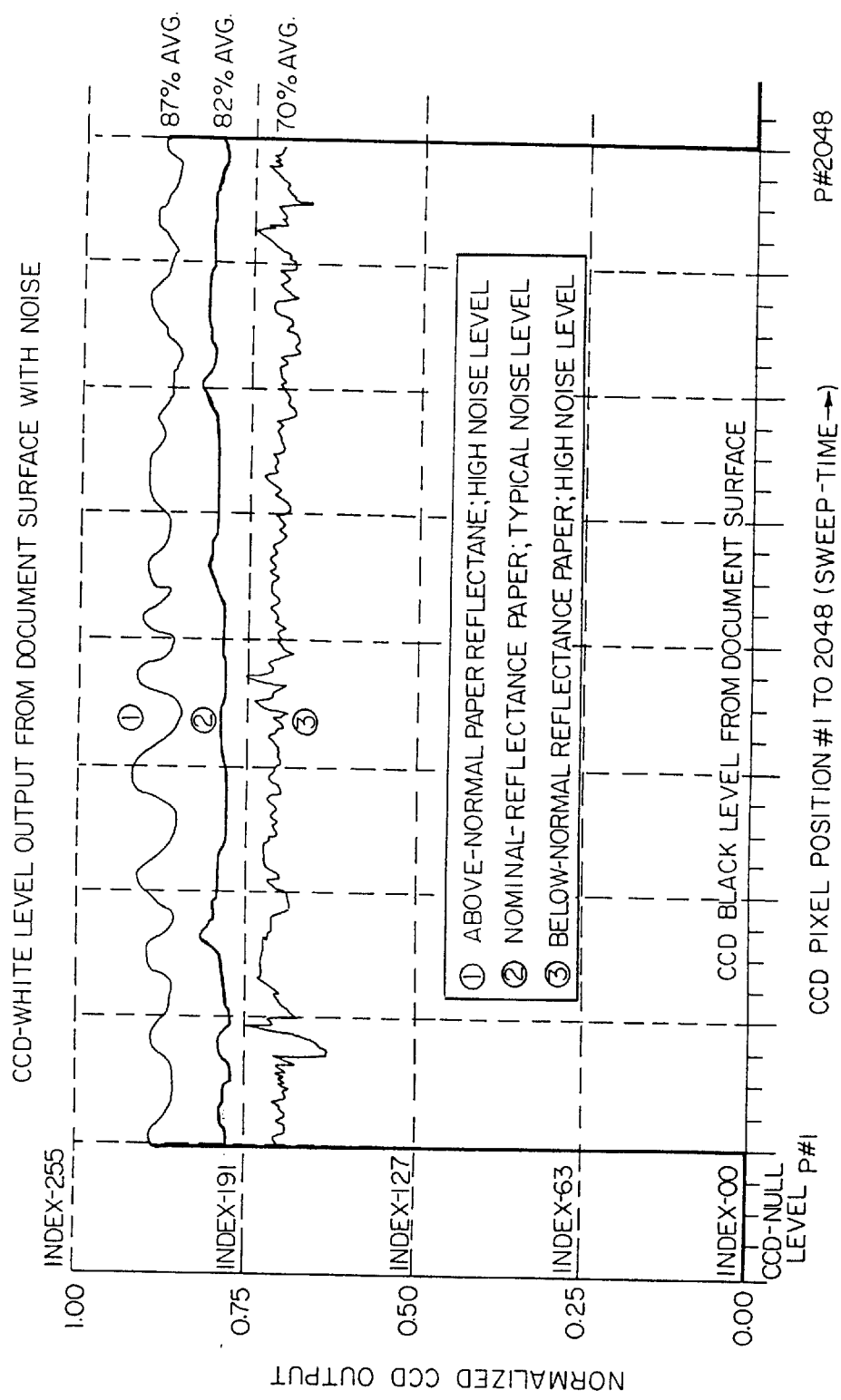
FIG. 14 illustrates profiles of various sheet surfaces to highlight their various noise levels.

The ORHS pixel output profiles shown in FIG. 14 assume that the ORHS has been optimally designed to minimize the signal artifacts discussed earlier, and that the document profiles shown are representative of the range of reflectance encountered in optical scanning. Profile 1 corresponds to a sheet having a high reflectance in the 87% range, but is "noisy" in that there are random "up and down" excursions at various pixel regions across the sweep profile. Another sheet from the same production run may or may not show the same pixel locations, but will generally indicate overall "noisy" behavior. Profile 2 corresponds to a sheet having a typical scanned-document reflectance in the 82% range, and is of good optical quality in that the deviations about the mean reflectance level are small and are not as "sudden" (e.g., spatial high-frequency) as in the previous case. Profile 3 corresponds to a sheet having the worst of all worlds in that its mean reflectance level of 70% is low and the profile contains spatially jagged high-frequency noise content. Legacy documents—those extant documents requiring scanning but that were not originally printed or filled out on paper stock specially selected for optimum scanning quality—usually exhibit profile characteristics of this nature.

Other factors that influence the overall background-reflectance quality—and thereby the appearance of the CCD-array detector X-axis sweep profile—of scanned documents include (1) grain-direction during feeding, (2) speck and dirt content, (3) slime spots, and (4) web splices. Similarly, there are other optically-based conditions which can degrade the quality—and, potentially, the data-extraction accuracy—of the reflected signal profile delivered to the CCD-array detector: These conditions include: (1) incorrect, "noisy" inks, with respect to the spectral mode being employed, that are used to pre-print information on the document; (2) excessive wrinkles, folds, tears, staple holes, or other mutilations in the document to be scanned; (3) stains or ink smears caused by careless handling during the respondent's data entry activity; (4) abnormal changes in the dimensions of the document due to exposure to extreme ranges of humidity and/or temperature; and (5) "sheet flutter", which can introduce significant data-extraction errors, especially for lightly made, marginal-level OMR marks or other hand-entered data.

These degrading factors can never be completely eliminated. However, in order to minimize these error components, an optimal ORHS system design, which includes a calibrated pixel output to compensate for the above-discussed component error artifacts, should utilize scannable documents that are prepared from acceptable paper stock, as defined by a variety of known standards.

Even after the preceding artifacts have been satisfactorily addressed in a well designed ORHS, there will still be a certain amount of document reflected-signal variations in the A/D output of the CCD-array detector.

The primary reason for the residual or ORHS corrected level of signal variation is caused by the random nature of paper-surface noise itself, as described earlier. Accordingly, this profile variation is referred to as the noise-band of the paper, either specified as peak-to-peak or RMS (root mean square). The smallest noise band will probably occur for a single CCD sweep from a given position on the sheet. As additional sweeps are scanned along the feed-direction (Y-axis) of the sheet, the cumulative noise band limits will increase due to a larger portion of the sheet area being scanned, thereby "finding" more variations in the paper stock reflectance.

Figure 15:
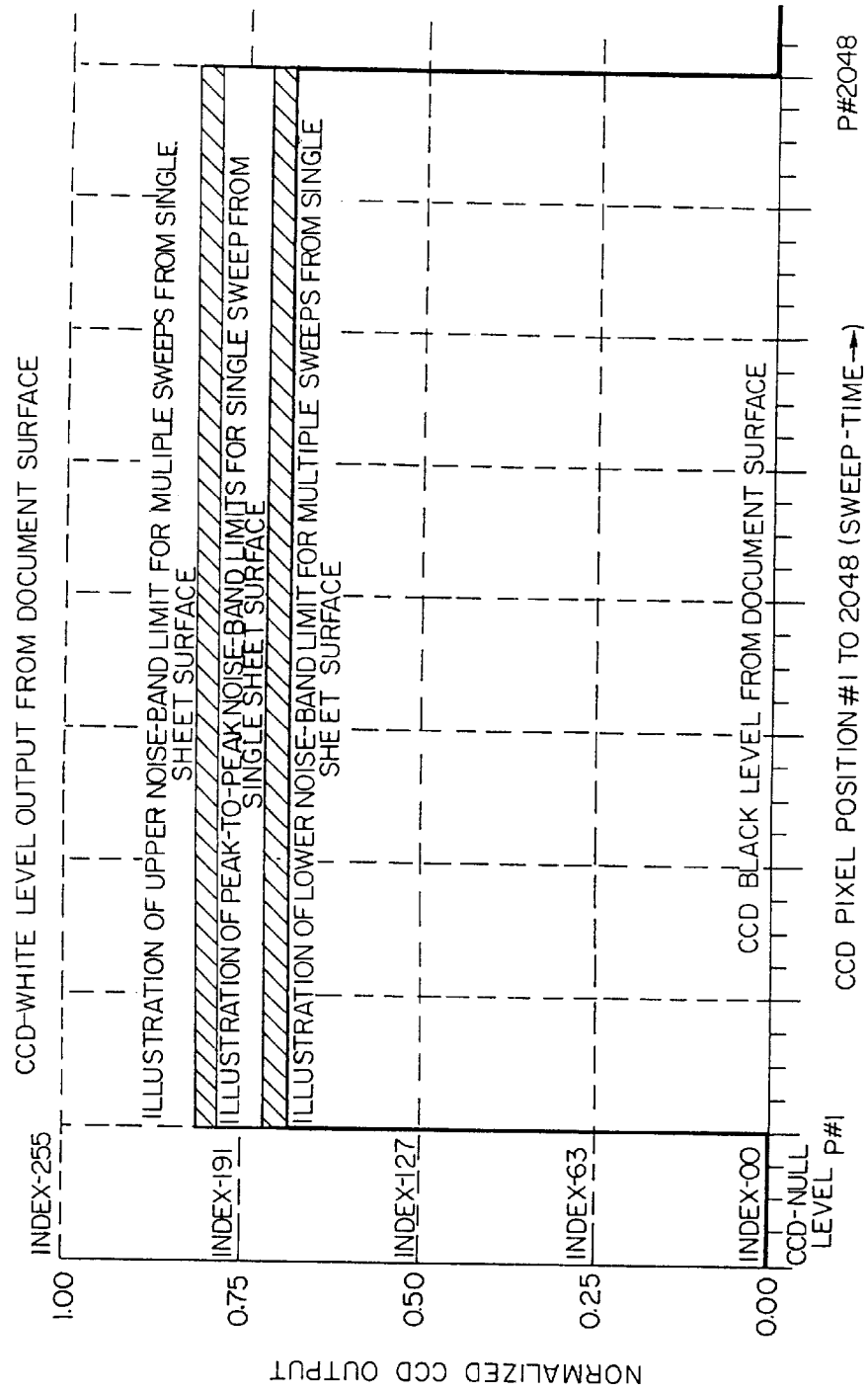
FIG. 15 is a graphical depiction of a document surface's noise-band levels for multiple sweeps.

The illustration in FIG. 15 shows these effects for multiple sweeps within a single sheet; the extreme top and bottom horizontal lines, or noise-band limits, are themselves "flat", but this does not imply that a given profile sweep itself will be flat, but rather it will "wander" between the single or multiple sweep limits, respectively, for the single sheet as indicated.

The cumulative paper band noise for similar origin multiple sheets (e.g., a composite band) grows even greater, because no two sheets will ever have exactly the same degree of surface noise variations in the same areas, and there is an increasing probability of encountering flaws or anomalies such as dirt specks, slime spots, or other inhomogeneities.

The various above-discussed factors affecting document surfaces and resulting reflectivity qualities are part of the "noisy" operating environment that the present invention is intended to accomodate.

3. ORHS Pixel Output Calibration

The previously discussed error artifacts, which occur as a result of the non-ideal ORHS components, as well as the non-ideal document scan surface, diminish the system's ability to accurately capture the "true" lightness or darkness of the individual pixel locations on a scanned document 12. The present invention implements a calibration process that addresses the non-idealized ORHS components by compensating for their corresponding error artifacts. The calibration scheme generally involves controlling the amount of light energy available for each of the photosensitive sites of the CCD detector for each horizontal, X-axis sweep. In particular, as will be discussed in greater detail later, the amount of light energy emitted by individual LED's in a selected spectral illumination bank (e.g., the bank comprising LED-LS strips 40a and 41a) is controlled for each detector exposure period. It also involves a calculated, mathematical adjustment to the individual values in a particular raw pixel output profile. As a baseline for calibration, a calibration medium, such as a sheet or document with reflectivity qualities in or near the ranges of reflectivity the ORHS is intended to handle, is selected. A target pixel output profile appropriate for the calibration medium, the ORHS design (including spectral illumination selections) and the expected scanned documents is defined and used to guide calibration.

While various light sources other than LEDs could be used, LEDs have been found advantageous for scanning at the relatively high speeds and pixel resolution contemplated by the present invention, because of their response time. That is, they can be turned fully "on" or fully "off" (in terms of light output) in an interval that is relatively small in comparison to the total time they are "on."

a. The Calibration Scheme

Figure 18:
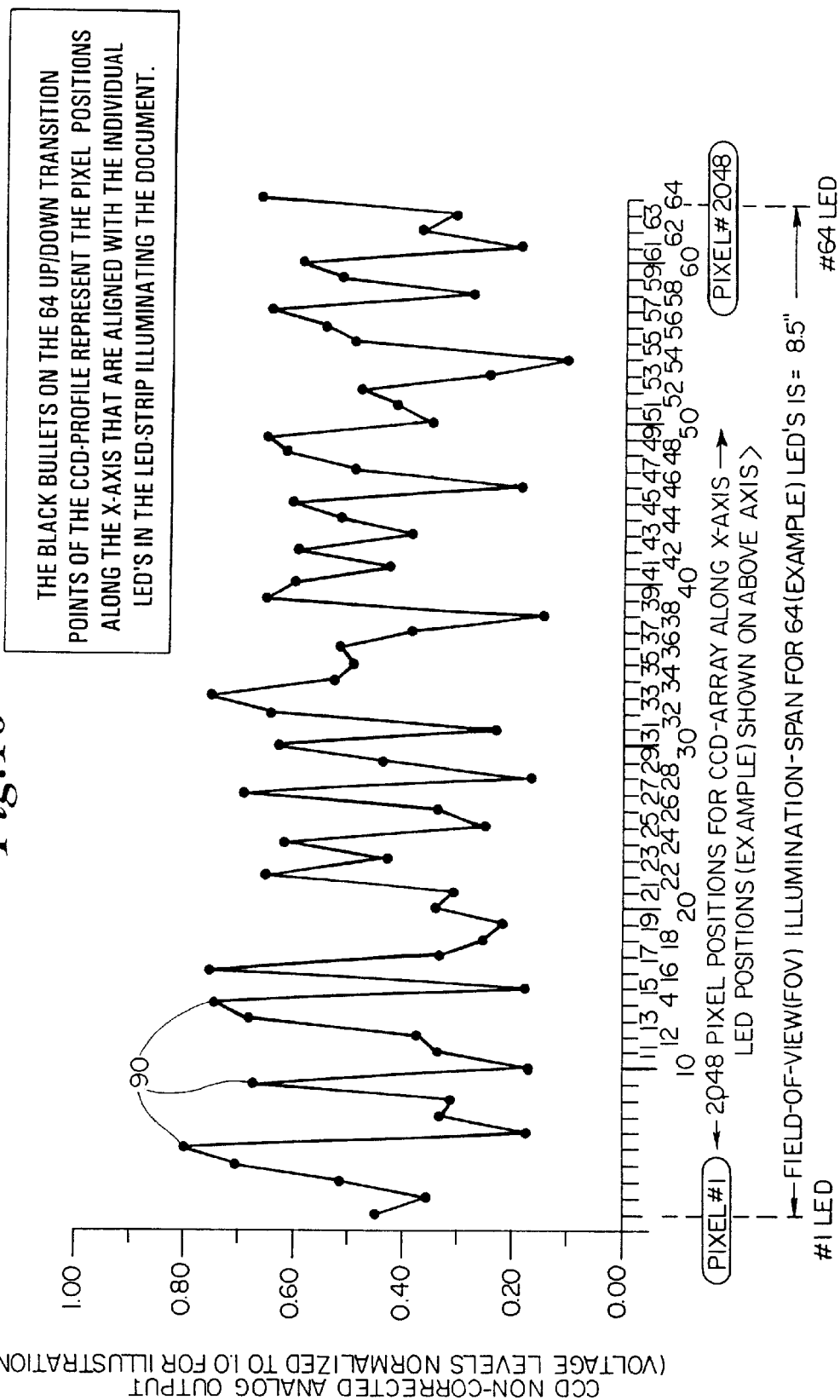
FIG. 18 is a graphical illustration of an exaggerated, non-calibrated pixel output profile of a "flat" calibration sheet.

As was previously discussed, the non-corrected or "raw" CCD-profile (in response to the scanning of a "flat" calibration region) can have an extremely unacceptable shape (e.g., highly variable, instead of "flat"), as is depicted in FIG. 18. By variably controlling the amount of light energy emitted from each individual light source (e.g., each LED 25 within an LED-LS strip 40a, 41a) during a detector exposure period and more particularly, the on-time for each LED 25, the system of the present invention is able to compensate for the aforementioned ORHS component (optical path) error artifacts, which primarily cause the unacceptable shape of the ORHS' pixel output.

In the preferred embodiment, LED's are controlled in pairs, with one LED in the pair being in each of strip 40a or 41a. A "pair" of LED's refers to the same numbered position, respectively, of a given LED in each strip; for example, pair # 10 is comprised of the two 10th-position LED's—counting from the defined reference edge of the strip—in both the "upstream" and "downstream" strips 40a, 41a, 40b, 41b jointly illuminating either the top or bottom side of the document surface by the respective top or bottom head assembly. The number of LED's—or LED pairs, when considering that the preferred embodiment uses a pair of LED strips for the scanning head on each side of the document—is typically much lower than the number of pixels in the pixel output (photo-sites in the X-axis or axes of the CCD-array detector, e.g., 2048). For example, a given ORHS design may use only 64 LED's in each of the upstream and downstream strips 40a, 41a to illuminate the X-axis scan width; the reflected signal, by contrast, is detected by a CCD-array detector with 2,048 pixels.

In discussion of the non-uniformity shown in the FIG. 18 illustration, it matters little whether the pixel output profile non-uniformity is generated from a single LED strip or a dual LED strip, since only the general principles are being explained for a hypothetical worst-case scenario; in practice, however, a pair of LED strips provides much greater inherent pixel output profile uniformity than a single strip, other causative factors being equal.

The bullets 90 on FIG. 18 show CCD pixel regions where there are abrupt "peak and valley" changes in the pixel output, for an LED strip with 64 LED's 25. Since the peak optical energy beam from an individual LED 25 (or pair) is typically emitted from an axis normal to the alignment with the position in the strip, the pixels most affected by either a high or low LED output will be those pixels in the region directly aligned with the LED position.

For example, the highest pixel output profile output point along the strip is for LED position #5, as shown on FIG. 18. Accordingly, for the non-controlled LED strips (i.e., emitted light for each LED not controlled), the #5 position LED (or pair) must be well above the average LED optical output for the strip. Likewise, the lowest point in the pixel output profile illustration occurs at LED position #54; therefore, the LED(s) at this position must be considerably weaker in optical output than the average. (It should be noted that the non-uniformity of the pixel output profile of FIG. 18 is not only attributable to inherent non-uniform LED light outputs resulting from "real-world" LED strips, but also, may be attributable to the other closed-loop, optical path error artifacts such as non-uniform photosensitive sites of the CCD-detector. However, in practice, most of the pixel output's uncorrected, nonuniform profile will occur as a result of a non-uniform linear light source. In addition, it should be emphasized that the CCD profile shown in FIG. 18, and those that immediately follow, are for illustration only, and an actual uncorrected profile will not necessarily appear this degraded.)

Figure 19:
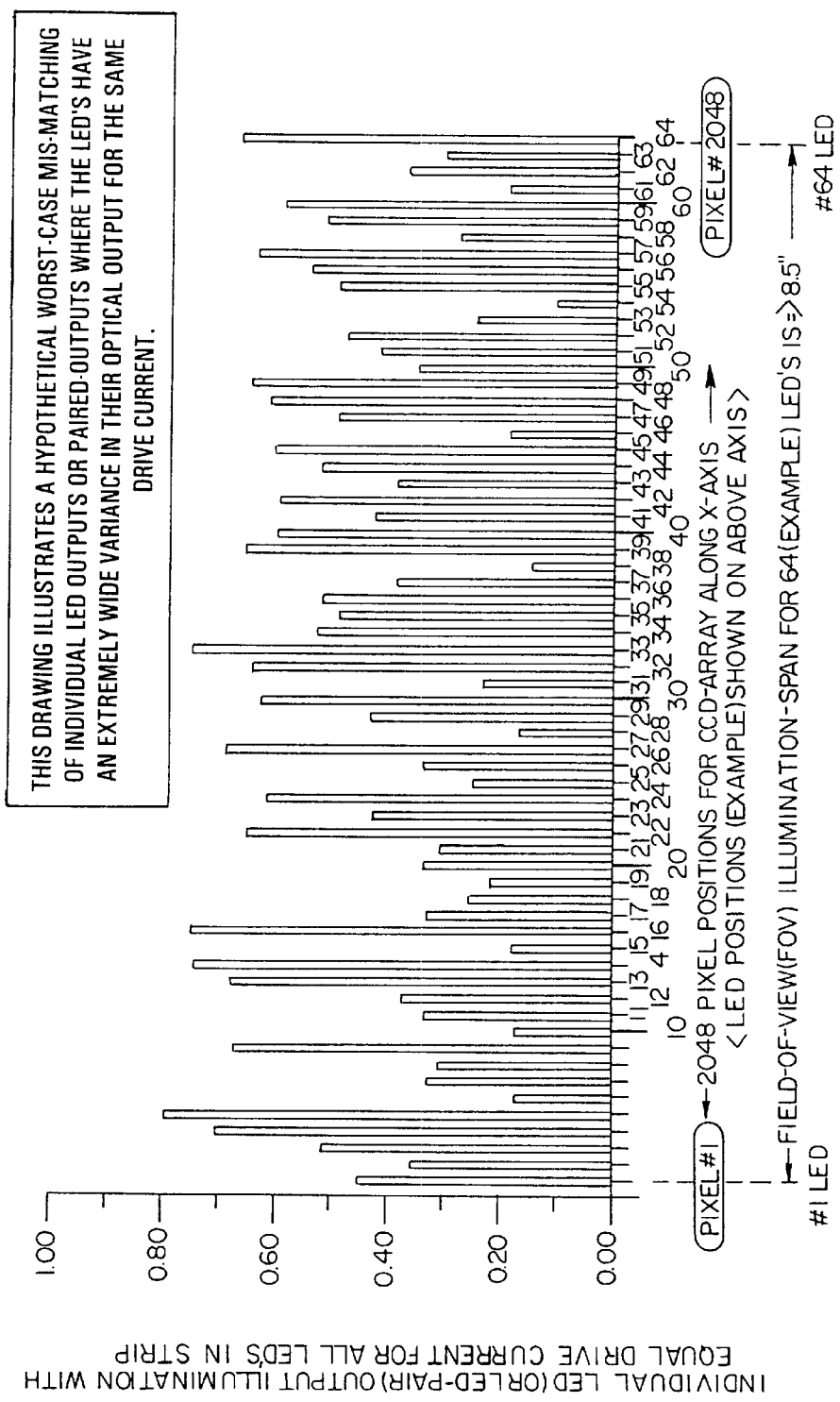
FIG. 19 is a depiction of the light outputs for each LED of the ORHS from FIG. 18.

To illustrate the correlation between the hypothetical worst-case "peaks and valleys" of the pixel output profile output of FIG. 18, and the underlying respective LED output levels, FIG. 19 shows the hypothetical optical output levels of each LED (or pair) in the 64 LED strip. As expected, the LED in position #5 has the highest output, and LED in position #5 has the lowest. It is intuitive why a pair of LED's per position—versus a single LED—will more effectively smooth out much of the non-uniformity variations along the LED strip; this is merely probability statistics at work.

Furthermore, the output energy from an LED is not a single ray of light emitted at an angle normal to the LED planar active surface, but rather is a beam (steradial cone) of energy that will illuminate neighboring photo-sites—albeit to a diminishing extent—along the detector array 230a, further providing a smoothing effect in "real world" LED-LS designs for an ORHS.

Figure 20:
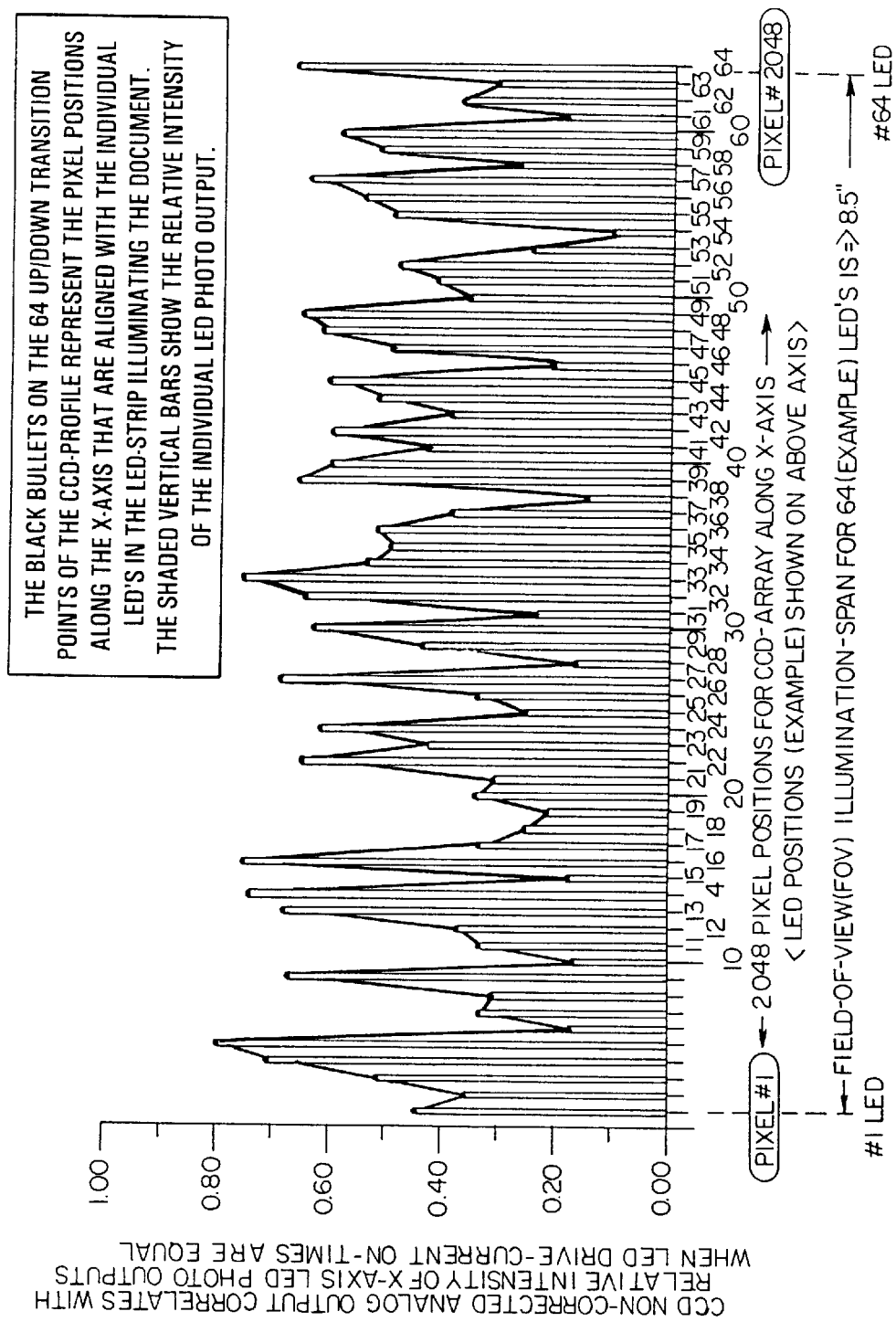
FIG. 20 is a composite of FIGS. 18 and 19.

To further illustrate the concept of correlation between individual LED's 25 within an LED-LS strip 40a, 41a having wide ranges of optical output, and the effects on the non-uniformity of the pixel output profile (of a "flat" calibration sheet), FIG. 20 shows a composite plot of the hypothetical pixel output profile and the respective optical outputs of the 64 LED's (or pairs) comprising the entire LED-LS strip(s) 40a, 41a.

The previous examples illustrated a hypothetical LED-LS strip 40a, 41a producing an extremely degraded pixel output profile when all of the poorly matched LED's 25 within the LED-LS strip 40a, 41a are turned on for an equal period of time within each X-axis detector exposure period. In the preferred embodiment of the present invention, the on-times for the input power to the LED's in the strip (e.g., current on-time, as previously explained, for the represented embodiment) can be individually controlled for each LED within the respective strips. Referring to the previous discussion relating to FIG. 9, it was shown that for a given input current to an LED, the CCD "bucket" charge accumulation will increase nearly linearly with the time that the LED is turned on—and thereby emitting optical output to be reflected to the CCD-array detector 230a.

Therefore, a preferred approach to greatly improving pixel output profile uniformity (in response to a "flat" calibration sheet) is to vary the on-time periods of input current to the individual LED's 25, such that those LED's that are intrinsically the "hottest" in optical output are kept on the shortest period of time during the CCD detector exposure period, and those LED's 25 that are the weakest in optical output, are turned on for longer periods of time.

Figure 21:
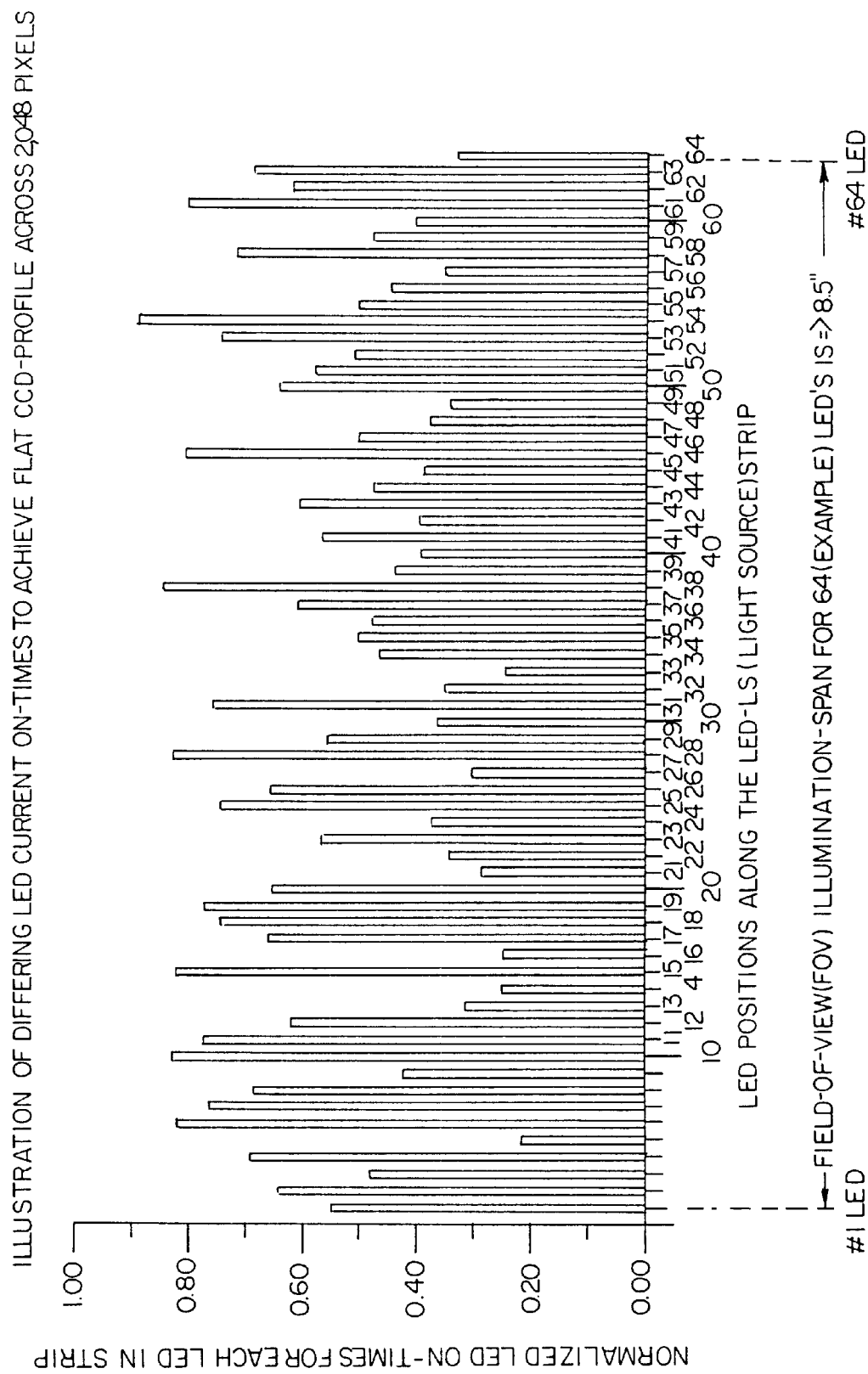
FIG. 21 is a graphical representation of LED on-times required to compensate for non-uniform LEDs of FIGS. 19 and 20.

Referring again to the earlier hypothetical examples in FIGS. 18, 19, and 20, LED position #5 should be turned on for the shortest time in the entire LED strip, as this location generated the highest "peak" in the corresponding region of the pixel output profile. Similarly, LED position #54 should be turned on for the longest period in the entire LED strip, since this region of the pixel output profile has the lowest "valley" of output. FIG. 21 shows the hypothetical on-times, respectively, for the 64 (example) LED's comprising the hypothetical "worst case" LED-LS strip(s).

Since FIG. 21 is for illustration of the variable on-time control of respective LED currents, the actual on-times are not shown on the Y-axis of FIG. 21, but rather it simply shows relative times on a scale of 0.00 to 1.00.

Figure 22:
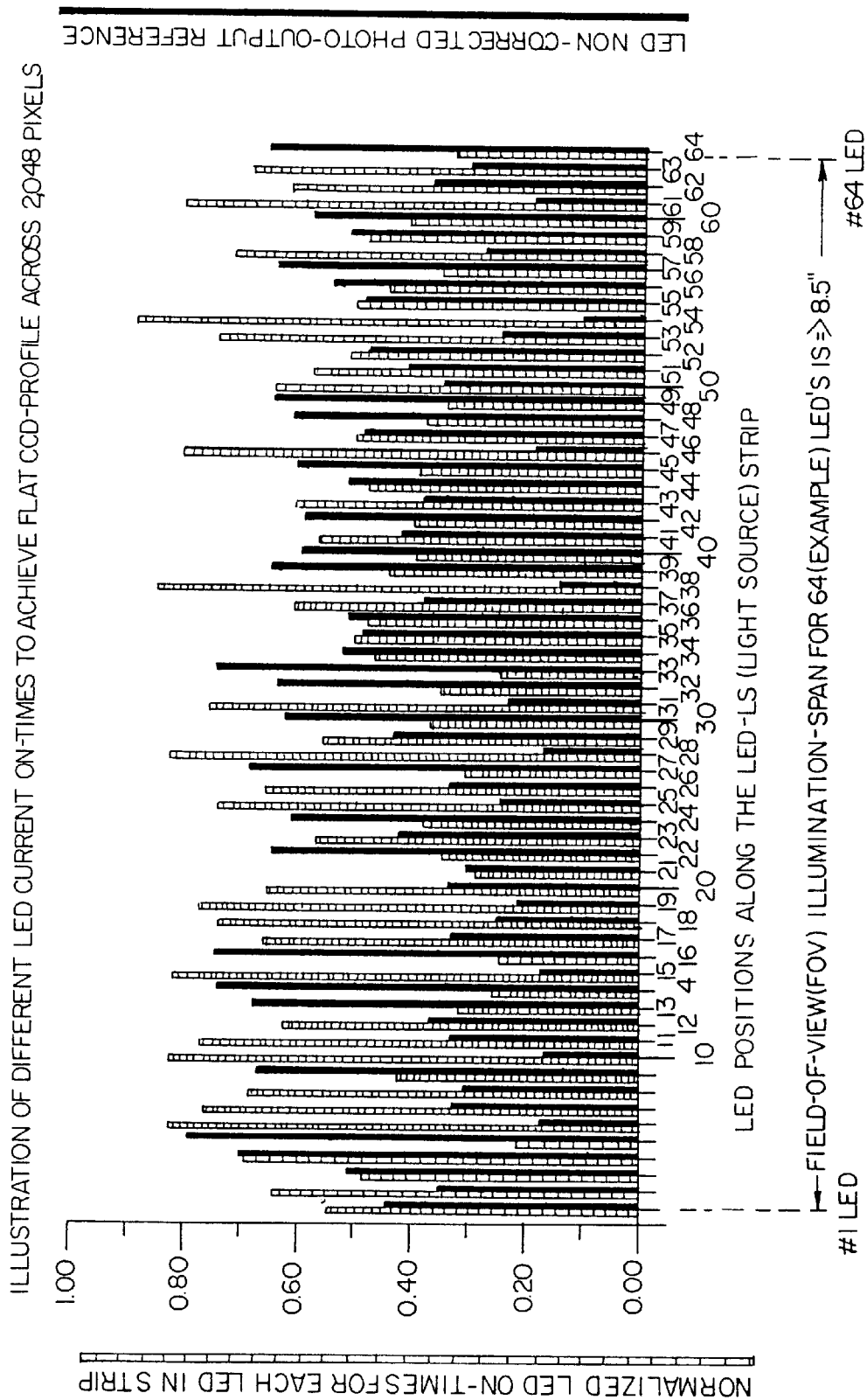
FIG. 22 is a graphical representation of uncorrected LED outputs corresponding to the FIGS. 18–21 example.

FIG. 22 further explains the concept that "hot" LED's should be turned on for relatively shorter periods of time during the CCD-detector exposure period, and conversely, "weak" LED's in the strip should be turned on for longer periods of time within each CCD exposure window (e.g., during 1/240" document Y-axis travel for the 240 DPI preferred embodiment). The solid vertical bars in FIG. 22 represent the non-corrected individual LED outputs, that is, the outputs with equal on-time to all LED's in the strip. The horizontally-hatched vertical bars represent the variable LED current on-time that will be required (e.g., per FIG. 21) to adjust the hot/weak LED's to a more uniform average.

For example, the FIG. 22 hypothetical plot for LED position #5 shows the relatively shortest on-time hatched-bar immediately preceding the highest LED solid-bar output, respectively representing the shortest on-time current required to lower the level of the highest LED output in the entire strip, whereas LED position #54 shows the highest hatched-bar immediately preceding the shortest solid-bar, respectively representing the longest on-time current required to raise the level of the weakest LED output in the entire strip.

It should be emphasized that the terms or phrases, "raising or lowering" the LED output are used herein for explanatory purposes only; in fact, the technically correct concept for the preferred embodiment is control of the light reaching the detector array 230a. The duration of the LED current on-time directly influences the total amount of incident optical energy that can strike the document surface during each CCD-detector exposure period, and thereby controls the magnitude of the sheet-reflected signal reaching the CCD-array detector 230a. In addition, other techniques for controlling the amount of light energy available to each photosensitive site during a detector exposure period may be implemented. With the preferred embodiment of the present invention, the photosensitive sites corresponding to each pixel are continuously active (i.e., continuously absorb available reflected light energy) during the entire detector exposure period for each X-axis sweep. However, in an alternative embodiment, the photosensitive sites of the pixel output could be individually controlled (e.g., by electronic "shutters") to inhibit light energy absorption at varying relative times within the detector exposure period. Also, rather than controlling the individual light source (LED) on-times, the individual light source intensities could be adjusted in controlling the overall amount of emitted light energy per X-axis sweep. Other specific techniques consistent with the spirit of this invention will be recognized by persons of ordinary skill in this art.

From the laws of physics, "power" applied over a time period becomes "energy"; thus, the output optical power from an LED during the current on-time period, becomes applied optical energy at the end of the period. During any time-period portion of the total CCD exposure period for a given Y-axis pixel line (e.g., 1/240") that a given LED is turned OFF, it is contributing no further energy to the CCD charge-accumulation process. Depending upon the degree of actual "real world" linearity for the respective LED and CCD "input versus output" functions, the LED electrical-input/optical-output functional relationship to correct the non-uniformity of the pixel output profile, is approximately inversely proportional. For example, with respect to the mean or average output level for a given LED-LS strip, an LED that is 20% weaker than average, will need a 20% longer period of current on-time to be brought up to the average level, and vice-versa.

Figure 23:
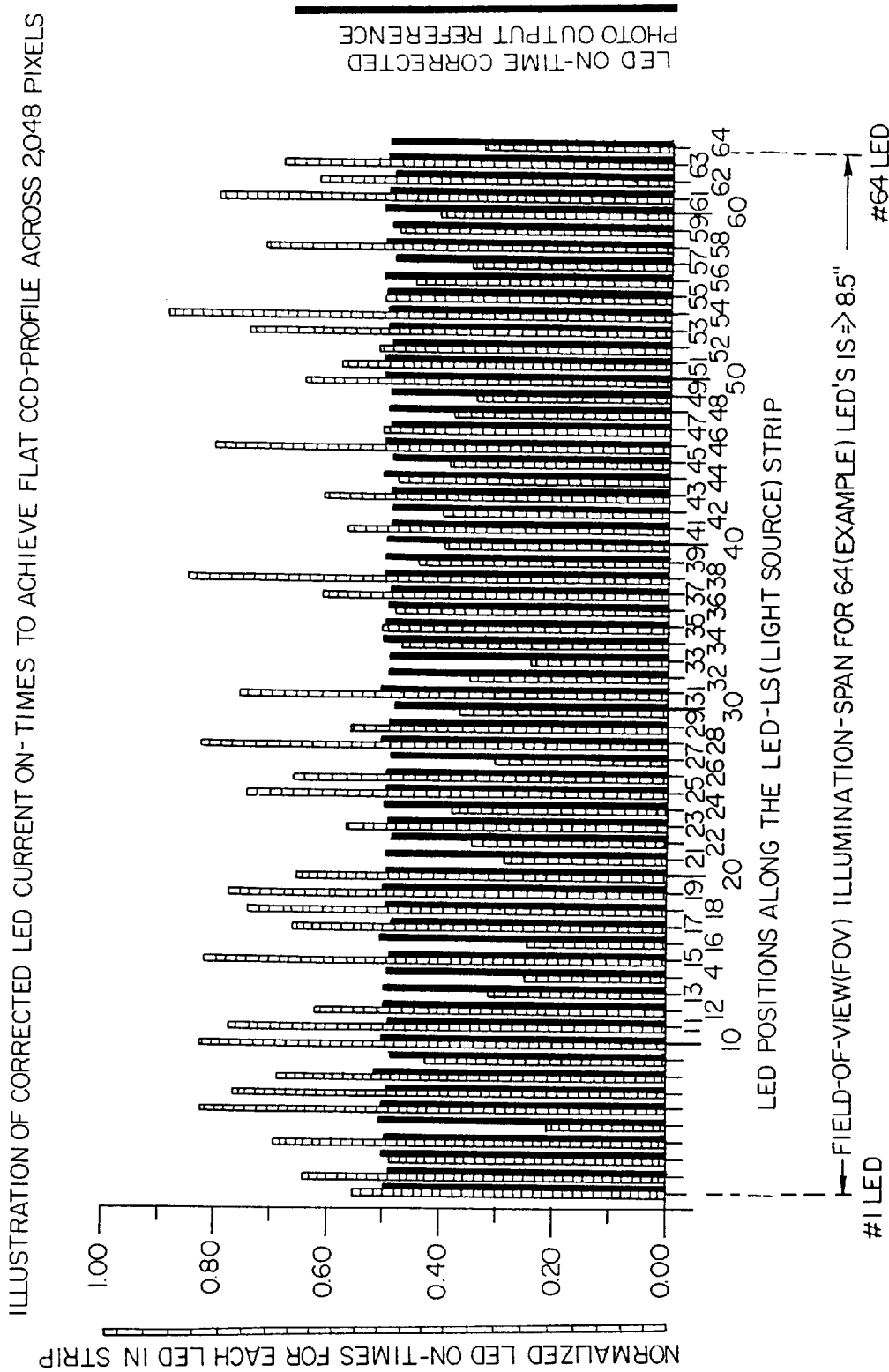
FIG. 23 is a graphical representation of corrected LED on-times corresponding to the FIGS. 18–22 example.

FIG. 23 is a plot similar in concept and presentation style to the preceding FIG. 22, except now the variably controlled LED on-time current feature is in effect. Thus, all of the 64 LED's in the entire LED-LS strip 40a, 41a have nearly identical outputs because the differing on-times "cancel out" the relative "high and low" LED outputs.

Figure 24:
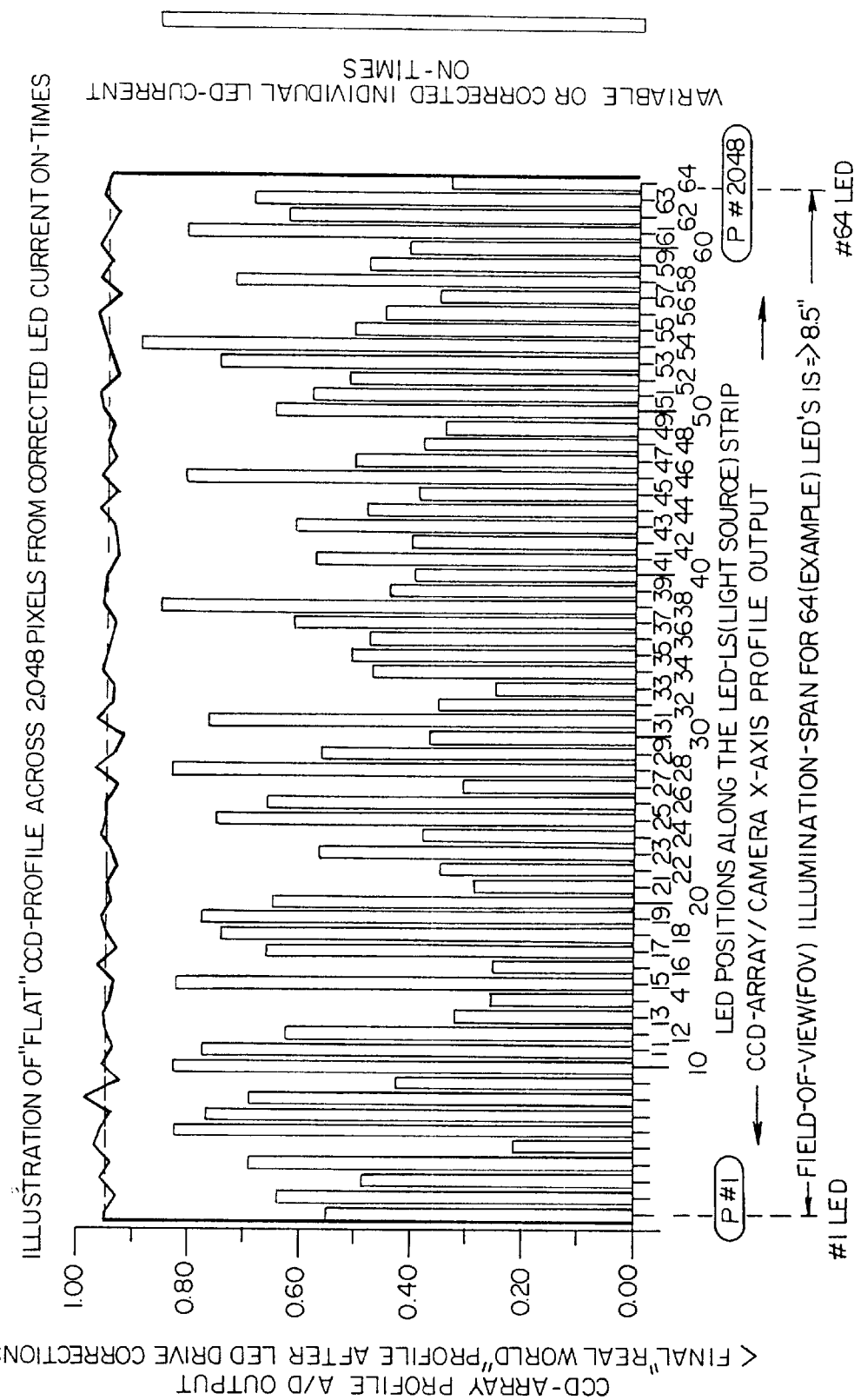
FIG. 24 is a graphical representation of "flat" pixel output profile with corrected on-times.

Therefore, for the explanatory purposes of FIG. 24, which shows a CCD pixel output profile after correction of the LED current on-times (in the absence of other anomalies in the document-surface optical signal reflected to the CCD-array detector), the intrinsic nonuniform LED outputs have been corrected by the LED-current on-time control scheme, and the resultant pixel output profile of a "flat" calibration sheet should be relatively "flat", a goal of the ORHS of the present invention.

In actual practice, the ORHS "real world" design represents a "closed-loop" system, in that during the calibration process of establishing the appropriate on-time intervals for each LED within the strip, all other irregularities or non-uniformities in the pixel output profile—regardless of the origin—are automatically taken into account and also corrected.

That is, from the viewpoint of the CCD A/D output, the actual cause of an irregularity or "up and down" transition in the CCD output within the image region (along the length of the X-axis profile for a linear array detector) is impossible to determine. Thus, while FIG. 18 shows wide "up and down" swings in the profile amplitude as being primarily attributable to the hypothetical variations in the individual LED outputs, the actual cause of the swings could be more influenced by CCD pixel non-uniformity ratios (PNUR's), foreign matter blocking a portion of the reading-head throat (e.g., some "gunk" stuck to the scanning station glass, for example), or other causes.

The more likely variations in the "real world" pixel output profile output, are from $COS^4(\Theta)$, FOV, edge-falloff, and/or lens vignetting factors discussed earlier, as well as small, randomly-located manufacturing variations in CCD sensitivity and responsivity. The major point is that the "closed loop" method of setting the individual LED on-times from a predetermined calibration procedure takes all system-caused variations within the ORHS pixel output into account, whatever their nature and cause. The only remaining CCD output signal variations within the ORHS pixel output with the LED-control scheme in effect are the small, random variations in paper-noise from sheet to sheet, as discussed earlier.

Figure 25:
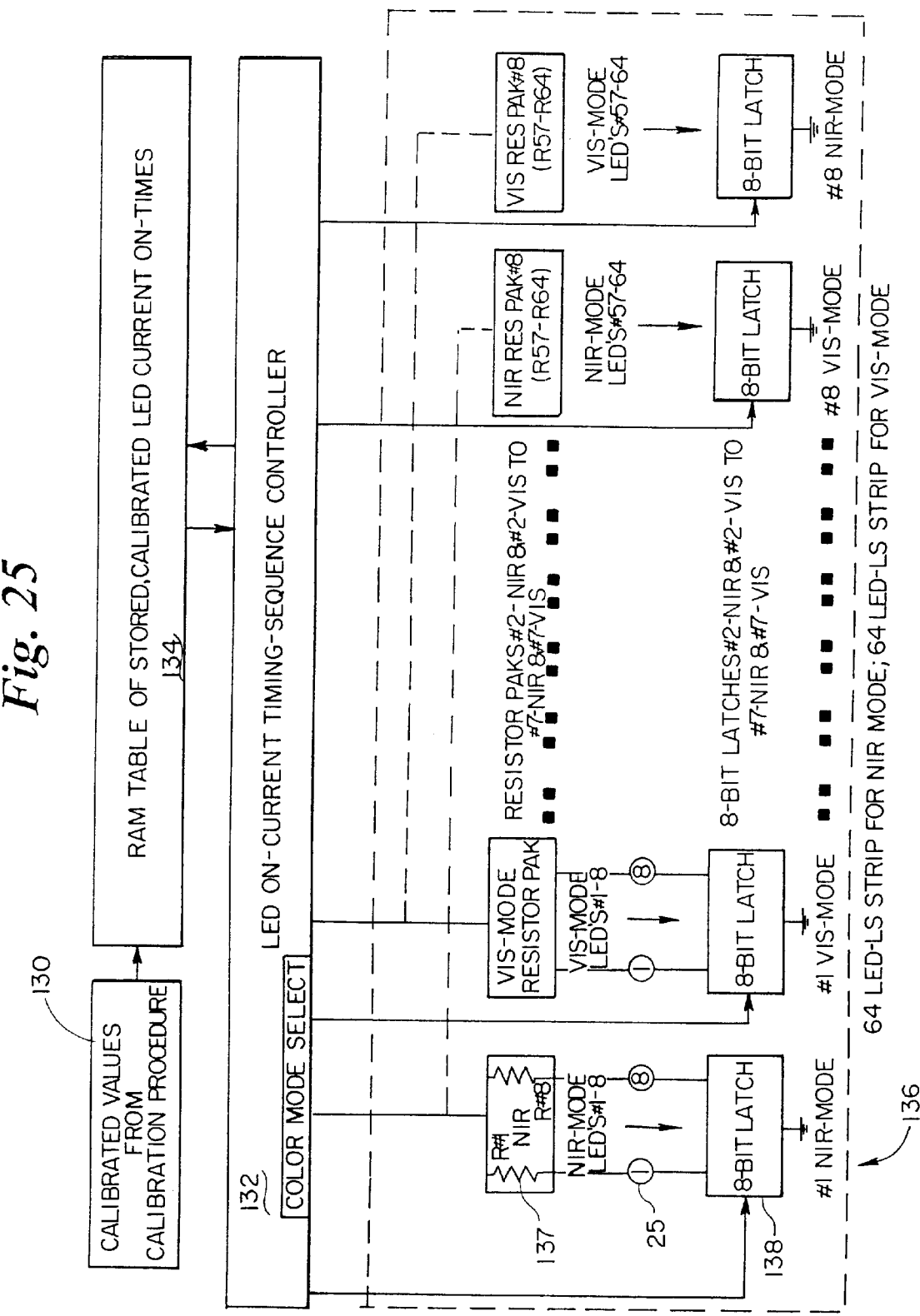
FIG. 25 is a block diagram of an LED current on-time control sub-system.

FIG. 25 is a block diagram of an LED current on-time control sub-system 130, which controls the on-current times for the individual LED's 25 in a light-source strip. As shown in FIG. 25,. multiple-spectral (selectable) operation may be obtained by implementing separate banks 40a/41a and 140a/141a of NIR and VIS-mode LED's 25. In addition, LEDs having varying spectral characteristics could be mounted within a single LED-LS strip for multi-spectral operation (e.g., red LED's alternating with NIR LED's).

Each LED 25 within a given strip has a current-limiting resistor 137 in series with the LED. As explained earlier, the current (within minor variations) is constant in magnitude for each LED 25, as determined by the value of the resistor, and the applied +V voltage.

Furthermore, each LED 25 is in series with an on/off Integrated Circuit bi-stable latch 138, which either completes a current-flow to ground or not, depending upon the state of the latch. The on/off state of each latch is controlled by time-sequence logic which sets the duration of the time-period (within each CCD detector exposure period) that the latch is on, and thereby the time period for which the LED is on and emitting light to the scanning station.

In the preferred embodiment, the front-side and/or rear-side reading head can contain at least two sets of LED-pairs (e.g., pairs corresponding to LED-LS strips 40$a$, 41$a$ and 140$a$, 141$a$), thereby permitting selectable multiple-spectral operation (e.g., selectable modes). FIG. 25 shows by way of example an NIR-mode and a VIS-Mode. In actual practice, however, the multiple modes may be any two or more spectral outputs that are available from appropriate selection of commercially available LED's. For example, there could be an NIR-880 nm mode coupled with a VIS-660 (red) nm mode, or a VIS-660 (red) nm mode coupled with a VIS-555 (green) nm mode.

As best seen in FIGS. 1 and 4, the preferred design of the ORHS is such that the LED-LS strips 40$a$, 41$a$, 140$a$, and 141$a$, as part of illumination strip assemblies 20$a$, 21$a$, resting on alignment guides 22$a$, may be readily removed (by sliding) and new strips inserted (arrow 11 shows the sliding direction) into the reading head enclosure; thus, there is practically no limit to the spectral combinations of two-mode operation that can be achieved. The changeover can be performed in "the field," that is, at a customer site, by personnel with only minimal technical skills. The alignment surfaces 22$a$ aid sliding and proper positioning of the strips 20$a$, 21$a$.

Turning again to FIG. 25, the timing-controller 132 sets the duration of on-time for each LED according to a stored value from the RAM lookup table 134. The values in the RAM table are derived from the calibration procedure. In the preferred embodiment, each LED on-time is comprised of 1 to 13 incremental coarse-adjust components and 1 to 8 incremental fine-adjust components. The maximum allowable on-time for each LED should be approximately 90 percent of the nominal detector exposure period (which varies according to deviations in the document advancement rate associated with a non-ideal system). Thus, each coarse-adjust increment equals about 1/13 of 90% of the nominal detector exposure period. Each fine-adjust increment is about 1/8 of a coarse-adjust increment. Therefore, 104 (8 times 13) possible discrete on-time combinations exist for each LED.

b. Preferred Calibration Method
(i) Light Source Emission Control Calibration

Figure 26:
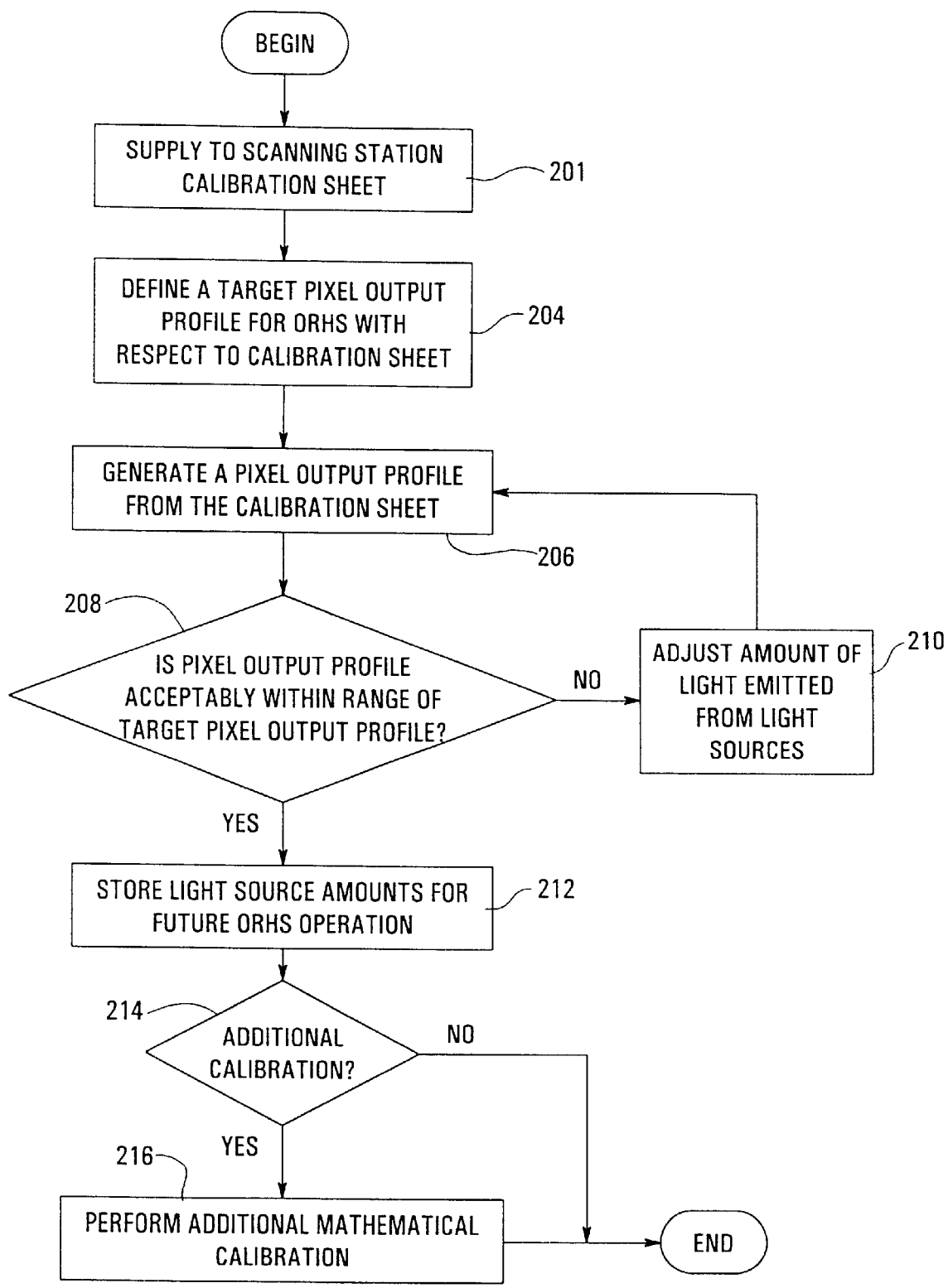
FIG. 26 is a general flow diagram of a method for calibrating the pixel output of an ORHS.

FIG. 26 is a flow chart of the general method for calibrating an ORHS's pixel output according to the present invention. This method is principally based upon controlling the individual amounts of light energy emitted by each light source (LED) during a detector exposure period to compensate for the various aforementioned error artifacts in order to attain a calibrated ORHS that will generate a reasonably "flat" pixel output profile when the detector 30$a$ scans a "flat" calibration sheet.

The method includes the steps of (1) supplying to the scanning station a calibration sheet 201; (2) defining a target pixel output profile for the ORHS (i.e., the desired output value for each pixel), with respect to the calibration sheet 204; (3) illuminating the calibration region with the light sources and initiating an X-axis sweep to generate a pixel output profile from the calibration sheet 206; (4) determining whether the resulting pixel output profile is within a preselected range of the target pixel output profile 208; and (5) adjusting the amount of light emitted by each light source (e.g., LED) until the pixel output profile from the calibration sheet is acceptably within range of the target pixel output profile 210. The resulting light source amount values are stored for subsequent nominal system operation 212. After a test 214 to determine if additional calibration is desired, an additional mathematical calibration 216 can be performed.

Figure 5D:
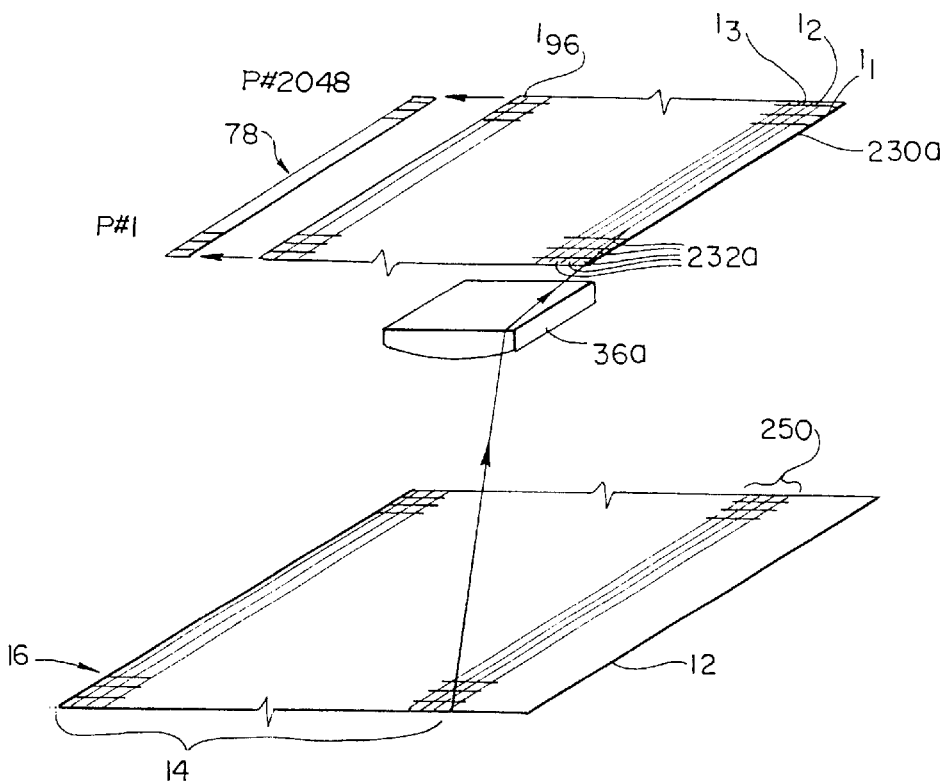
FIG. 5D is a schematic pictorial view of the scanning station as in FIG. 5A and the CCD detector element with its reduction lens.
Figure 5E:
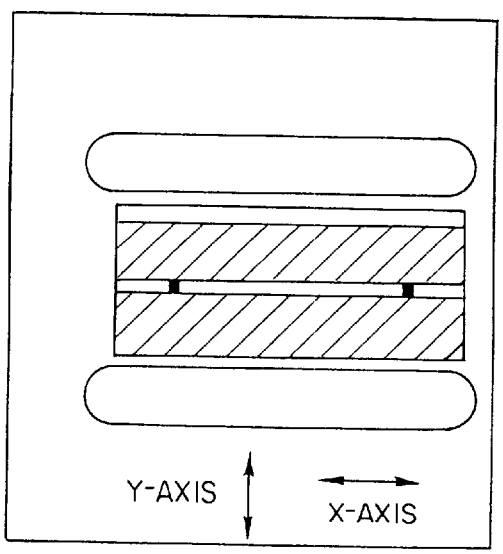
FIG. 5E is a cut-away, simplified top view of a scanning station as in FIG. 5A having an alternative embodiment of an error-detect line.

Referring now also to FIG. 5D, the nature of the calibration media or calibration sheet can be explained. The calibration media is a document 12 that has at least one calibration region with reflectivity characteristics that are useful in calibrating an ORHS as in the present invention. By way of example, the three pixel lines 250 may be considered a calibration region. The reflectivity of this calibration region 250 is selected to be in or near the range of reflectivity expected among documents that will be scanned by the ORHS. Because reflectivity varies according to the spectrum of illumination used, the calibration region reflectivity is selected based on a particular illumination mode available in the ORHS, for example, NIR illumination. If a flat, uniform ORHS pixel output profile is desired in response to a "blank" or "white" document, the calibration sheet's image region(s) would have a calibration region 250 with substantially homogenous, relatively high reflectivity. To be useful, the calibration region's reflectivity profile must be defined to correspond to an arbitrarily defined gray-scale level in a target pixel output profile. For example, if the detector's pixel output is designed to generate discrete gray-scale values ranging from 0 to 255 and if the target pixel output profile is "flat" and uniform with a defined gray-scale level of 240 for each pixel in the profile, the calibration region reflectivity profile can be defined to correspond to a level of 240, somewhere near the high reflectivity end of the expected reflectivity range of documents to be scanned by the ORHS.

With the preferred embodiment of the present invention, a completely blank, "white" or light colored document is used as the calibration sheet. It is supplied to the scanning station 10 for pixel output profile generation. In this manner, any region of the calibration sheet may be considered the calibration region and scanned to generate the pixel output profile. The target pixel output profile for this embodiment is a flat profile with a gray-scale level of 240. Thus, the target output profile is comprised of 2048 pixels, each producing an output value of 240.

A pixel output profile is generated from the calibration sheet and compared with the target pixel output profile. As discussed in the previous section, the light sources are then individually adjusted until the pixel output profile is acceptably within range of the target pixel output profile. This normally will be an iterative process where the light source emissions are individually adjusted to attempt to make the pixel profile more closely resemble the target profile. After each adjustment, a new pixel output profile is generated and compared with the target pixel output profile. This process continues until, with respect to the physical limitations, as well as the design parameters, of the system, the pixel output profile is acceptably within range of the target pixel output profile (i.e., as close as it can be to the target profile or within a predefined range of the target profile). For example, in a pixel output of 2048 pixels, pixel #273 may be limited for whatever reason to a gray-scale value of 220, whereas its corresponding target value is 240. This could be attributable to a "weak" LED that is primarily responsible for supplying pixel #273 with illumination. In this situation, pixel #273 would acceptably be within range of its target pixel output value.

Figure 27A:
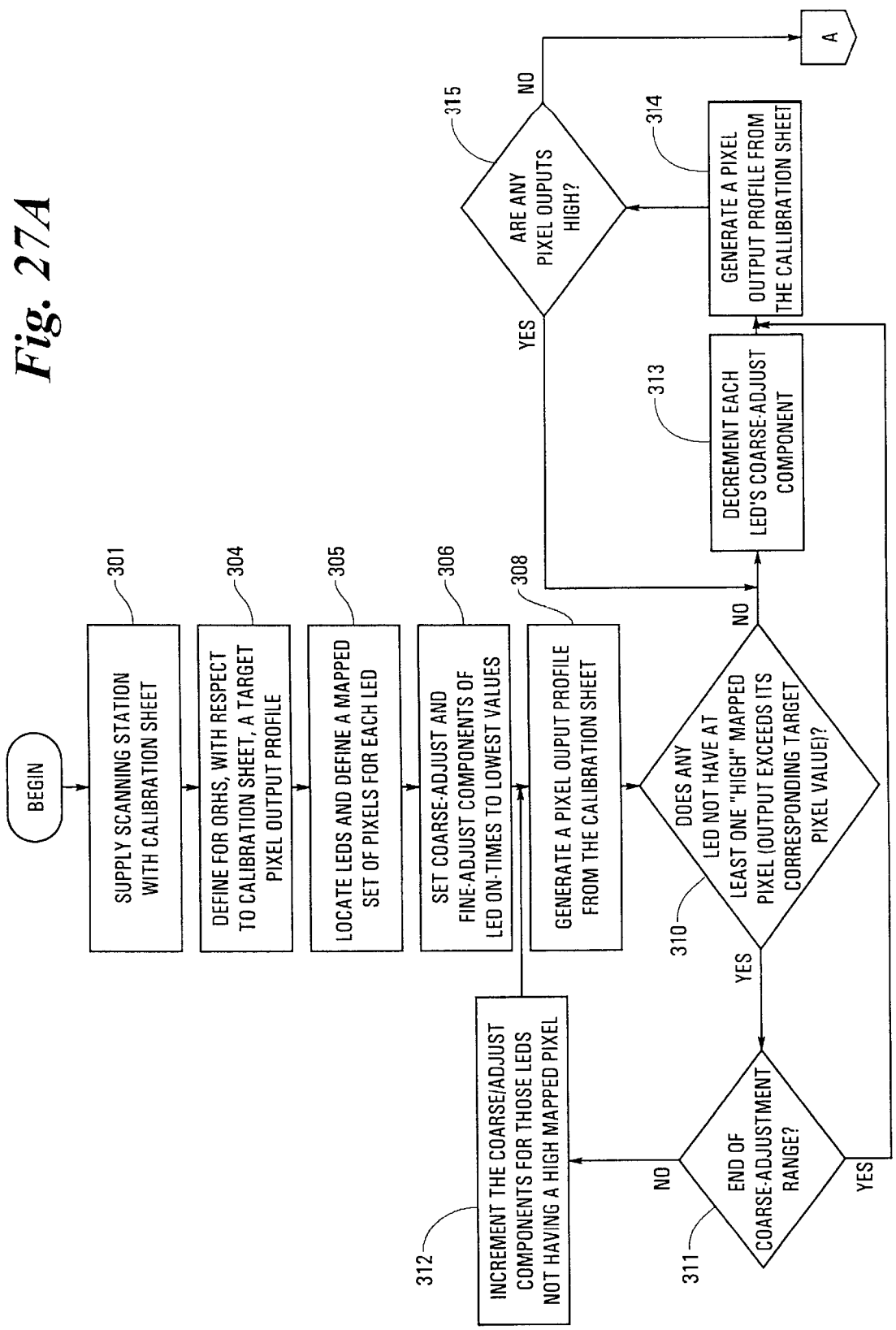
FIGS. 27A–B are a flow diagram of a preferred embodiment of a method for calibrating the pixel output of an ORHS.
Figure 27B:
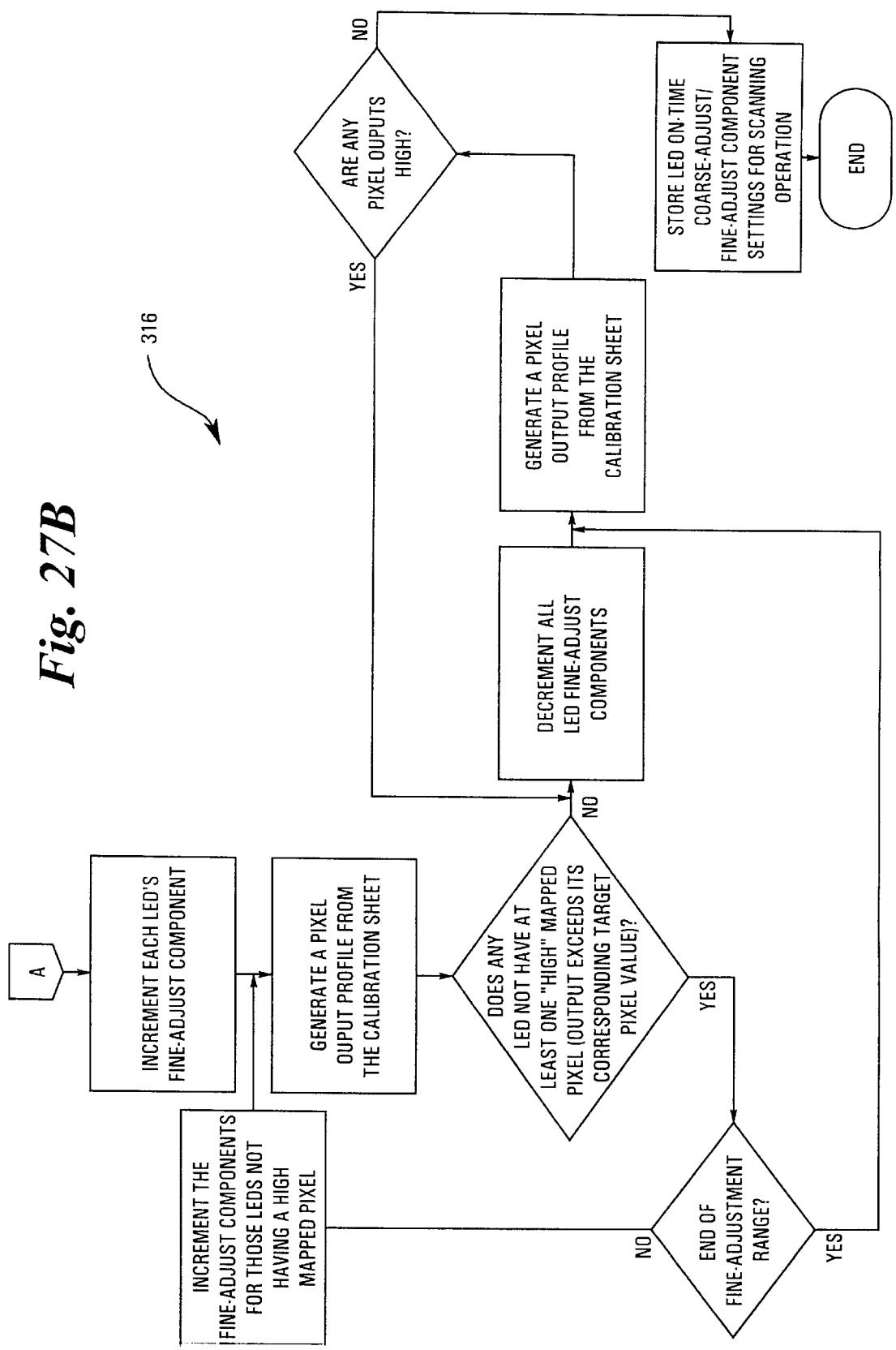

FIG. 27 is a more detailed flow diagram of a preferred method for calibrating the ORHS's pixel output. The initial steps of supplying the scanning station with an appropriate calibration sheet 301 and defining for the ORHS, with respect to the calibration sheet, a target pixel output profile 304 must precede any adjustments. Using the control techniques discussed above, the amount of light emitted by each light source 25 during a detector exposure period is adjusted by controlling the current on-times for the individual LED light sources 25. As was previously discussed, the available on-times for each LED 25 are obtained by combining a coarse-adjust component (from a set of incremental, discrete coarse-adjust components) and a fine-adjust component (from a set of discrete, incremental fine-adjust components). As is depicted in FIG. 17, the maximum on-time should not exceed the smallest possible detector exposure period. (This is because light needed for compensation but delivered after a given detector exposure period would not be available to the detector for that exposure but rather, would "run into" the next exposure period.)

Figure 34:
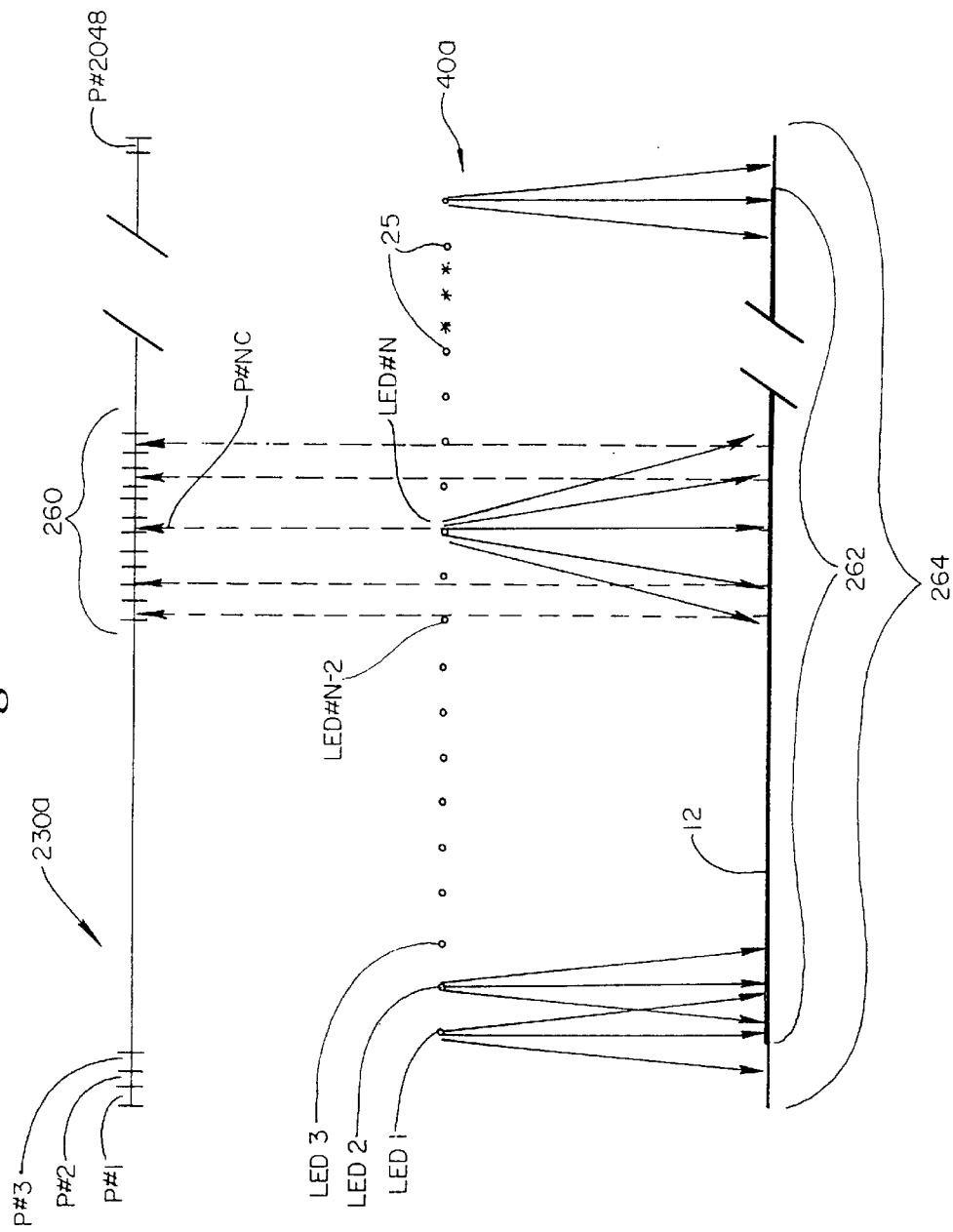

Prior to deriving the calibrated LED on-times, the relative LED positions, with respect to the detector pixel (photosite) positions are located 305. This is achieved by illuminating one LED at a time and then determining which pixel output has the highest value. Referring now also to FIG. 34, this high or "center" pixel's location thus is defined to correspond to the relative position of the illuminated LED. Thus, $P\#N_C$ is the "center" pixel in photosensitive array 230a for LED #N is light bank 40a. This location process is repeated for each LED until each LED has been matched to its corresponding center pixel. Next, a "mapped" pixel region is defined for each LED. In the preferred embodiment, this mapped region has a linear distance that is four times the average pixel distance between LEDs. Thus, with 2048 pixels and 64 LEDs, this average "inter-LED" distance should equal approximately 32 pixel units, if the LEDs illuminating a width of nine inches, are spaced uniformly across the X-axis. In addition, each LED's mapped pixel region is centered about the particular LED's center pixel. Therefore, with this example, an LED's mapped pixel region would include its center pixel, about 64 pixels to one side of its center pixel, and about 64 pixels to the other side of its center pixel. Thus, in FIG. 34, the mapped pixel region 260 corresponds to LED #N. Of course, the LEDs located at either ends of the illumination strips (e.g., LEDs #1, #2, #63, and #64) may not have complete mapped pixel regions, with respect to those of the "interior" LEDs. (However, as shown in FIG. 34, the LED bank 40a illuminates a width 264 somewhat greater than the actual width 262 of a scanned document 12.) Thus, each LED has a set of mapped pixels, which constitutes its mapped pixel region. (In FIG. 34, the mapped pixel region for LED #N-2 and LED #N would overlap.) It should be recognized, however, that a given pixel can exist in more than one LED mapped pixel region. At this point, when the LEDs have been "located" and their corresponding mapped pixel regions have been defined, their calibrated on-time values are ready to be determined.

The coarse-adjust and fine-adjust components are initially set to their lowest values for each LED 306. The calibration region is illuminated based on the then-current adjustments, and a pixel output profile is generated 308 and compared 310 with the target pixel output profile. Assuming the end of the coarse adjustment range has not been reached 311, for those LEDs whose mapped pixels are all less than their corresponding target values, the coarse-adjust component is incremented to its next higher level 312. This process continues until each LED has at least one mapped pixel that exceeds its target value. At this point, each LED coarse-adjust on-time value has been set to the lowest level that causes at least one of the LED's mapped pixels to exceed its corresponding target value. Next, each LED's existing coarse-adjust component is decremented by one value 313. A pixel output profile is generated 314 and this profile is compared with the target profile 315. If any mapped pixel value still exceeds its target value, LED on-time course-adjust components for LEDs having such pixels in their mapped pixel regions are again decremented by one discrete level. This continues until the output value for every mapped pixel is less than or equal to its target pixel value. The resulting coarse-adjust component values will be the calibrated coarse-adjust components for the LED on-times.

This same process of incrementing to exceed the target value then decrementing is repeated for the fine-adjust components 316 until each LED on-time has both a calibrated fine-adjust component, as well as a calibrated coarse-adjust component. These resulting coarse and fine-adjust components will constitute the LEDs' operational on-time values, and they are stored for future scanning operations 318. It should be noted that with this embodiment, no pixel value of the pixel output profile resulting from this portion of the calibration will be greater than its corresponding target value.

Because the individual LED light sources in any "pair" of LED's will not be identical, an alternative method of calibration would be to perform separate calibration for the upstream and downstream LED-LS strips 40a, 41a. One strip 40a would be calibrated toward a target pixel output profile equal to one-half the desired total pixel output profile. After that strip was calibrated, then both strips 40a, 41a would be illuminated and the on-time values of the other strip 41a calibrated (while not changing the on-time values for the strip 40a) toward the full target pixel output profile.

(ii) Additional Mathematical Calibration

The preferred embodiment of this invention implements further mathematical calibration of the ORHS's pixel output. This is designed primarily to provide adjustment for those pixels that show a significant deviation from the target pixel output profile even after adjustment of the on-times for the LED's. In general, the method consists of selecting a pixel-specific adjustment value, based on the difference between the target pixel output profile for a specific pixel and the best output value obtainable for that pixel after adjustment of the LED on-times. The pixel-specific adjustment value is stored and then used to adjust that pixel's value each time a pixel output value profile is generated.

In the preferred embodiment, the pixel specific adjustment value is a constant that is used in a multiplication calculation. Basically, each pixel output value is multiplied by a stored calibration constant value such that when the pixel values from the LED on-time calibrated pixel output profile are multiplied by this value, the resulting pixel output profile product will more closely approximate the target pixel output profile. For example, if pixel #456 had an LED on-time calibrated value of 120, with its corresponding target value being 240, its calibration value would be 2 because 2*120=240. Therefore, each A/D value generated by pixel #456 would be multiplied by 2 before being processed by the ORHS. It should be noted that this mathematical calibration scheme assumes that each detector pixel output is operating linearly, albeit at a reduced dynamic range.

The preferred embodiment for implementing this mathematical calibration is through the use of a look-up table, which contains output values for each pixel based upon its pixel type, as well as its sensed value. The pixel type is the pixel's LED on-time calibrated pixel output profile value. Thus, for the previous example, pixel #456 would have a pixel type of 120. In this manner, a system having a dynamic range of 0 to 255 only requires a look-up table with 256×256 cells for storing the adjustment values.

c. Error Detection

For a variety of reasons, including thermal effects and aging of components or intrusion of dirt, the accuracy of an ORHS' pixel output may drift or develop errors. Because lack of an accurate pixel output means that the "true" level of darkness of information recorded on a scanned document will not be detected, it is important that pixel output errors be recognized promptly. To ensure that each scanned document 12 is scanned with an accurate ORHS pixel output, it is desirable to monitor errors on an ongoing basis, preferably with respect to each scanned document 12. With reference to FIGS. 5A, 5B, 5E and 5F, the present invention addresses this by use of an error-detect line 17 placed within the exposure region 14 of a scanning station 10 to enable the ORHS to monitor its state of error while in operation.

The error-detect line 17 is preferably "white" and is positioned within a relatively "dark" background 9 that is incident to the exposure region 14. This line 17 extends across the background 9 in a direction perpendicular to document travel. The line 17 is preferably less than 10% of the width of the exposure region 14 (e.g., width of the area scan detector's photo-site array). Thus, the amount of light reflected back through the paper is only about 10% of that of a solid white background. The width of the line 17 is not absolute but should at least equal that of one pixel line and not be so wide as to greatly contribute to read-through during document scanning.

With respect to the upper half of the scanning station 10, dark background 9 with the inner-positioned error-detect line 17 is applied to the underside of the glass sheet 15b forming the lower boundary of the scanning station 10. Thus, the error-detect line 17 is visible to the detector camera 30a in the exposure region 14 when no document 12 is in the scanning station 10 (see FIG. 5A). But when a document 12 is in the scanning station 10 (see FIG. 5B), the error-detect line is not visible.

Figure 5F:
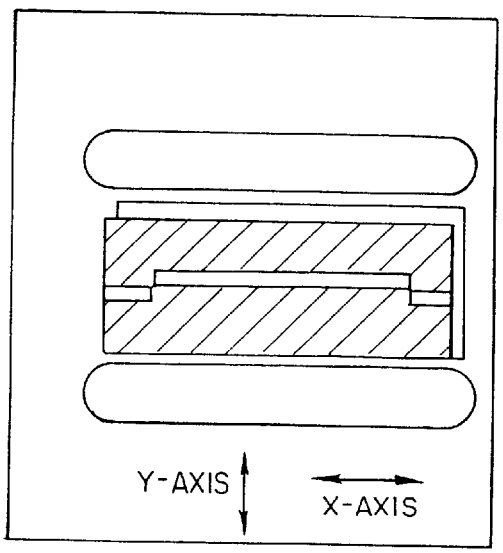
FIG. 5F is a cut-away, simplified top view of a scanning station as in FIG. 5A having a further alternative embodiment of an error-detect line.

The error-detect line 17 may be simply a straight white line extending completely across the X-axis (see FIG. 5A). If the line 17 is to be used for other purposes (e.g., field of view measurements or other side-to-side adjustments), it may be altered by adding "black dot" interruptions at known intervals (see FIG. 5E). However, with this embodiment, not all pixels of the pixel output will be exposed to the white portion of the line 17, thus making performance and error detection slightly less complete. A minor modification to the line 17 (as shown in FIG. 5F) yields the preferred approach. The line is configured from three segments, not separated by black dots, but rather, offset from each other by the width of the line. This configuration allows all output pixels to be exposed to the same amount of "white" yet has the advantage of a measurable center line for adjustment purposes. More complex configurations of the line 17 may be desired to implement other adjustment and monitoring procedures. If a screening process is used to fabricate the line 17, the additional complexity of the line will add little consequence.

To provide a baseline for monitoring errors, a "control" pixel output image, which includes at least one pixel output profile, of the error-detect line 17 is generated from the detector camera 30a and saved when the ORHS pixel output is known to be in a state of acceptable accuracy (e.g., just after completion of a calibration, as outlined in the previous section). Then, during normal ORHS scanning operation, the ORHS generates a current pixel output image of the error-detect line 17 and compares it to the control pixel output image. If the "current" image is not within a preselected range of the "control" image the ORHS has detected an unacceptable error state and acts accordingly, with respect to system design parameters. An operator could be notified, or a calibration process could be initiated.

The control pixel output profile and each current profile are generated in the same way. This is preferably done in the preferred embodiment, employing the Dalsa 96-line TDI camera, by "freezing" the camera 30a so that it takes fifty consecutive exposures of the error-detect line 17 and the surrounding dark background 9 without any transfer of charge between pixel lines. This has the effect of making the relatively narrow array area exposed to the white line accumulate nearly as much charge as the whole array area would when exposed to white paper during a normal scan. Thus, an image of the error-detect line is built. Once built, it can be shifted to and through the pixel output array buffer 78 and stored for later use as a baseline or as a current reading.

To provide a high level of error-detect monitoring, an error-detect line image can be captured and associated with each document 12 scanned. Capture can occur immediately after or before a document 12 is scanned in the brief inter-document interval.

C. Document Feed Control

1. Y-axis DPI Distortion

Uncorrected "wow and flutter" or other uncompensated long/short term changes in the specified bed velocity of the feed mechanism that moves the document through the CCD-array detector scan axis will cause reflectance-level artifacts, since the output voltage of a CCD array is dependent upon the detector exposure time. Unless corrected, even minor variations in the velocity of the document when travelling under the CCD-array detector scan axis can therefore lead to undesired artifacts and perturbations in the final sheet-image signal delivered to the output array buffer 78 and passed to the data-extraction algorithms and application programs.

If the control signal that triggers the repetitive burst of Y-axis CCD-array detector sweep readout pulses as the sheet passes through the X-axis scanning area (image region 14) is generated at fixed time intervals, two types of distortion will occur due to the above velocity variations.

First, a fixed clock rate design for the horizontal sweep readout signal "assumes" that the document has advanced a fixed distance during each sweep exposure period; for an ORHS with 240 DPI resolution, this distance will be 1/240", or 0.004167". However, if the document is, in fact, moving either faster or slower than the proper IPS rate (which is a function of both DPI resolution and the CCD-array detector exposure period clock rate), then spatial distortion is introduced.

This means that relatively too few or too many sweeps, respectively, are generated in the Y-axis during a given time interval, with reference to the fixed 240 DPI X-axis resolution determined by the CCD-array detector pixel length and the FOV. Accordingly, when the image is reconstructed via a CRT display, and/or hard-copy printed output, the geometrical replication is either "shrunk" or "expanded" in the Y-axis.

Second, unless each detector exposure period (horizontal sweep) is kept constant with varying velocity, the CCD-output A/D signal amplitude will vary because either too short or too long an exposure period occurs for charge-accumulation in the CCD-array detector, as shown in FIG. 9.

Figure 28:
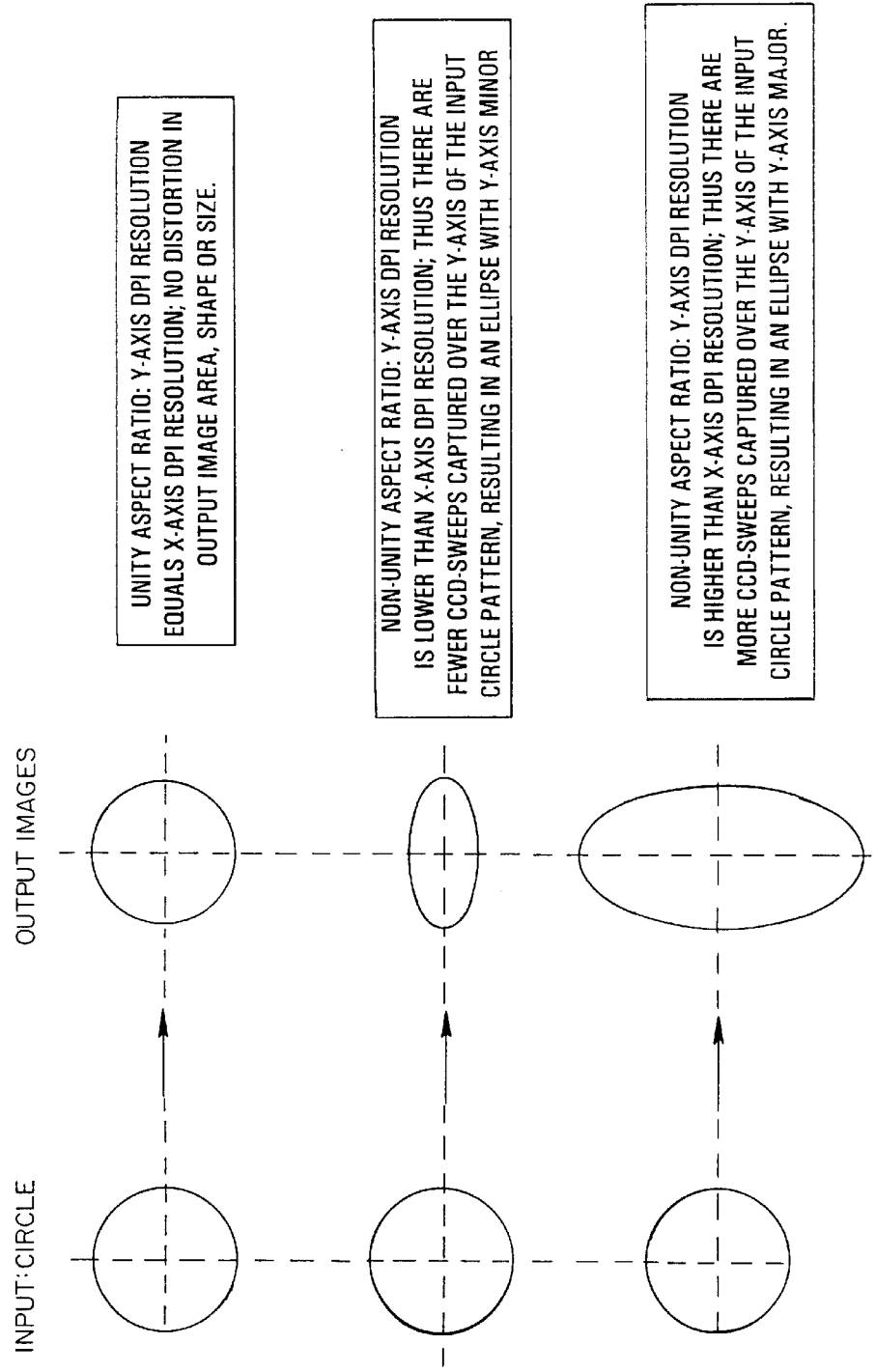
FIG. 28 is a graphical illustration of spatial distortions for non-unity DPI aspect ratios.

FIG. 28 shows the effects of both a 2:1 change and a 1:2 change in bed velocity with respect to a unity aspect-ratio reference velocity, when the CCD-array detector Y-axis readout rate is fixed for any bed speed.

Thus, when the feeder bed velocity is doubled, only one-half as many CCD sweep readouts are generated, which has the output-image effect of turning an input circular pattern into an ellipse with a 2:1 ratio between the major X-axis and the minor Y-axis.

Alternatively, when the feeder bed velocity is halved— with the CCD-sweep readout rate again remaining constant, there are twice as many readout cycles (since the available time is doubled), which has the effect of turning an input circular pattern into an ellipse with a 2:1 ratio between the minor X-axis and the major Y-axis.

2. Document Feed Control Scheme

The problem of output-image distortion can be overcome by synchronizing the CCD sweep readout rate with the feeder bed velocity, which is the preferred embodiment of the present invention.

With reference to FIG. 29, the document advancement transducer 400 (e.g., photo-optic timing disk 401 in combination with a sensor 403) is attached to a rotating part associated with the document feeder to track the document advancement rate. For example, a timing disc 401 could be in rotatable connection with one of the document drive/guide rollers 18, 19 in the feeder module 70. Thus, the velocity of a sheet 12 being fed through the feeder is directly proportional to the angular rotation velocity of the timing disk 401 (assuming no slippage between the document surface and the rollers).

The mathematical relationship is $S_{84}=\pi*D_w*RPM/60$, where $S_v$ is the document velocity in inches/second (IPS), $D_w$ is the drive wheel diameter in inches, RPM is the rotational velocity of the drive wheel in revolutions per minute, and $\pi$ 3.1415927. For example, if the drive wheel is 1.0" in diameter and is rotating at 475 RPM, a document will move past the scan-axis at approximately 25 IPS (e.g., 24.87 inches/second). Therefore, an 11" long document will require about 442 milliseconds to pass by the scan-axis (or image region 14).

In the preferred embodiment, the document advancement transducer 400 is capable of generating an electronic output pulse for each 1/240" that a document 12 advances. Alternately, every other pulse may be ignored by the processing logic, producing a pulse train to 120 pulses per inch as in the "binning mode" used for OMR (explained below).

The output pulse train (document advanced signal) from the sensor 403 (which reads the photo-optical black/clear timing lines on the disk) is input to the camera controller 60 which generates the necessary timing signals for clocking the CCD-array detector. As the 240-segment preferred embodiment timing disk rotates 1.5 degrees—which is equivalent to one pulse for each 1/240" travel of the document—the camera controller 60 generates the horizontal synchronization sweep and CCD-sweep readout clock signals, which are sent to the detector module 35.

Therefore, even though the document velocity may vary (e.g., contain "wow and flutter" during passage by the scan-axis (image region 14), or incur long-term IPS drift, the sweep readout rate is always in direct synchronization with the document travel distance.

Upon receiving the sweep readout pulse, the detector control/logic circuitry 32*a* of the detector module 35 generates a "burst" of 2,048 clock pulses (in the preferred embodiment) and sends them to the CCD detector camera 30*a*. This train of pulses clocks out the A/D grayscale-index value (00–255) to the pixel output array buffer 78 for each of the 2,048 pixels within the CCD-detector camera 30*a*. The length of time required for all 2,048 pixel values to be clocked out is always less than the minimum time between successive sweep readout/horizontal synch. pulses, as shown in FIGS. 16, 17, and 29.

Yet other signals generated by the camera controller 60, as shown in FIG. 2, in connection with the LED light source on-time controller 132 (see also FIG. 25) control the drive currents and turn-on times for the individual LED's comprising the multiple LED-LS strips for the ORHS.

The OMR-Mode and Image-Mode selections (as chosen by the user application) are also input to the camera controller 60, so as to set the proper horizontal synch/sweep readout rate for the change in IPS bed speed required when switching from one mode to another.

D. Multi-Mode Operation

The present invention described in this specification offers two distinct modes of operation, as noted earlier: the image-capture mode and the OMR mode. The above discussion and descriptions of FIGS. 28 and 29 on Y-axis synchronization timing (and related factors) explain how image distortions— both spatial and grayscale level—are eliminated by the invention, even though document velocity variations may be present when a document 12 is being scanned.

Again, the Y-axis refers to the direction of document travel while being scanned—nominally with a length of 11" for a U.S. standard page-size document for single-side scanning; slightly longer for dual-side scanning—whereas the X-axis "direction" refers to the cross-feed axis; with a nominal length of 8.5" field-of-view for a full U.S. standard page-size document.

Unity-aspect ratio (Y-axis/X-axis DPI ratio) is the normal, conventional scheme for practically all document image-capture systems offered in the marketplace. In the OMR mode, however, it is not especially necessary to maintain unity-aspect ratio. If the feeder bed speed is increased for the OMR mode—with respect to the setting for the image-capture mode—the sheets/hour throughput rate can be increased accordingly, resulting in a far more cost-effective scanner.

The preferred embodiment for the DPI resolution (dots/inch) in the image-capture mode is 240 DPI with unity-aspect ratio; that is, the resolution is 240 DPI, or sampled pixels per inch in the X-axis, and 240 lines or CCD-sweeps in the Y-axis, regardless of document velocity variations when being scanned.

In the OMR mode, the feeder bed velocity is automatically doubled (e.g., under user program control) to twice the IPS rate set for the image-capture mode; for example if the image-capture mode runs at 25 inches/second, the OMR mode will be set to run at 50 inches/second, greatly increasing the "real world" sheets per hour throughput rate.

The preferred embodiment for the ORHS incorporates a TDI type CCD-array detector camera that is ideally suited to operate synchronously at two distinct speed settings where the ratio is 2:1, as per the above example. FIG. 16 illustrates these two modes. In the image-capture mode, the CCD-sweep readout clock—generated by the camera controller 60—causes the detector control/logic circuitry 32*a* to generate a 2,048 "burst" of pixel readout pulses for each 1/240" travel increment of the document 12 as it passes through the image region 14 of the scanning station 10.

As noted earlier, in the image-capture mode, the time between successive horizontal synch./CCD-sweep readout clock pulses can vary by a delta amount due, to feeder bed velocity variations, but the equivalent Y-axis document distance increment is always 1/240", which corresponds to the specified 240 DPI Y-axis resolution.

The clock rate driving the pixel readout of the 2,048 photo-sites in the CCD-array detector is sufficiently fast such that all pixels for a given CCD-sweep are read out before the end of a given (e.g., shortest) sweep readout period.

In the OMR mode, the effective Y-axis DPI (lines/inch, actually), is reduced to 120 DPI because the feed bed speed has been doubled.

The TDI type camera, DALSA Model CL-E2, used in the preferred embodiment, has a special programmable feature known as "binning", whereby the outputs of two contiguous Y-axis photosite 2,048 pixel-strips in the $96_X$ by $2,048_Y$ TDI CCD-array detector can have their accumulated exposure-period charge combined for the final 2,048 pixel stream readout. This feature is incorporated into the OMR mode of operation.

The FIG. 16 timing diagrams and this accompanying description provide an overview of the OMR "binning mode" of operation of the ORHS invention.

E. Multi-Chromatic Operability

1. Principles of Ink-Light Interactions

A further feature of the present invention is the flexibility with which the ORHS can be easily reconfigured to meet a variety of read/non-read marking instruments and preprinted inks. In traditional OMR applications it is usually desirable for the reading head not to "see" any of the preprinted ink on the form (e.g., such as ink marks defining the "bubble" marking positions), the normal exception being black-ink timing tracks or other navigational indicia for form-ID purposes.

Furthermore, a graphite-base marking instrument, such as a #2 lead pencil, is often the marking instrument of choice, since marks made with this instrument absorb nearly all of the incident light on the paper (regardless of light-source wavelength); thereby providing a high-contrast signal with respect to typical OMR paper stock, which reflects about 75% to 85% of the incident light.

However, in general purpose imaging applications, there is often a requirement to detect or capture certain colors of ink preprinted on the form, while not seeing or ignoring other ink or marking instrument colors.

A "dropout" ink—for a given wavelength of incident light energy—is an ink that reflects nearly all of the incident light at its dropout frequency (or a predefined bandwidth of frequency), and thereby is virtually indistinguishable from blank paper itself when the signal arrives at the CCD-array detector.

A "high contrast" ink or marking instrument, contrariwise, is an ink or ink-mark that absorbs nearly all of the incoming incident light over a predefined wavelength bandwidth, thereby reflecting very little light from the paper surface to the CCD-array detector. Such an ink or mark is very easy to detect by the CCD-array detector, since the ratio of signal level between the reflected-ink signal and the paper background is so high.

Mathematically, ink-contrast (for a given wavelength or band of wavelengths) is defined as the ratio of the difference of reflectance between the paper background reflectance and the ink reflectance, divided by the paper background reflectance: $I_{CR}=[(R_P-R_{INK})/R_P]$, where $I_{CR}$ is the ink-contrast ratio at the defined wavelength, $R_P$ is the paper reflectance at the same wavelength, and $R_{INK}$ is the reflectance of the given ink.

For example, if a given document has an average broadband visual reflectance of 82%, and the ink has a reflectance of 78%, the ink-contrast ratio is: $I_{CR}=(82-78)/82=4.88\%$. This level of contrast ratio is considered very low (e.g, within the range of paper-noise itself), and is more or less the range associated with a "dropout" ink in the region of interest. On the other hand, if a specimen ink has a contrast-ratio of 85%, for example, it would be considered a very high contrast-ratio, suitable for detection with practically any light source that emits energy within the predefined spectral region of interest.

Thus "ink-noise" ratio is simply another term for the measurement of ink-contrast ratio; the nomenclature is chosen depending upon whether the ink-contrast level is "desirable" or not. If it is not desirable to detect the ink in a given application, then one usually speaks in terms of ink-noise ratios when selecting an ink. If, contrariwise, the ink must be detected in the captured image, then one typically refers to ink-contrast ratios when selecting inks. For the latter, one preferably selects high ratios, for the former, low ratios.

Finally, in specifying ink-noise or ink-contrast ratios (e.g., the same measurement), the characteristics of both the paper and the ink-density and geometry must be completely and accurately specified, as well as the portion of the spectrum in which the reading head is operating (NIR or VIS).

For example, a red ink will measure a different contrast-ratio when printed on white paper, than when printed on a red or pink pastel background paper. Similarly, the same ink will show different ratios when the screening level is altered. One-hundred percent screening, by definition, is the same as solid ink printing, and will show the highest ratios; as the level of screening is reduced, the ink-contrast levels will be lowered—but only if the area measured is sufficiently larger than the effective resolving power of the detection system.

Figure 30:
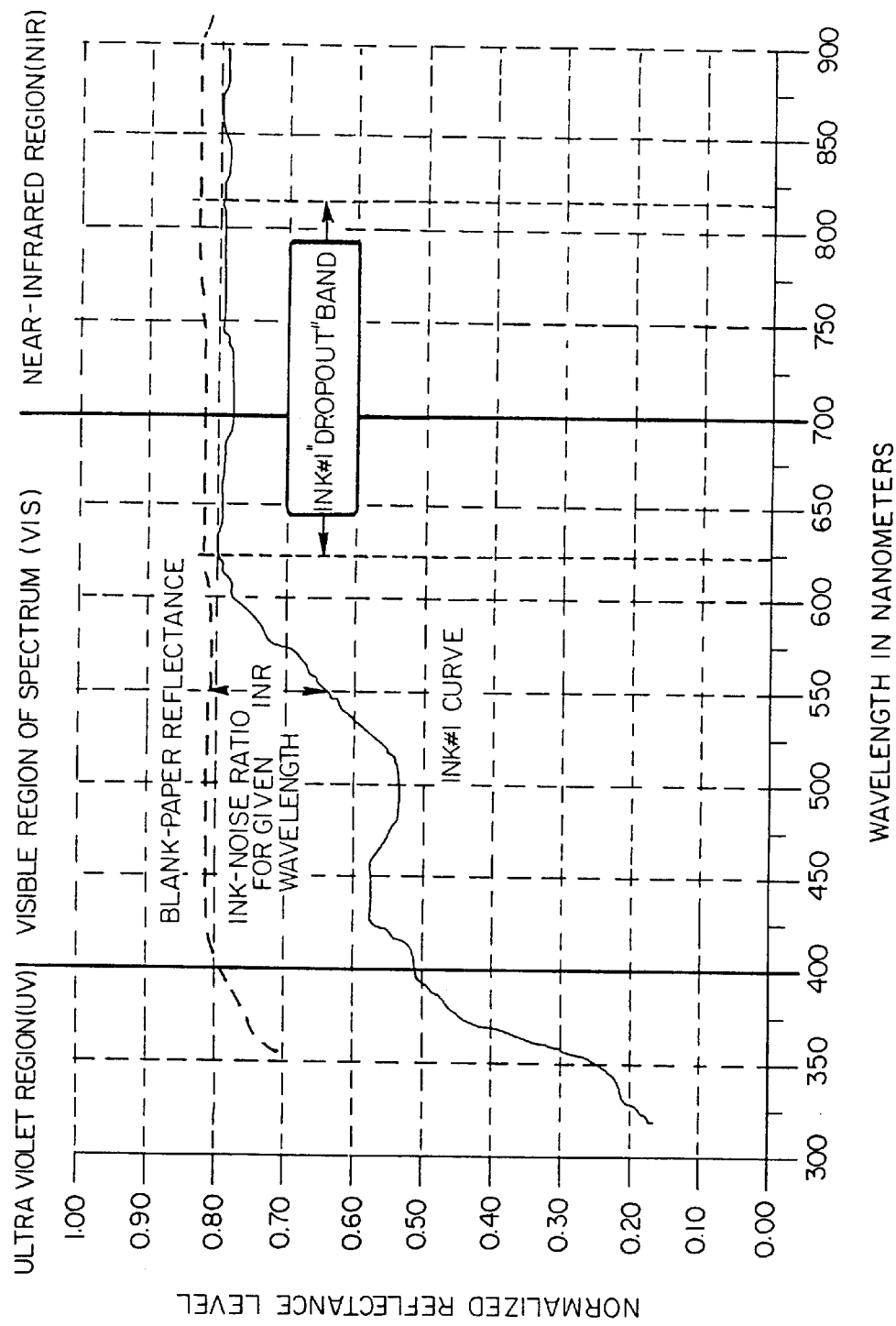
FIG. 30 illustrates Example 1 of a reflectance curve for colored ink on paper background.

Ink-noise, or equivalently, ink-contrast determinations (and the ratio calculations) are typically made from a spectral plot of an ink sample over the region of interest, with blank-paper background serving as the reference level, per the mathematical definition of ink-contrast ratio cited above. FIG. 30 illustrates an ink with very low contrast in the near-infrared (NIR) region (e.g., low "ink noise") and extending into the lower portion of the visible (VIS) region. Red inks often exhibit spectral plots of this generic nature.

Thus, for this ink to be considered a "dropout" ink, the ORHS light sources 25 should emit only energy with a wavelength equal to or greater than about 640 nanometers out to the NIR limit of about 900 nanometers. There is a wide choice of commercially available LED's that have peak-energy bands in this range. If, however, $GREEN_{550}$ light-emitting LED's were selected for the light sources 25, the ink shown in FIG. 30 would be detected at about a 21% contrast level—thus resulting in not an especially strong CCD-array detector A/D signal, but one adequate enough to be above the ink/paper noise threshold.

Figure 31:
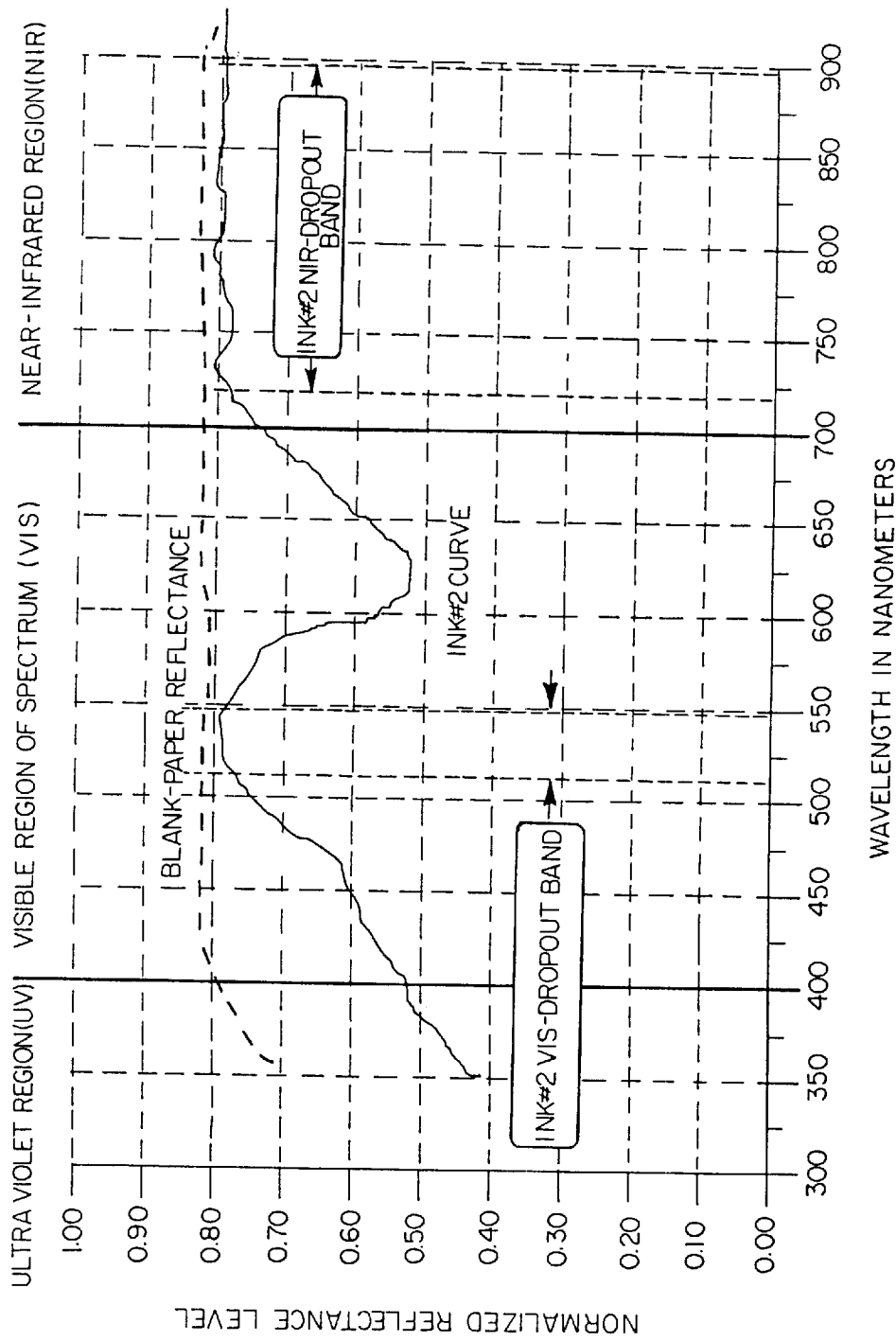
FIG. 31 illustrates Example 2 of a reflectance curve for colored ink on paper background.

The ink shown in this example has a low contrast-ratio in the NIR region, but drops rapidly in reflectance (e.g., contrast increasing) as the wavelength is shifted to the red region of the VIS spectrum, only to increase in reflectance again as the green region of the VIS spectrum is approached. Thus an ink with this spectral contrast property could serve as a "dropout" ink in both the NIR region and a fairly broad 80 nm VIS region slightly below the wavelength of $GREEN_{556}$. The dropout conditions could be met with an illumination strip 20a, 21a which contained LED's 25 emitting at either the center of the NIR or VIS bands of low-contrast illustrated in FIG. 31.

On the other hand, an illumination strip 20a, 21a containing LED's whose peak wavelength is centered at $RED_{660}$ will produce an ink-contrast ratio of about 37% for this ink. A BLUE$_{430}$ color LED illumination strip 20a, 21a will also produce relatively high contrast ratios for this ink.

Colored-ink marks generally read well (e.g., produce a high contrast-ratio) when they are spectrally peaked at the opposite ends of the spectrum from which the LED light sources 25 are located. Thus, for high-contrast red marks, choose a blue color light source, and for high-contrast blue marks, choose a red color light source.

Figure 32:
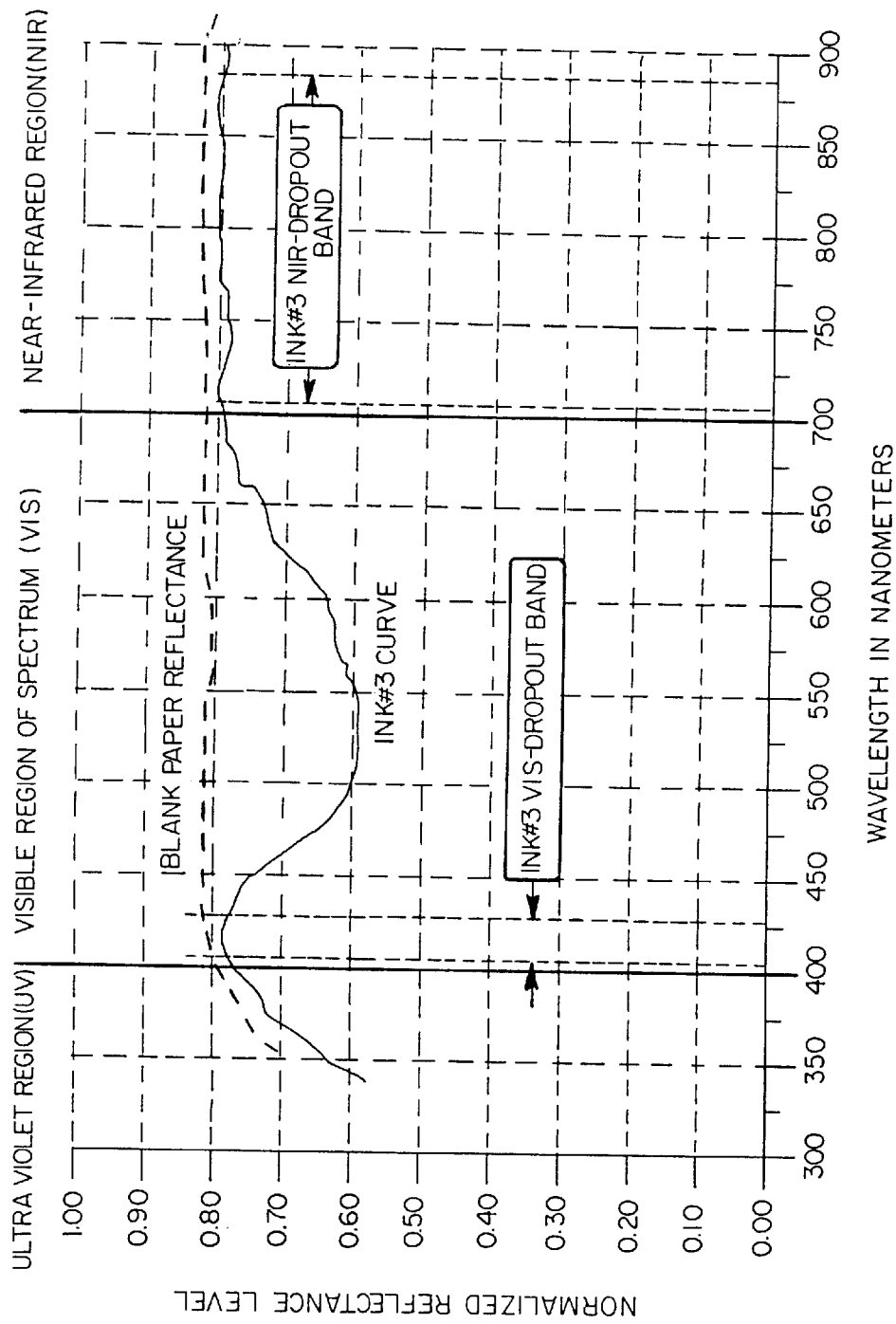
FIG. 32 illustrates Example 3 of a reflectance curve for colored ink on paper background.

FIG. 32 illustrates an ink with a reflectance peak in the BLUE region, as well as the typical NMR "dropout" band for typical inks selected for OMR applications. Accordingly, an illumination strip 20a, 21a that peaks in the blue region of the VIS spectrum would treat this ink as a "blue dropout" ink, while emphasizing high-contrast ratios of marks made with a red color. An illumination strip 20a, 21a with output in the NIR region will also view this ink as a "dropout" ink, as noted above.

Figure 33:
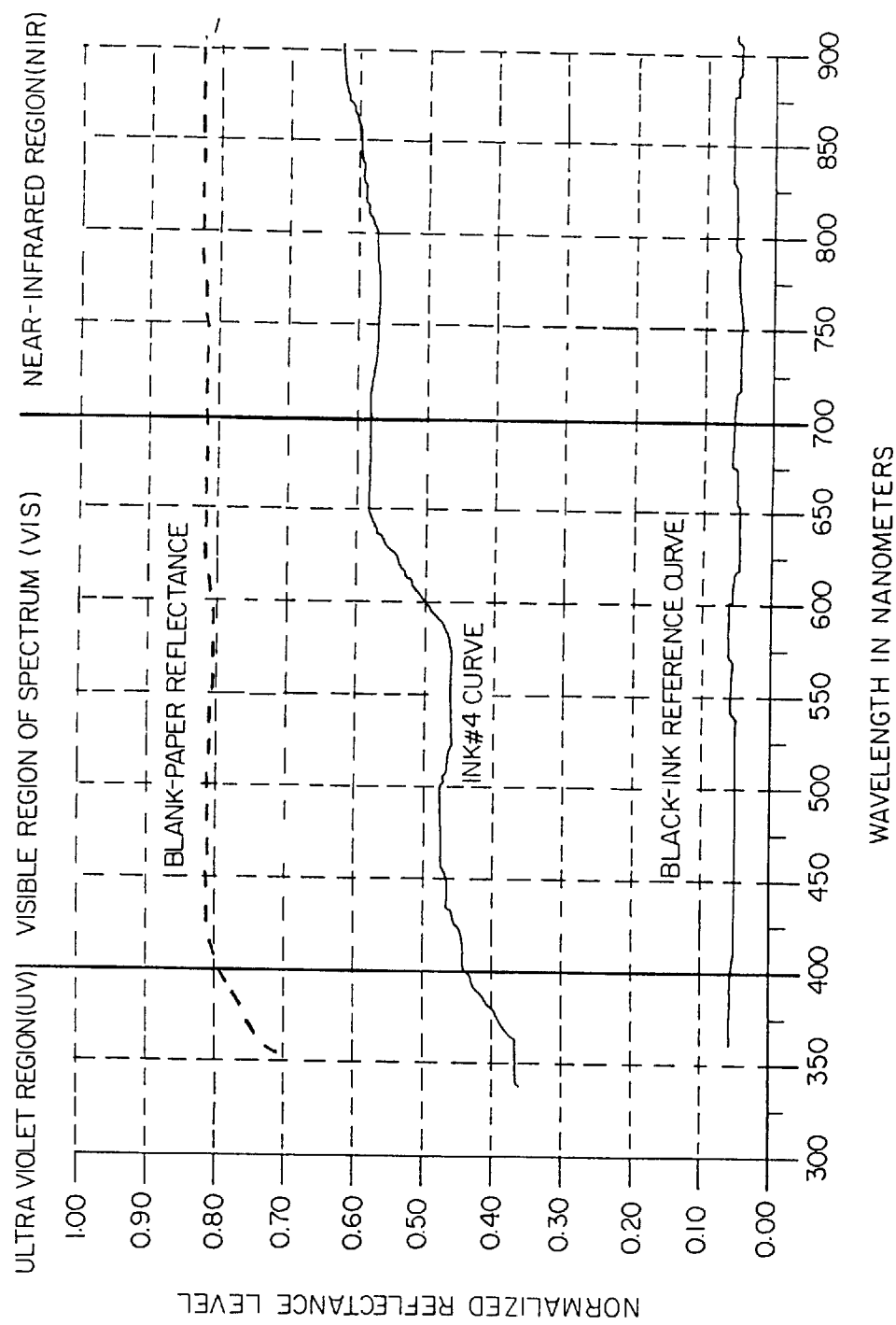
FIG. 33 illustrates Example 4 of a reflectance curve for colored ink on paper background.

Certain inks, because of the photochemical properties used in their manufacture, simply cannot serve in "dropout" ink applications; FIG. 33 illustrates the spectral profile of such an ink. As can be seen from the plot, there is no region in the entire UV, VIS, NIR spectrum where the reflectance of the ink comes close to the value of the paper background. Accordingly, it is not possible to choose a light source—either narrow or broadband—that will result in a reflected level of the incident light source energy that approaches that of the paper itself.

Contrariwise, an ink of this type—if the color is aesthetically acceptable to the user—will make an ideal high-contrast ink when it is required that the preprinted ink is to be detected by the ORHS; an illumination strip 20a, 21a of any wavelength will generate an acceptable contrast-level for reliable detection by the CCD-array detector.

Inks showing a high-contrast across a broad wavelength spectrum (e.g, UV to NIR) often contain a carbon-bearing base in the ink formula mixture; carbon and/or graphite—as noted earlier—is highly absorbent, resulting in little reflected light to the CCD-array detector. A BLACK ink spectral plot is shown for reference on FIG. 33.

2. Uses of Ink-Light Interactions

As discussed above, the present invention permits changing the spectral qualities of the illumination provided by illumination strips 20a, 21a. This can be done by electronic switching between multiple illumination banks provided in the same illumination strips 20a, 21a. (FIG. 4 shows two parallel banks in each of illumination strips 20a, 21a. This might be extended to three, four or more banks, although there is some limit based on increased distance from and degraded angles relative to the scanning station 10.) Switching can also be accomplished by changing the entire physical subassembly that carries strips 20a, 21a. For electronic switching, the system is equipped with color recognition means, either a frequency sensitive sensor or a software routine based on a known illumination source and calibrated values corresponding to the expected pixel output from known colors when illuminated by the known illumination source. Other means for sensing a color indicator (e.g., a code mark) could also be used.

But electrical physical switching alone is not sufficient if "true" greyscale accuracy is to be preserved. The present invention permits rapid calibration and storage of the values developed in calibration, so that a change in illumination can be accompanied by rapid adjustment to restore or accomplish calibration. This ability rapidly to change the color mode while preserving greyscale accuracy is useful in several situations.

1. If a user wishes to have a single form with separate sections, each with a different color, the form can be scanned by on-the-fly switching with a single scan, as long as the color differentiation occurs with an interval sufficient to install any changed calibration values.
2. If a user wishes to mix forms and has a control mark on each form to designate color, the forms can be scanned by on-the-fly switching between scans of individual forms.
3. If forms are not marked with a control mark to designate color, one form can be "read" to determine a pixel output profile. If that pixel output profile is not consistent with a form of the color expected, the ORHS can be programmed to switch modes.
4. For some ink colors the best contrast may be achieved by two colors used together, with a calibration based on illumination from both spectrally-differentiated banks in an LED-LS strip 40a, 41a.

An example of a scannable document 12 pre-printed or marked with different colors is shown in FIG. 35. In this example, document 12 has four quadrants 12a, 12b, 12c, 12d, each of which utilizes a different color. This might, for example, be the case when the document 12 is an answer sheet used for one or more different tests, where the scanning and scoring program expects answer marks for each tests only in one selected quadrant. The color-cue can help ensure that users mark answers in the correct quadrant. To accommodate multiple colors on the document, illumination is provided by two light banks 40a, 140a. Light bank 40a consists of a first segment 44 of LEDs with a first color and a second segment 45 of LEDs with a second color spectrally differentiated from the first color. Light bank 140a consists of a third segment 144 of LEDs with a third color and a fourth segment 145 of LEDs with a fourth color. In the most general case, the third and fourth colors are spectrally differentiated from each other and from each of the first and second colors.

If the purpose is to cause each of the different background colors used in each of the quadrants 12a, 12b, 12c, 12d to drop out, a corresponding LED color can be selected for each of the segments 44, 45, 144, 145. As the document 12 is processed, the appropriate segment to cause drop-out can be selected for illumination. For example, if drop-out of red ink background printing is desired in quadrant 12c, then red LEDs are selected for light bank segment 45 and are illuminated during scanning of the lead half of document 12. If drop-out of blue ink background printing is desired in quadrant 12b, then blue LEDs are selected for light bank segment 144 and are illuminated during scanning of the trailing half of document 12. Calibration is performed for each of the light bank segments. If a color selection results in a change from one LED bank to another during scanning, the camera controller 60 can load the appropriate, previously developed calibration values and then switch on the LEDs for which the calibration data were developed. With an adequately fast controller 60, such switching of colors and calibration values can occur within a single pass of the document through the scanning station. Thus, the system 100 can use different illumination spectra in a single document scan while also being acceptably calibrated for each of those spectra.

Although the present invention has been shown and described with respect to preferred embodiments, various changes and modifications that are obvious to a person skilled in the art to which the invention pertains are deemed to lie within the spirit and scope of the invention as defined by the following claims.

What is claimed is:

1. An optical reading head system having an acceptably calibrated pixel output, the system comprising:

a scanning station for receiving a document to be scanned, the scanning station including an exposure region, the exposure region including an image region;

a detector including an array of photosensitive sites for sensing reflected light from the document at an area corresponding to the exposure region, the sensing occurring during a detector exposure period to generate a pixel output profile of the area of the document corresponding to the image region;

a plurality of light sources for lighting the exposure region, wherein each light source emits an individually controlled amount of light to the exposure region during a detector exposure period such that the system's pixel output is acceptably calibrated;

a feed mechanism for advancing the document through the scanning station; and a document advancement transducer that tracks the document's advancement through the scanning station and generates a document advanced signal indicating that the document has advanced a specified distance, wherein the document advanced signal is utilized to trigger the detector exposure period.

2. The system of claim 1 including a controller for individually controlling each of the light source on-times during a detector exposure period, thereby controlling the amount of light emitted from each light source during such a period.

3. The system of claim 1, wherein the light sources are light emitting diodes (LEDs).

4. The system of claim 3, wherein the LED light sources are configured into at least two LED strips that are spaced apart from each other about the exposure region.

5. The system of claim 3, wherein the LED light sources are configured into at least two LED banks, wherein at least two of the banks emit different colored light or radiation occurring in different regions of the light spectrum.

6. The system of claim 5, further comprising selection means for selecting a particular LED operating color in response to a color mode select signal.

7. The system of claim 6 wherein the color mode select signal is generated by a user.

8. The system of claim 6, further comprising color recognition means for recognizing an ink color present upon a document to be scanned, the color recognition means generating the color mode select signal in response to the recognized document ink color.

9. An optical reading head system having a calibrated pixel output, the pixel output comprising a discrete value for each of a plurality of pixels, the system comprising:

a scanning station having an exposure region that includes an image region;

a detector including an array of photosensitive sites that sense reflected light from the exposure region during a detector exposure period to generate a pixel output profile of the image region; and a selectable first plurality of light sources for lighting the exposure region, wherein each light source in the first plurality of light sources emits an individually controllable amount of light to the exposure region during a detector exposure period such that the system's pixel output is acceptably calibrated when such first plurality of light sources is selected and a selectable second plurality of light sources for lighting the exposure region, said second plurality of light sources having a different spectral quality than the first plurality of light sources, wherein each light source in the second plurality of light sources emits an individually controllable amount of light to the exposure region during a detector exposure period such that the system's pixel output is acceptably calibrated for the different spectral quality when such second plurality of light sources is selected.

10. An optical reading head system in accordance with claim 9 further comprising means for the user to select one of the first and second plurality of light sources.

11. An optical reading head system in accordance with claim 10 further comprising means for the user to select one of the first and second plurality of light sources for scanning one portion of a document and to select the other of the first and second plurality of light sources for scanning another portion of the same document in a single pass through the scanning station.

12. An optical reading head system in accordance with claim 9 further comprising:

means for providing a signal to the system to select one of the first and second plurality of light sources during scanning; and means responsive to said signal for selecting one of the first and second plurality of light sources for scanning one document and to select the other of the first and second plurality of light sources for scanning another document.

13. An optical reading head system in accordance with claim 12 wherein the means for providing a signal comprises means for sensing a color indicator on a scanned document.

14. A scannable sheet for receiving user indicia that are to be detected during scanning with an optical scanner system having a selectable first plurality of light sources emitting an individually controllable amount of light to the exposure region during a detector exposure period and a selectable second plurality of light sources, said second plurality of light sources having a different spectral quality than the first plurality of light sources and emitting an individually controllable amount of light to the exposure region during a detector exposure period, said sheet comprising:

a first portion with first preprinted indicia, said indicia being printed in a first ink selected such that the system's pixel output is acceptably calibrated when such first plurality of light sources is selected and a second portion with second pre-printed indicia, said indicia being printed in a second ink selected such that the system's pixel output is acceptably calibrated for the different spectral quality when such second plurality of light sources is selected.

* * * * *